(12) United States Patent
Kondow

(10) Patent No.: US 10,623,739 B2
(45) Date of Patent: Apr. 14, 2020

(54) IMAGE PROCESSING APPARATUS AND METHOD

(71) Applicant: SONY CORPORATION, Tokyo (JP)

(72) Inventor: Kenji Kondow, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/382,477

(22) Filed: Apr. 12, 2019

(65) Prior Publication Data

US 2019/0238846 A1    Aug. 1, 2019

Related U.S. Application Data

(63) Continuation of application No. 14/005,669, filed as application No. PCT/JP2012/056810 on Mar. 16, 2012, now Pat. No. 10,306,223.

(30) Foreign Application Priority Data

Mar. 24, 2011 (JP) ................ 2011-066211
Oct. 19, 2011 (JP) ................ 2011-229574

(51) Int. Cl.
*H04N 19/117*     (2014.01)
*H04N 19/14*      (2014.01)
(Continued)

(52) U.S. Cl.
CPC ........... *H04N 19/117* (2014.11); *H04N 19/14* (2014.11); *H04N 19/174* (2014.11); *H04N 19/436* (2014.11); *H04N 19/82* (2014.11)

(58) Field of Classification Search
None
See application file for complete search history.

(56) References Cited

U.S. PATENT DOCUMENTS

| | | |
|---|---|---|
| 2010/0027686 A1 | 2/2010 | Zuo et al. |
| 2010/0177822 A1 | 7/2010 | Karczewicz et al. |

(Continued)

FOREIGN PATENT DOCUMENTS

| | | |
|---|---|---|
| AT | 488096 T | 11/2010 |
| AU | 2009220567 A1 | 9/2009 |

(Continued)

OTHER PUBLICATIONS

Notice of Allowance and Fees Due for U.S. Appl. No. 14/005,669, dated Jan. 17, 2019, 08 pages.
Non-Final Rejection for U.S. Appl. No. 14/005,669, dated Aug. 9, 2018, 05 pages.
Advisory Action for U.S. Appl. No. 14/005,669, dated Apr. 26, 2018, 02 pages.

(Continued)

*Primary Examiner* — James M Anderson, II
(74) *Attorney, Agent, or Firm* — Chip Law Group

(57) ABSTRACT

The present technique relates to an image processing apparatus and method that allow to suppress an increase in processing time. The image processing apparatus includes an information control unit that obtains information required for image processing for a focused pixel, using only information belonging to a slice including the focused pixel, the focused pixel being a processing target, and the information being obtained using reference information belonging to a different pixel than the focused pixel; and an image processing unit that performs the image processing using the information obtained by the information control unit. The present disclosure can be applied to image processing apparatuses.

8 Claims, 35 Drawing Sheets

(51) Int. Cl.
*H04N 19/174* (2014.01)
*H04N 19/82* (2014.01)
*H04N 19/436* (2014.01)

(56) References Cited

U.S. PATENT DOCUMENTS

| | | |
|---|---|---|
| 2010/0303149 A1 | 12/2010 | Yasuda et al. |
| 2012/0039389 A1 | 2/2012 | Sjoberg et al. |
| 2012/0082241 A1 | 4/2012 | Tsai et al. |
| 2012/0106624 A1 | 5/2012 | Huang et al. |

FOREIGN PATENT DOCUMENTS

| | | | | |
|---|---|---|---|---|
| CA | 2714691 | A1 | 9/2009 | |
| CN | 101563926 | A | 10/2009 | |
| CN | 101926177 | A | 12/2010 | |
| DE | 602007010514 | | 12/2010 | |
| EP | 2123051 | A1 | 11/2009 | |
| EP | 2252063 | A1 * | 11/2010 | ........... H04N 19/176 |
| EP | 2252063 | A1 | 11/2010 | |
| ES | 2356023 | T3 | 4/2011 | |
| JP | 2010-514246 | A | 4/2010 | |
| JP | 2011-035620 | A | 2/2011 | |
| KR | 10-2009-0100402 | A | 9/2009 | |
| KR | 10-2010-0090307 | A | 8/2010 | |
| MX | 2010008978 | A | 9/2010 | |
| TW | 200948082 | A | 11/2009 | |
| TW | 201114265 | A | 4/2011 | |
| WO | 2008/075247 | A1 | 6/2008 | |
| WO | 2009/110559 | A1 | 9/2009 | |
| WO | 2011/013580 | A1 | 2/2011 | |
| WO | WO-2011013580 | A1 * | 2/2011 | ............. H04N 19/46 |

OTHER PUBLICATIONS

Final Rejection for U.S. Appl. No. 14/005,669, dated Feb. 22, 2018, 08 pages.
Non-Final Rejection for U.S. Appl. No. 14/005,669, dated Jul. 27, 2017, 14 pages.
Advisory Action for U.S. Appl. No. 14/005,669, dated May 12, 2017, 03 pages.
Final Rejection for U.S. Appl. No. 14/005,669, dated Feb. 23, 2017, 15 pages.
Non-Final Rejection for U.S. Appl. No. 14/005,669, dated Aug. 12, 2016, 16 pages.
International Search Report and Written Opinion of PCT Application No. PCT/JP2012/056810, dated Jun. 12, 2012, 13 pages of English Translation and 11 pages of ISRWO.
Chien, et al., "Adaptive Filter Based on Combination of Sum-Modified Laplacian filter Indexing and Quadtree Partitioning", ITU-Telecommunications Standardization Sector, Study Group 16 Question 6, (VCEG), Jul. 2009, pp. 1-3.
Fu, et al., "CE8 Subtest3 : Picture Quadtree Adaptive Offset", Joint Collaborative Team on Video Coding (JCT-VC) of ITU-T SG16 WP3 and ISO/IEC JTC1/SC29/WG11, Jan. 2011, pp. 1-26.
"Test Model under Consideration", Joint Collaborative Team on Video Coding (JCT-VC) of ITU-T-SG16 WP3 and ISO/IEC JTC1/SC29/WG11 , (Document: JCTVC-B205), Jul. 2010, 189 pages.
Office Action received for Chinese Patent Application No. 201280013677.8, dated May 4, 2016 07 pages of Office Action and 12 pages of English Translation.
International Preliminary Report on Patentability of PCT Application No. PCT/JP2012/056810, dated Oct. 3, 2013, 11 pages of English Translation and 07 pages of IPRP.

\* cited by examiner

IN CASE OF AVC:
VARIOUS TYPES OF
SLICES CAN BE MIXED

IN CASE OF MPEG-2:
FOR EXAMPLE, COMPOSED OF
B-SLICES ALL HAVING THE SAME TYPE

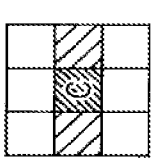
FIG. 20F 2-D 0-diagonal
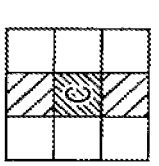
FIG. 20E 2-D cross
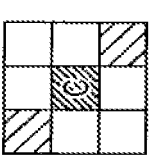
FIG. 20D 1-D 45-degree
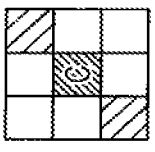
FIG. 20C 1-D 135-degree
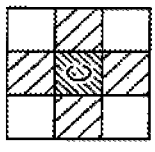
FIG. 20B 1-D 90-degree
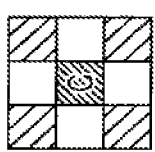
FIG. 20A 1-D 0-degree

| Category | Condition |
|---|---|
| 1 | C<2 neighboring pixels |
| 2 | C<1 neighbor && c == 1 neighbor |
| 3 | C>1 neighbor && c == 1 neighbor |
| 4 | C>2 neighbors |
| 0 | None of the above |

FIG. 21A    Classification rule for 1-D patterns

| Category | Condition |
|---|---|
| 1 | C<4 neighbors |
| 2 | C<3 neighbors && C=$4^{th}$ neighbor |
| 3 | C<3 neighbors && C>$4^{th}$ neighbor |
| 4 | C>3 neighbors && C<$4^{th}$ neighbor |
| 5 | C>3 neighbors && C=$4^{th}$ neighbor |
| 6 | C>4 neighbors |
| 0 | None of the above |

FIG. 21B    Classification rule for 2-D patterns

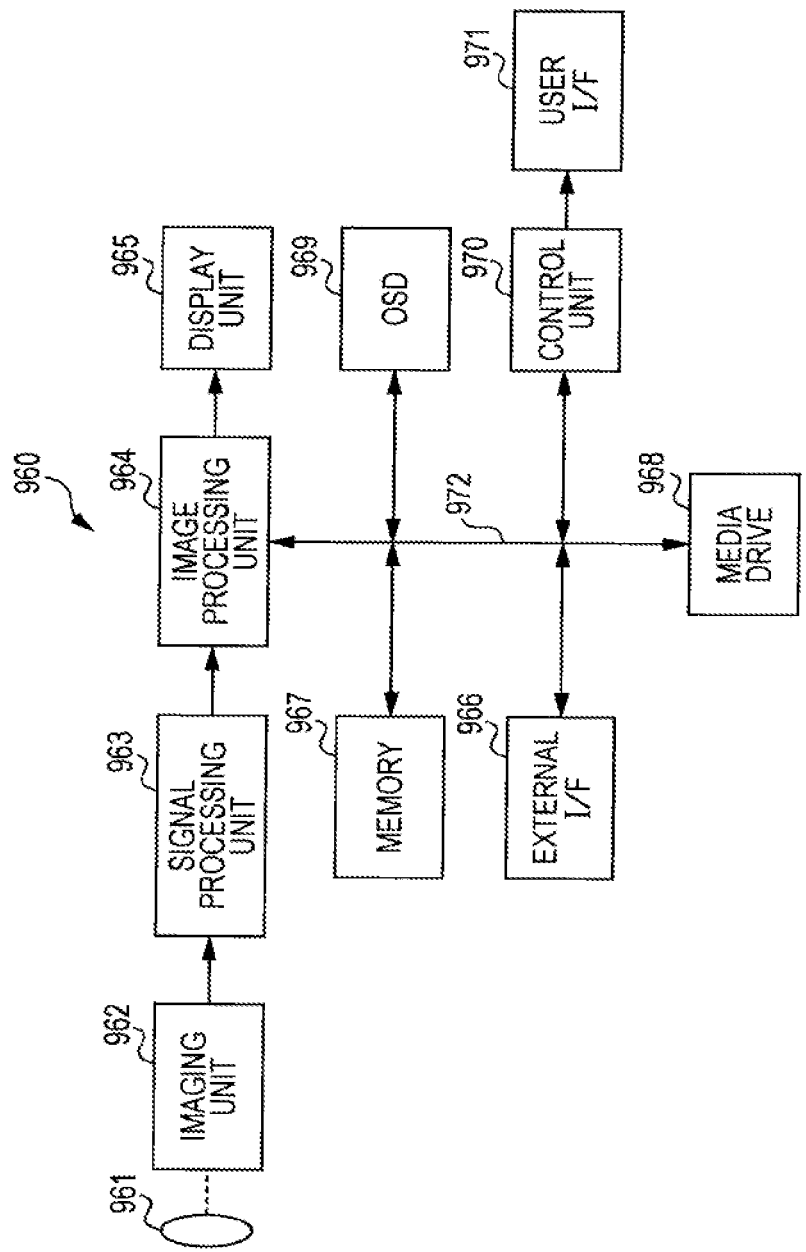

IMAGE PROCESSING APPARATUS AND METHOD

CROSS-REFERENCE TO RELATED APPLICATIONS

The present application is a continuation application of U.S. patent application Ser. No. 14/005,669, filed Sep. 17, 2013 which is a National Stage of PCT/JP2012/056810, filed Mar. 16, 2012, and claims the benefit of priority from prior Japanese Patent Applications JP 2011-229574, filed Oct. 19, 2011 and JP 2011-066211, filed Mar. 24, 2011, the entire content of which are hereby incorporated by reference.

TECHNICAL FIELD

The present disclosure relates to an image processing apparatus and method, and more particularly to an image processing apparatus and method that allow to suppress an increase in processing time.

BACKGROUND ART

In recent years, an apparatus that complies with a scheme such as MPEG (Moving Picture Experts Group) where image information is handled in digital form and at that time for the purpose of efficient transmission and accumulation of information, compression is performed by an orthogonal transform, such as a discrete cosine transform, and motion compensation, utilizing the redundancy unique to the image information has started to proliferate for both information distribution on broadcast stations, etc., and information reception in ordinary households.

In particular, MPEG2 (ISO (International Organization for Standardization)/IEC (International Electrotechnical Commission) 13818-2) is a standard defined as a general image coding scheme and covering both interlaced images and progressive images and standard definition images and high definition images, and is currently widely used in a wide range of applications for professional use and consumer use. By using the MPEG2 compression scheme, for example, by allocating a rate (bit rate) of 4 to 8 Mbps for a standard definition interlaced image with 720.times.480 pixels, and a rate (bit rate) of 18 to 22 Mbps for a high definition interlaced image with 1920.times.1088 pixels, a high compression rate and excellent image quality can be achieved.

MPEG2 is mainly targeted for high image quality coding compatible for broadcasting, but does not support a coding scheme with a lower rate (bit rate), i.e., a higher compression rate, than that of MPEG1. Due to the proliferation of portable terminals, the needs for such a coding scheme are expected to increase in the future, and correspondingly an MPEG4 coding scheme is standardized. For an image coding scheme, the standard thereof was approved as the International standard ISO/IEC 14496-2 in December 1998.

Furthermore, in recent years, for the initial purpose of image coding for videoconference, standardization of the standard called H.26L (ITU-T (International Telecommunication Union Telecommunication Standardization Sector) Q6/16 VCEG (Video Coding Expert Group)) has been pursued. It is known that although H.26L requires a larger amount of computation for its coding and decoding compared to conventional coding schemes such as MPEG2 and MPEG4, higher coding efficiency is achieved. In addition, at present, as part of MPEG4 activities, standardization that achieves higher coding efficiency by adopting, on the basis of this H.26L, functions not supported by H.26L is performed as Joint Model of Enhanced-Compression Video Coding.

For the standardization schedule, the standard became an international standard in March 2003 in the name of H.264 and MPEG-4 Part10 (Advanced Video Coding, hereinafter, referred to as AVC).

However, a macroblock size of 16 pixels.times.16 pixels may not be optimum for a large picture frame, like UHD (Ultra High Definition; 4000 pixels.times.2000 pixels) which may serve as a target for a next-generation coding scheme.

Hence, currently, for the purpose of further improving coding efficiency over AVC, standardization of a coding scheme called HEVC (High Efficiency Video Coding) is pursued by JCTVC (Joint Collaboration Team-Video Coding) which is a joint standardization organization of ITU-T and ISO/IEC (see, for example, Non-Patent Document 1).

In the HEVC coding scheme, a Coding Unit (CU) is defined as a processing unit similar to a macroblock in AVC. The size of the CU is not fixed at 16.times.16 pixels, like a macroblock in AVC, and is specified in image compression information in each sequence.

Meanwhile, for an Adaptive Loop Filter (ALF) used in such a coding scheme, the Wiener filter is applied for a reconstructed image to remove noise contained in the reconstructed image, enabling to improve coding efficiency and image quality.

As one of the techniques using ALF, there is proposed a method called class classification ALF where filter characteristics are switched using information that can be classified into a class by a decoder, to allow the filter characteristics to suit local conditions. For information used for class classification, in information used for class classification which is considered in the next-generation video coding standard HEVC, there is the magnitude of SML (Sum-Modified Laplacian) which is an operator for obtaining the complexity of texture. SML is calculated using the differences between a focused pixel and neighboring pixels.

In addition, HEVC adopts a method called an adaptive offset filter which is proposed in Non-Patent Document 2. In HEVC, the adaptive offset filter is provided between a deblocking filter and an adaptive loop filter.

For the kinds of adaptive offset, there are of two kinds called band offset and six kinds called edge offset, and furthermore, it is also possible not to adapt offset. Then, an image is partitioned into a quad-tree, and a selection can be made for each region as to which one of the above-described kinds of adaptive offset is to be used for coding. By using this method, coding efficiency can be improved.

In such edge offset of the adaptive offset filter, neighboring pixel values are referred to for calculation of an offset value for a focused pixel.

Meanwhile, in the above-described image coding schemes such as AVC and HEVC, for example, a method is prepared in which in order to parallelize processes, a picture is divided into a plurality of slices and a process is performed on a slice-by-slice basis.

CITATION LIST

Non-Patent Documents

Non-Patent Document 1: "Test Model under Consideration", JCTVC-B205, Joint Collaborative Team on Video Coding (JCT-VC) of ITU-T SG16 WP3 and ISO/IEC JTC1/SC29/

WG112nd Meeting: Geneva, CH, 21-28 Jul. 2010 Non-Patent Document 2: "CE8 Subtest 3: Picture Quality Adaptive Offset", JCTVC-D122, January 2011

SUMMARY OF THE INVENTION

Problems to be Solved by the Invention

However, when information used for ALF class classification (e.g., a pixel value of a reconstructed image) is present in a different slice than a focused slice which is a processing target, since information required for a filter process for the focused pixel which is the processing target is present in another slice (not present in the focused slice), unless the process for that slice has been completed, the process for the focused pixel cannot start.

In addition, likewise, in an adaptive offset filter process, when a neighboring pixel to be referred to is present in a different slice than a focused slice, an offset value for a focused pixel for edge offset cannot be calculated until the process for the slice in which the neighboring pixel is present has been completed.

That is, for example, when a focused pixel is present at an edge of a focused slice and a neighboring pixel to be referred to is located in another slice (neighboring slice), the process for the focused pixel (or the entire focused slice) cannot start until the process for the neighboring slice has been completed. In such a case, since the neighboring slice and the focused slice cannot be processed in parallel, the processing time increases, which may cause a reduction in throughput.

The present disclosure is made in view of such circumstances, and an object of the present disclosure is to allow to suppress an increase in processing time even when a focused pixel is processed by referring to neighboring pixels in image coding where a picture is divided into a plurality of slices and processes are performed in parallel on a slice-by-slice basis.

An image processing apparatus according to one aspect of the present disclosure includes: an information control unit that obtains information required for image processing for a focused pixel, using only information belonging to a slice including the focused pixel, the focused pixel being a processing target, and the information being obtained using reference information belonging to a different pixel than the focused pixel; and an image processing unit that performs the image processing using the information obtained by the information control unit.

The image processing is an adaptive loop filter process, the information control unit determines, as the information required for the image processing, a filter coefficient used in the adaptive loop filter process, and the image processing unit performs the adaptive loop filter process for the focused pixel, using the filter coefficient determined by the information control unit.

The image processing unit performs the adaptive loop filter process independently on a slice-by-slice basis, and the information control unit determines the filter coefficient without using information external to a focused slice being a processing target.

The information control unit includes: a position determination unit that determines whether a neighboring pixel of the focused pixel is located in the focused slice; a calculation unit that calculates information representing complexity of texture of the focused pixel, according to a result of the determination made by the position determination unit; a class classification unit that classifies the focused pixel into a class, according to magnitude of the information representing complexity of texture calculated by the calculation unit; and a filter coefficient setting unit that sets a value according to the class classified by the class classification unit, as the filter coefficient for the focused pixel.

The information representing complexity of texture is SML (Sum-Modified Laplacian).

When it is determined by the position determination unit that the neighboring pixel is not located in the focused slice, the calculation unit sets a predetermined, specified, fixed value as a pixel value of the neighboring pixel, and calculates the information representing complexity of texture.

When it is determined by the position determination unit that the neighboring pixel is not located in the focused slice, the calculation unit calculates the information representing complexity of texture, using a pixel value of the available pixel near the neighboring pixel instead of a pixel value of the neighboring pixel.

When it is determined by the position determination unit that the neighboring pixel is not located in the focused slice, the calculation unit calculates the information representing complexity of texture, using a pixel value of the focused pixel instead of a pixel value of the neighboring pixel.

The calculation unit calculates the information representing complexity of texture using, as neighboring pixels, four pixels adjacent above, below, and to left and right of the focused pixel.

The calculation unit sets, as the information representing complexity of texture, a sum total of absolute values of differences between a pixel value of the focused pixel and pixel values of the respective neighboring pixels.

When it is determined by the position determination unit that the neighboring pixel is not located in the focused slice, the filter coefficient setting unit sets a predetermined, specified value as the filter coefficient for the focused pixel.

When it is determined by the position determination unit that the neighboring pixel is not located in the focused slice, the image processing unit omits the adaptive loop filter process for the focused pixel.

The image processing further includes a flag generation unit that generates a flag indicating whether to perform an adaptive loop filter process for the focused slice independently of other slices, wherein the image processing unit performs the adaptive loop filter process for the focused pixel in the focused slice, according to a value of the flag generated by the flag generation unit.

The image processing is an adaptive offset process, and the information control unit determines, as the information required for image processing, a neighboring pixel value used in the adaptive offset process, and the image processing unit performs the adaptive offset process for the focused pixel, using the neighboring pixel value determined by the information control unit.

The information control unit includes: a position determination unit that determines whether a neighboring pixel of the focused pixel is located in the focused slice; and a neighboring pixel value determination unit that determines the neighboring pixel value, according to a result of the determination made by the position determination unit.

When it is determined by the position determination unit that the neighboring pixel is not located in the focused slice, the neighboring pixel value determination unit determines a predetermined, specified, fixed value to be the neighboring pixel value.

When it is determined by the position determination unit that the neighboring pixel is not located in the focused slice, the neighboring pixel value determination unit determines a pixel value of an available pixel near the neighboring pixel to be the neighboring pixel value.

When it is determined by the position determination unit that the neighboring pixel is not located in the focused slice, the neighboring pixel value determination unit determines a pixel value of the focused pixel to be the neighboring pixel value.

The image processing apparatus further includes a flag generation unit that generates a flag indicating whether to perform an adaptive offset process for the focused slice independently of other slices, wherein the image processing unit performs the adaptive offset process for the focused pixel in the focused slice, according to a value of the flag generated by the flag generation unit.

An image processing method for an image processing apparatus according to one aspect of the present technique includes: obtaining, by an information control unit, information required for image processing for a focused pixel, using only information belonging to a slice including the focused pixel, the focused pixel being a processing target, and the information being obtained using reference information belonging to a different pixel than the focused pixel; and performing, by an image processing unit, the image processing using the information obtained by the information control unit.

Solutions to Problems

In one aspect of the present disclosure, information required for image processing for a focused pixel being a processing target, and obtained using reference information belonging to a different pixel than the focused pixel, is obtained using only information belonging to a slice including the focused pixel, and the image processing is performed using the obtained information.

Effects of the Invention

According to the present disclosure, images can be processed. In particular, an increase in processing time can be suppressed.

BRIEF DESCRIPTION OF DRAWINGS

FIGS. 20A, 20B, 20C, 20D, 20E, and 20F are diagrams describing edge offset.

FIGS. 21A and 21B are diagrams showing classification rules for edge offset.

FIG. 36 is a block diagram showing an example of a schematic configuration of an imaging apparatus.

MODE FOR CARRYING OUT THE INVENTION

Modes for carrying out the present technique (hereinafter, referred to as embodiments) will be described below. Note that the description is made in the following order:
1. First embodiment (image coding apparatus)
2. Second embodiment (image decoding apparatus)
3. Third embodiment (image coding apparatus)
4. Fourth embodiment (image decoding apparatus)
5. Fifth embodiment (personal computer)
6. Sixth embodiment (television receiver)

7. Seventh embodiment (mobile phone)
8. Eighth embodiment (recording/reproducing apparatus)
9. Ninth embodiment (imaging apparatus)

1. First Embodiment

[Image Coding Apparatus]

Figure 1:
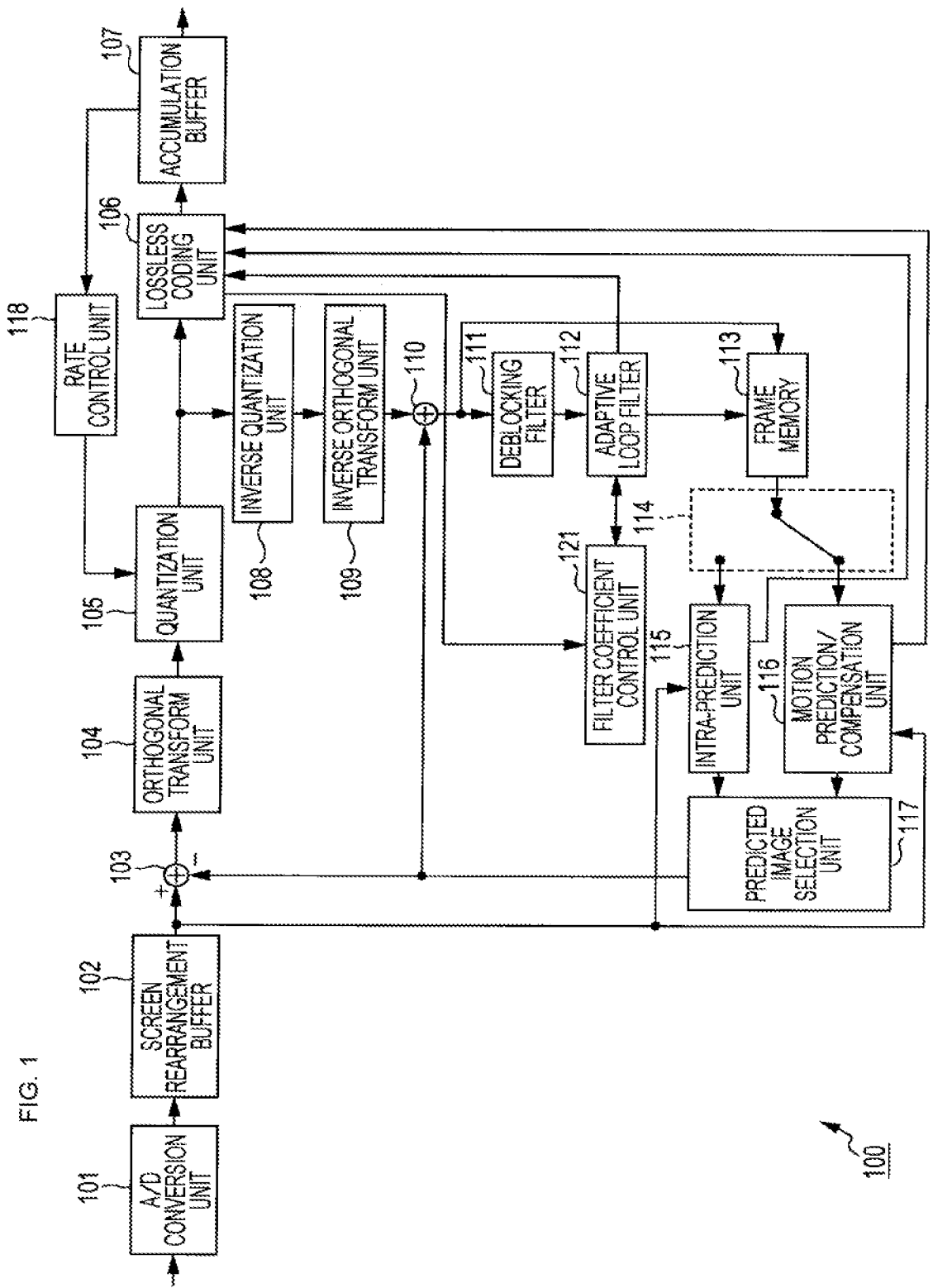
FIG. 1 is a block diagram showing an exemplary main configuration of an image coding apparatus.

FIG. 1 is a block diagram showing an exemplary main configuration of an image coding apparatus.

An image coding apparatus 100 shown in FIG. 1 codes image data using a prediction process like an H.264 and MPEG (Moving Picture Experts Group) 4 Part10 (AVC (Advanced Video Coding)) coding scheme.

As shown in FIG. 1, the image coding apparatus 100 has an A/D conversion unit 101, a screen rearrangement buffer 102, a computing unit 103, an orthogonal transform unit 104, a quantization unit 105, a lossless coding unit 106, and an accumulation buffer 107. In addition, the image coding apparatus 100 has an inverse quantization unit 108, an inverse orthogonal transform unit 109, a computing unit 110, a deblocking filter 111, an adaptive loop filter 112, a frame memory 113, a selection unit 114, an intra-prediction unit 115, a motion prediction/compensation unit 116, a predicted image selection unit 117, and a rate control unit 118.

The image coding apparatus 100 further has a filter coefficient control unit 121.

The A/D conversion unit 101 A/D converts inputted image data and supplies the converted image data (digital data) to the screen rearrangement buffer 102 to store the data. The screen rearrangement buffer 102 rearranges stored images of frames in display order, in frame order for coding according to a GOP (Group Of Picture), and supplies the images whose frame order has been rearranged to the computing unit 103. In addition, the screen rearrangement buffer 102 also supplies the images whose frame order has been rearranged to the intra-prediction unit 115 and the motion prediction/compensation unit 116.

The computing unit 103 subtracts a predicted image supplied from the intra-prediction unit 115 or the motion prediction/compensation unit 116 through the predicted image selection unit 117, from an image read from the screen rearrangement buffer 102 and outputs difference information thereabout to the orthogonal transform unit 104. For example, in the case of an image to be subjected to inter-coding, the computing unit 103 subtracts a predicted image supplied from the motion prediction/compensation unit 116, from an image read from the screen rearrangement buffer 102.

The orthogonal transform unit 104 performs an orthogonal transform, such as a discrete cosine transform or a Karhunen-Loeve transform, on the difference information supplied from the computing unit 103. Note that the orthogonal transform method may be any method. The orthogonal transform unit 104 supplies a transform coefficient obtained by the orthogonal transform to the quantization unit 105.

The quantization unit 105 quantizes the transform coefficient supplied from the orthogonal transform unit 104. The quantization unit 105 sets a quantization parameter based on information about a target value for rate supplied from the rate control unit 118, and performs the quantization. Note that the quantization method may be any method. The quantization unit 105 supplies the quantized transform coefficient to the lossless coding unit 106.

The lossless coding unit 106 codes, by any coding scheme, the transform coefficient quantized by the quantization unit 105. Since coefficient data is quantized under the control of the rate control unit 118, the rate is the target value set by the rate control unit 118 (or close to the target value).

In addition, the lossless coding unit 106 obtains information indicating intra-prediction mode, etc., from the intra-prediction unit 115 and obtains information indicating inter-prediction mode, motion vector information, etc., from the motion prediction/compensation unit 116. The lossless coding unit 106 further obtains alf_flag, etc., supplied from the adaptive loop filter 112.

The lossless coding unit 106 codes those various types of information by any coding scheme, and includes the coded information as a part of header information of coded data (multiplexing). The lossless coding unit 106 supplies coded data obtained by the coding to the accumulation buffer 107 to accumulate the coded data.

The coding scheme for the lossless coding unit 106 includes, for example, variable-length coding, arithmetic coding, or the like. Variable-length coding includes, for example, CAVLC (Context-Adaptive Variable Length Coding) defined by the H.264/AVC scheme, etc. Arithmetic coding includes, for example, CABAC (Context-Adaptive Binary Arithmetic Coding), etc.

The accumulation buffer 107 temporarily holds the coded data supplied from the lossless coding unit 106. The accumulation buffer 107 outputs, at specified timing, the held coded data to, for example, a recoding apparatus (recording medium), a transmission line, etc., provided at a subsequent stage which are not shown.

In addition, the transform coefficient quantized by the quantization unit 105 is also supplied to the inverse quantization unit 108. The inverse quantization unit 108 inverse quantizes the quantized transform coefficient by a method appropriate to the quantization performed by the quantization unit 105. The inverse quantization method may be any method as long as the method is appropriate to the quantization process performed by the quantization unit 105. The inverse quantization unit 108 supplies the obtained transform coefficient to the inverse orthogonal transform unit 109.

The inverse orthogonal transform unit 109 performs an inverse orthogonal transform on the transform coefficient supplied from the inverse quantization unit 108, by a method appropriate to the orthogonal transform process performed by the orthogonal transform unit 104. The inverse orthogonal transform method may be any method as long as the method is appropriate to the orthogonal transform process performed by the orthogonal transform unit 104. An inverse orthogonal transformed output (reconstructed difference information) is supplied to the computing unit 110.

The computing unit 110 adds a predicted image supplied from the intra-prediction unit 115 or the motion prediction/compensation unit 116 through the predicted image selection unit 117, to the inverse orthogonal transform result, i.e., the reconstructed difference information, supplied from the inverse orthogonal transform unit 109, and thereby obtains a locally decoded image (decoded image). The decoded image is supplied to the deblocking filter 111 or the frame memory 113.

The deblocking filter 111 performs a deblocking filter process on the decoded image and thereby removes blockiness in the decoded image. The deblocking filter 111 supplies the filter-processed decoded image to the adaptive loop filter 112.

The adaptive loop filter 112 performs, using the Wiener Filter, a loop filter process on the deblocking filter processing result (the decoded image having been subjected to the removal of blockiness), and thereby improves image quality.

The adaptive loop filter 112 performs class classification ALF where a focused pixel which is a processing target is classified into a class, and a filter process for the focused pixel is performed using a filter coefficient obtained according to the class. Note that the adaptive loop filter 112 performs this filter process on a slice-by-slice basis.

The adaptive loop filter 112 supplies the filter processing result (the filter-processed decoded image) to the frame memory 113. Note that, as described above, the decoded image outputted from the computing unit 110 can be supplied to the frame memory 113 without passing through the deblocking filter 111 and the adaptive loop filter 112. For example, as a reference image used for an intra-prediction, an image whose filter processes by the deblocking filter 111 and the adaptive loop filter 112 are omitted is stored in the frame memory 113.

The frame memory 113 stores the supplied decoded image and supplies, as a reference image, the stored decoded image to the selection unit 114 at specified timing.

The selection unit 114 selects a supply destination of the reference image supplied from the frame memory 113. For example, in the case of an intra-prediction, the selection unit 114 supplies the reference image supplied from the frame memory 113, to the intra-prediction unit 115. In addition, for example, in the case of an inter-prediction, the selection unit 114 supplies the reference image supplied from the frame memory 113, to the motion prediction/compensation unit 116.

The intra-prediction unit 115 performs an intra-prediction (intra-screen prediction) using an input image supplied from the screen rearrangement buffer 102 and the reference image supplied from the frame memory 113 through the selection unit 114, and basically using a PU as a processing unit. When the intra-prediction unit 115 selects an optimum intra-prediction mode, the intra-prediction unit 115 supplies a predicted image created in the optimum mode to the predicted image selection unit 117. In addition, as described above, the intra-prediction unit 115 supplies, where appropriate, intra-prediction mode information indicating the adopted intra-prediction mode, etc., to the lossless coding unit 106 to code the information.

The motion prediction/compensation unit 116 performs a motion prediction (inter-prediction) using an input image supplied from the screen rearrangement buffer 102 and the reference image supplied from the frame memory 113 through the selection unit 114, and basically using a PU as a processing unit, and performs a motion compensation process according to a detected motion vector, and thereby creates a predicted image (inter-predicted image information). The motion prediction/compensation unit 116 performs such an inter-prediction in a plurality of modes (inter-prediction modes) prepared in advance.

The motion prediction/compensation unit 116 creates predicted images in all candidate inter-prediction modes, and evaluates cost function values for the respective predicted images to select an optimum mode. When the motion prediction/compensation unit 116 selects an optimum inter-prediction mode, the motion prediction/compensation unit 116 supplies the predicted image created in the optimum mode to the predicted image selection unit 117.

In addition, the motion prediction/compensation unit 116 supplies information indicating the adopted inter-prediction mode, information required to perform a process in the adopted inter-prediction mode when decoding coded data, etc., to the lossless coding unit 106 to code those pieces of information.

The predicted image selection unit 117 selects a supply source (the intra-prediction unit 115 or the motion prediction/compensation unit 116) of a predicted image to be supplied to the computing unit 103 and the computing unit 110, and supplies the predicted image supplied from the selected processing unit, to the computing unit 103 and the computing unit 110.

The rate control unit 118 controls the rate of the quantization operation of the quantization unit 105 based on the rate of the coded data accumulated in the accumulation buffer 107, so as to prevent the occurrence of overflows or underflows.

The filter coefficient control unit 121 sets a filter coefficient for a filter process performed by the adaptive loop filter 112. The filter coefficient control unit 121 classifies a focused pixel which is a processing target into a class, and sets a filter coefficient according to the class. The filter coefficient control unit 121 performs this filter coefficient setting (class classification) without using information in other slices than a focused slice to which the focused pixel which is the processing target belongs. That is, the filter coefficient control unit 121 secures the independence of slice-by-slice processes upon setting a filter coefficient.

[Multislice]

In image coding schemes such as MPEG2 and AVC, one picture is divided into a plurality of slices, and the slices can be processed in parallel (multislice).

Figure 2B:
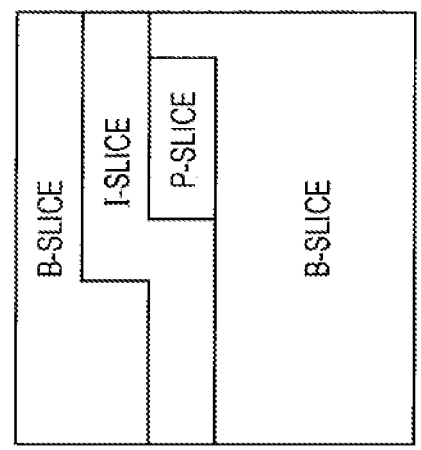
FIGS. 2A and 2B are diagrams describing multislice.
Figure 2A:
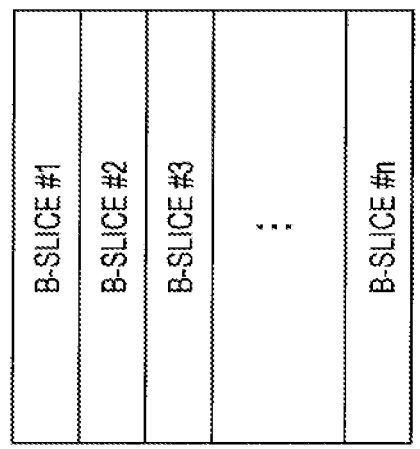

In the case of MPEG2, as shown in the example in FIG. 2A, the maximum slice size is one macroblock line, and all of the slices composing a B-picture need to be B-slices.

On the other hand, in the case of AVC, as shown in the example in FIG. 2B, a slice may be larger than one macroblock line, and a slice boundary does not need to be at the right edge of a macroblock line (the right edge of a screen), and a single picture may be composed of different types of slices.

In the case of AVC, a deblocking filter process can be performed across slice boundaries. Note, however, that processes using adjacent information, such as an adaptive loop filter process, an intra-prediction, CABAC, CAVLC, and a motion vector prediction, cannot be performed across slice boundaries.

In other words, since coding processes for the respective slices can be performed independently of each other, one picture is divided into a plurality of slices, and the slices can be coded in parallel. That is, by such a slice division, a reduction in coding processing time (an increase in the speed of a coding process) can be achieved.

[Coding Unit]

Meanwhile, in the AVC coding scheme, a macroblock or a sub-macroblock which is one of a plurality of sub-macroblocks into which the macroblock is divided is used as a processing unit for a prediction process, a coding process, etc. However, a macroblock size of 16 pixels.times.16 pixels is not optimum for a large picture frame, like UHD (Ultra High Definition; 4000 pixels.times.2000 pixels) which may serve as a target for a next-generation coding scheme.

Hence, currently, for the purpose of further improving coding efficiency over AVC, standardization of a coding scheme called HEVC (High Efficiency Video Coding) is pursued by JCTVC (Joint Collaboration Team-Video Coding) which is a joint standardization organization of ITU-T (International Telecommunication Union Telecommunication Standardization Sector) and ISO (International Organization for Standardization)/IEC (International Electrotechnical Commission).

Figure 3:
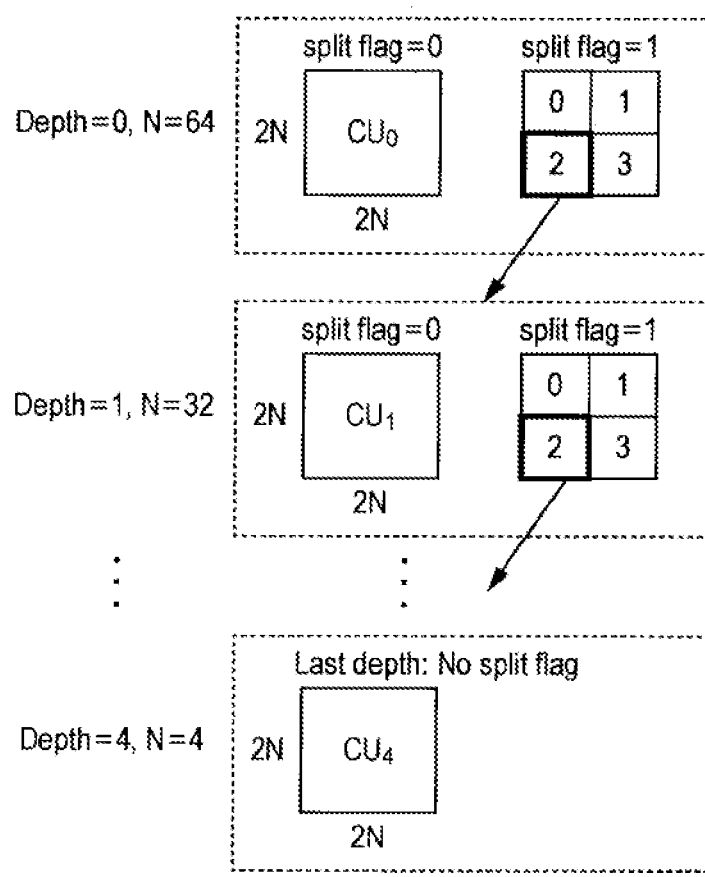
FIG. 3 is a diagram describing a coding unit.

While in AVC a hierarchical structure including macroblocks and sub-macroblocks is defined, in HEVC, as shown in FIG. 3, a Coding Unit (CU) is defined.

A CU is also called a Coding Tree Block (CTB) and is a partial region of an image in picture units, which plays the same role as a macroblock in AVC. While the latter is fixed at a 16.times.16 pixel size, the size of the former is not fixed and thus is specified in image compression information in each sequence.

For example, in a Sequence Parameter Set (SPS) included in coded data which serves as an output, the largest CU size (LCU (Largest Coding Unit)) and the smallest CU size ((SCU (Smallest Coding Unit)) are defined.

In each LCU, by setting split-flag to 1 within a range that does not fall below the size of the SCU, the LCU can be split into CUs with a smaller size. In the example of FIG. 3, the size of the LCU is 128 and the maximum hierarchical depth is 5. When the value of split_flag is "1", a CU with a size of 2N.times.2N is split into CUs with a size of N.times.N which is one lower level.

Furthermore, a CU is split into Prediction Units (PUs) which are regions serving as processing units for an intra- or inter-prediction (partial regions of an image in picture units), and is split into Transform Units (TUs) which are regions serving as processing units for an orthogonal transform (partial regions of an image in picture units). At present, in HEVC, in addition to 4.times.4 and 8.times.8, 16.times.16 and 32.times.32 orthogonal transforms can be used.

In the case of a coding scheme where a CU is defined and various types of processes are performed using the CU as a unit, like the above-described HEVC, it can be considered that a macroblock in AVC corresponds to an LCU. Note, however, that since the CU has a hierarchical structure as shown in FIG. 3, it is common that the size of the LCU at the highest level is set to be larger than the macroblock in AVC, e.g., 128.times.128 pixels.

The present disclosure can also be applied to a coding scheme that uses such CUs, PUs, TUs, and the like, instead of macroblocks. Namely, the processing unit used for a prediction process may be any region. That is, in the following, a processing target region (also referred to as the region or focused region) for a prediction process and neighboring regions which are regions located in the neighborhood of the focused region include not only such macroblocks and sub-macroblocks, but also CUs, PUs, TUs, and the like.

Figure 4:
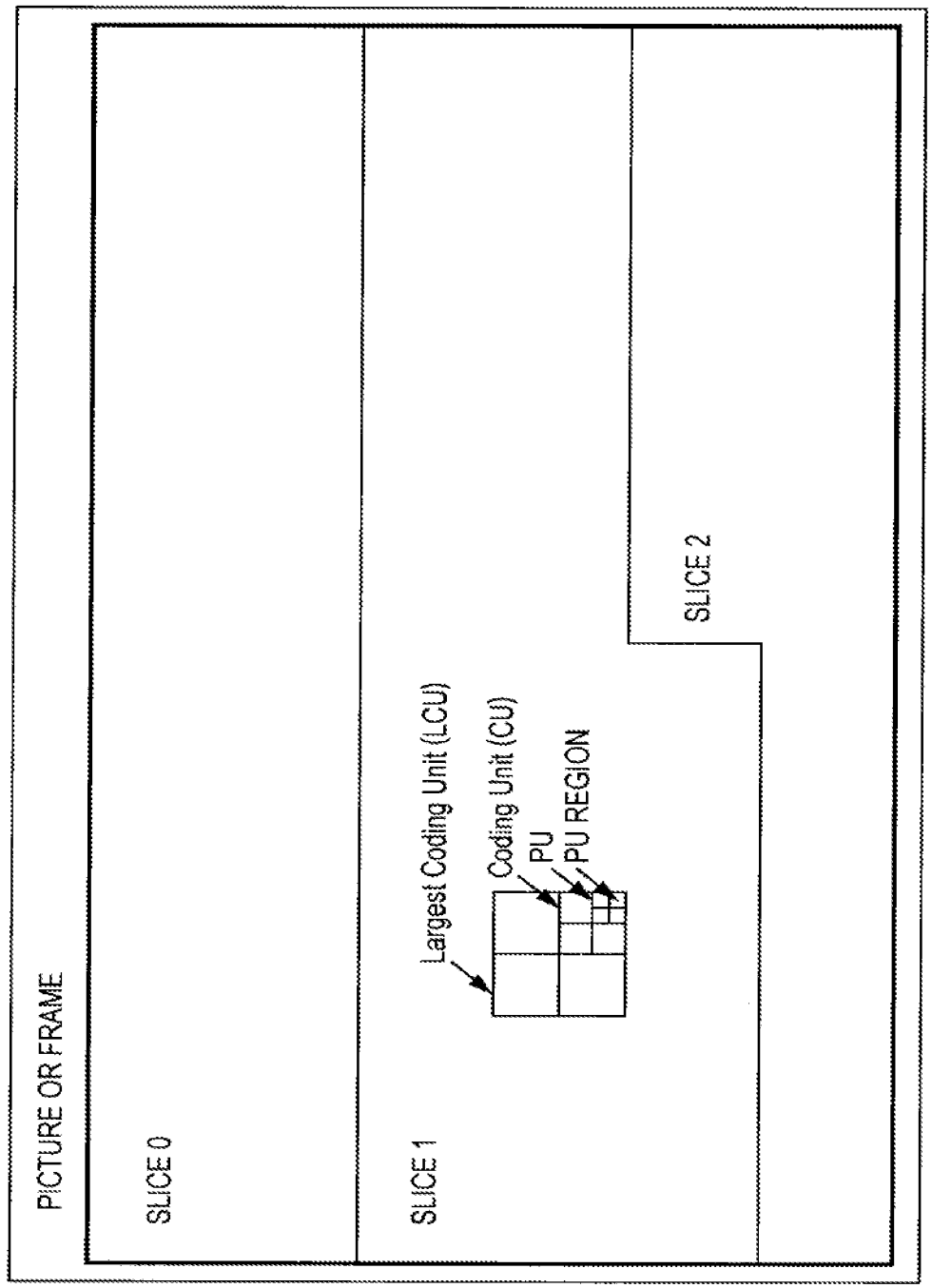
FIG. 4 is a diagram describing the relationship between a slice and a coding unit.

LCUs (CUs, PUs, and TUs) such as those described above are a plurality of regions into which a slice region is divided, and belong to a lower layer of the slice. That is, in the case of multislice such as that described in FIGS. 2A and 2B, as shown in FIG. 4, an LCU is included in any of the slices.

Figure 5:
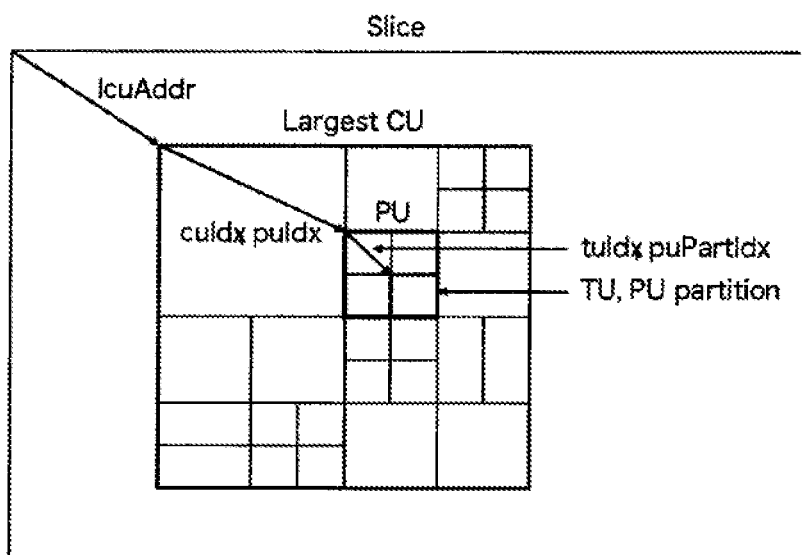
FIG. 5 is a diagram describing the relationship between a slice and a coding unit.

As shown in FIG. 5, the starting address of an LCU is specified by a relative position from the start of each slice. For each region (CU, PU, and TU) in the LCU, identification information and size are specified. That is, the position of each pixel can be identified from those pieces of information. Therefore, the positions of a focused pixel which is a processing target and its neighboring pixels and the range of a focused slice can be easily identified from those pieces of information. In other words, whether the neighboring pixels belong to the focused slice (whether available or unavailable) can be easily identified.

[Computation of a Filter Coefficient]

The filter coefficient control unit 121 determines, using only available information, a filter coefficient which is used in an adaptive loop filter process for a focused pixel. More specifically, the filter coefficient control unit 121 classifies the focused pixel into a class and sets a value according to the classified class, as a filter coefficient for the focused pixel. For the class classification, the filter coefficient control unit 121 calculates SML (Sum-Modified Laplacian). The SML is an operator for obtaining the complexity of texture. That is, the filter coefficient control unit 121 classifies the focused pixel into a class, according to the magnitude of the SML.

The filter coefficient control unit 121 calculates the SML using only available information. For example, the filter coefficient control unit 121 performs calculation using the pixel value of a focused pixel and the pixel values of available neighboring pixels located in the neighborhood of the focused pixel. The neighboring pixels may be any pixel as long as the pixel is available, but basically those pixels closer in position to the focused pixel have higher correlation and thus are desirable.

Figure 6:
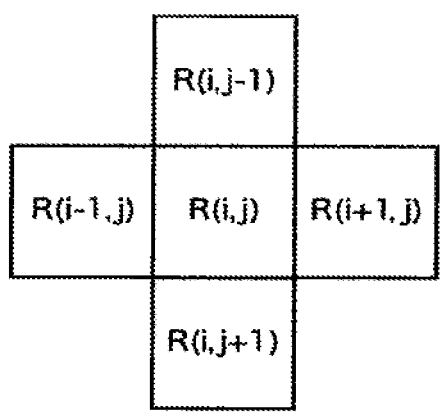
FIG. 6 is a diagram describing class classification ALF.

For example, as shown in FIG. 6, the filter coefficient control unit 121 calculates the SML (i, j) of a focused pixel (i, j) as shown in the following equation (1), using the pixel value R (i, j) of the focused pixel, the pixel value R(i−1, j) of a neighboring pixel adjacent to the left of the focused pixel, the pixel value R (i+1, j) of a neighboring pixel adjacent to the right of the focused pixel, the pixel value R (i, j−1) of a neighboring pixel adjacent above the focused pixel, and the pixel value R (i, j+1) of a neighboring pixel adjacent below the focused pixel. Note that the pixel value of the pixel in the position (i, j) is R (i, j).

$$SML(i,j)=|2.times.R(i,j)-R(i-1,j)-R(i+1,j)|+ |2.times.R(i,j)-R(i,j-1)-R(i-,j+1)| \quad (1)$$

The filter coefficient control unit 121 classifies the focused pixel into a class based on the magnitude of the SML (i, j), and sets a value according to the class as a filter coefficient for the focused pixel.

[Class Classification ALF for Multislice]

As described above, in class classification ALF, upon class classification of a focused pixel, the pixel values of neighboring pixels are referred to. However, in the case of multislice such as that described above, there is a possibility that a neighboring pixel which may be referred to may be located in a different slice than a slice where the focused pixel is present.

FIGS. 7 to 10 show examples of the positional relationship between multislice and a focused region and neighboring regions in class classification ALF.

Figure 7:
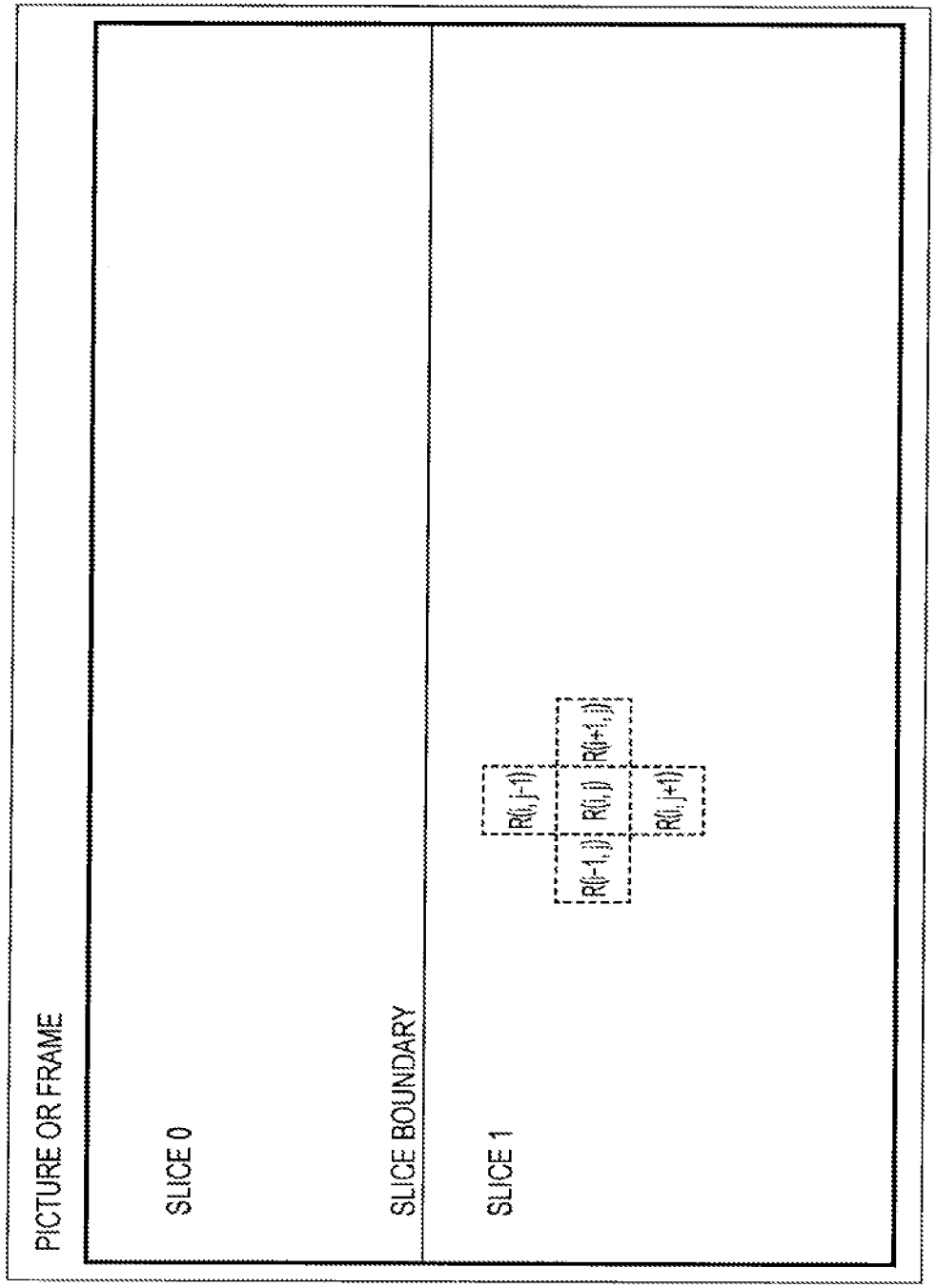
FIG. 7 is a diagram showing an example of the positions of a focused region and neighboring regions for class classification ALF in multislice.

FIG. 7 shows a state in which a focused pixel (i, j) and neighboring pixels adjacent above, below, and to the left and right of the focused pixel are all located in one slice (slice 1) (belong to a focused slice). Note that i represents the position in the horizontal direction of the pixel, and j represents the position in the vertical direction of the pixel. In addition, the upper left edge of the slice is the origin (0, 0).

In this case, in class classification of the focused pixel (SML calculation), the filter coefficient control unit 121 can refer to the pixel values of all neighboring pixels (available).

Figure 8:
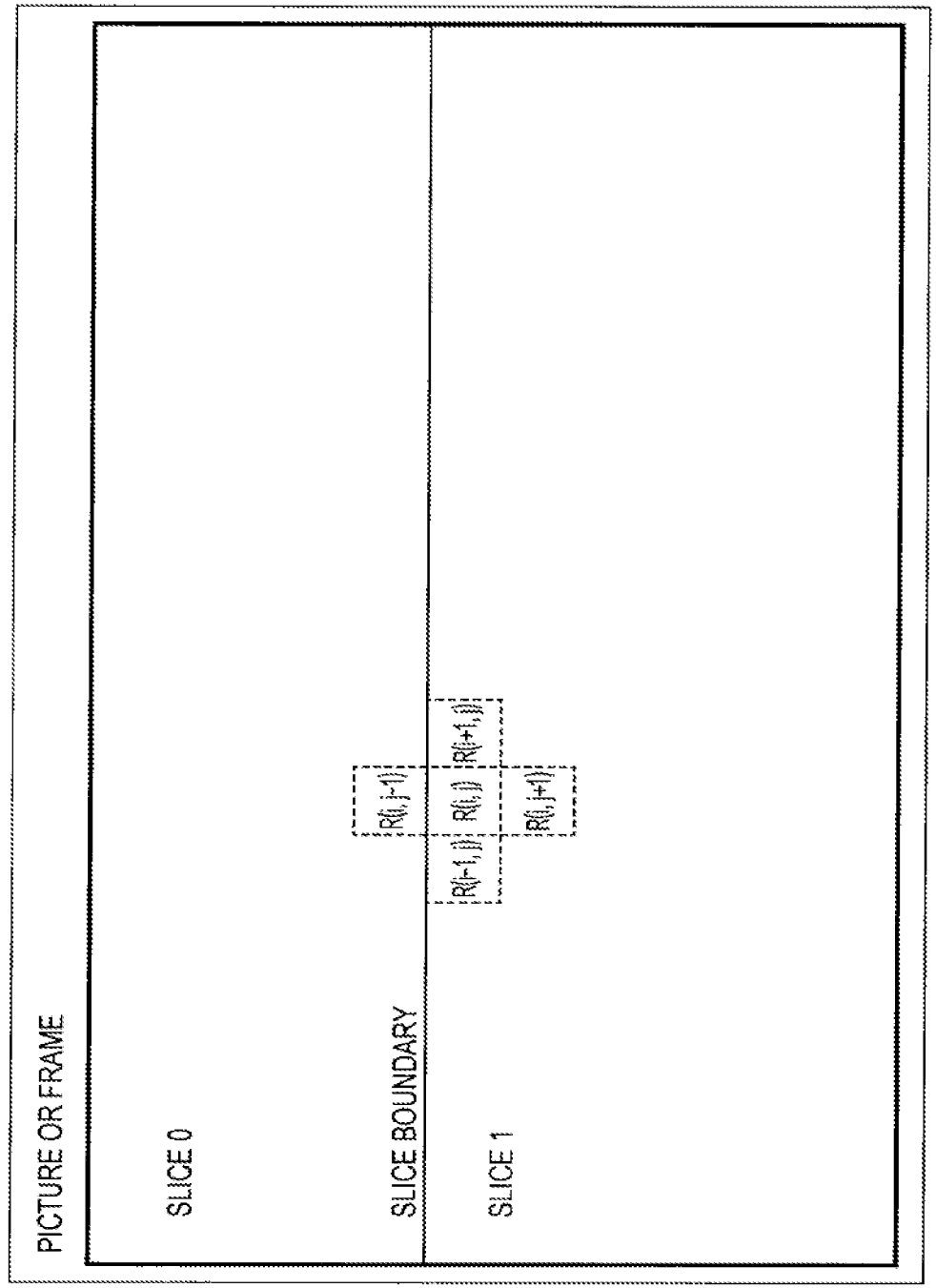
FIG. 8 is a diagram showing another example of the positions of a focused region and neighboring regions for class classification ALF in multislice.

FIG. 8 shows a state in which although a focused pixel (i, j), a neighboring pixel (i, j+1) adjacent below the focused pixel, a neighboring pixel (i−1, j) adjacent to the left of the focused pixel, and a neighboring pixel (i+1, j) adjacent to the right of the focused pixel are located in slice 1 (belong to a focused slice), a neighboring pixel (i, j−1) adjacent above the focused pixel is located in slice 0 (not belong to the focused slice).

In this case, the filter coefficient control unit 121 can refer to the neighboring pixel (i, j+1), the neighboring pixel (i−1, j), and the neighboring pixel (i+1, j) (available), but cannot refer to the neighboring pixel (i, j−1) (unavailable).

Figure 9:
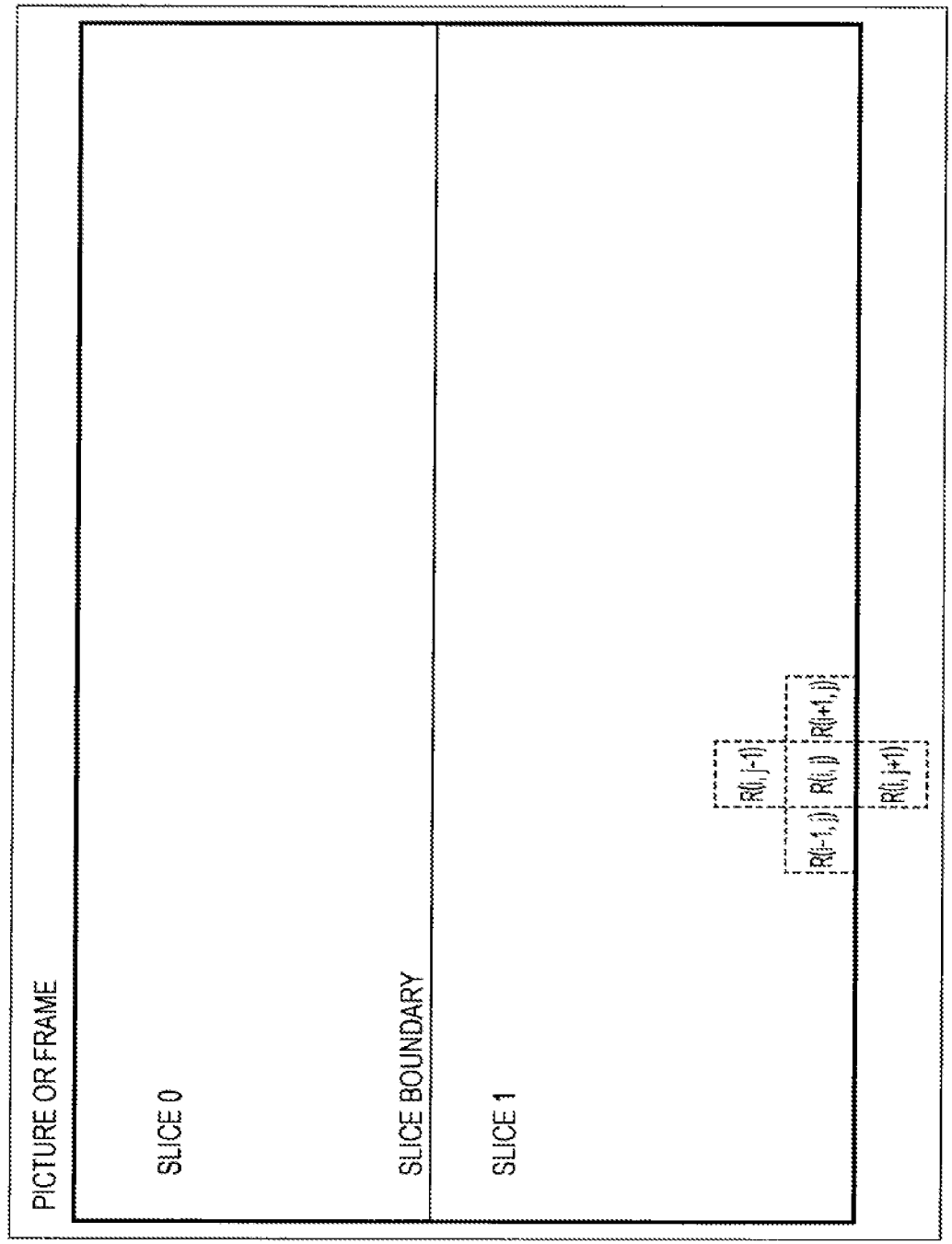
FIG. 9 is a diagram showing still another example of the positions of a focused region and neighboring regions for class classification ALF in multislice.

FIG. 9 shows a state in which although a focused pixel (i, j), a neighboring pixel (i, j−1) adjacent above the focused pixel, a neighboring pixel (i−1, j) adjacent to the left of the focused pixel, and a neighboring pixel (i+1, j) adjacent to the right of the focused pixel are located in slice 1 (belong to a focused slice), a neighboring pixel (i, j+1) adjacent below the focused pixel is located outside a picture or a frame (not present).

In this case, the filter coefficient control unit 121 can refer to the neighboring pixel (i, j−1), the neighboring pixel (i−1, j), and the neighboring pixel (i+1, j) (available), but cannot refer to the neighboring pixel (i, j+1) (unavailable).

Figure 10:
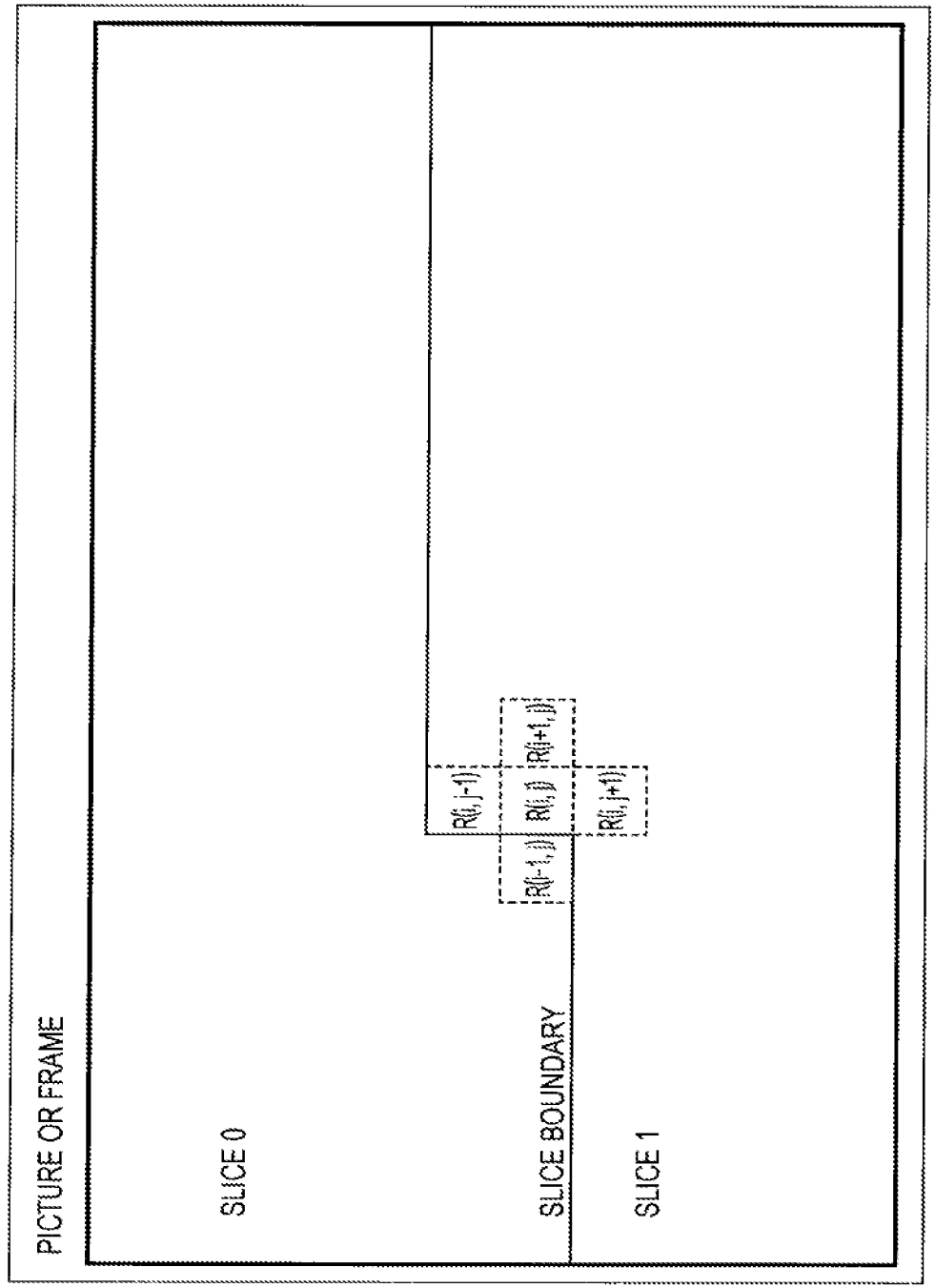
FIG. 10 is a diagram showing yet another example of the positions of a focused region and neighboring regions for class classification ALF in multislice.

FIG. 10 shows a state in which although a focused pixel (i, j), a neighboring pixel (i, j−1) adjacent above the focused pixel, a neighboring pixel (i, j+1) adjacent below the focused pixel, and a neighboring pixel (i+1, j) adjacent to the right of the focused pixel are located in slice 1 (belong to a focused slice), a neighboring pixel (i−1, j) adjacent to the left of the focused pixel is located in slice 0 (not belong to the focused slice).

In this case, the filter coefficient control unit 121 can refer to the neighboring pixel (i, j−1), the neighboring pixel (i, j+1), and the neighboring pixel (i+1, j) (available), but cannot refer to the neighboring pixel (i−1, j) (unavailable).

Note that as shown in FIG. 9 slice boundaries not only include a boundary between slices, but also include a picture edge. The important thing is that whether the pixel values of neighboring pixels are available, i.e., whether neighboring pixels are included in a focused slice. Therefore, the state of the pixel value of a neighboring pixel being unavailable not only includes the case in which the neighboring pixel belongs to another slice, but also includes the case in which the neighboring pixel is not present (located outside the picture).

Note that the case is also considered in which a plurality of neighboring pixels are not included in a focused slice, e.g., a neighboring pixel (i, j−1) and a neighboring pixel (i−1, j) are unavailable. That is, the positional relationship between a slice boundary and a focused pixel is not limited to the examples shown in FIGS. 7 to 10.

When, as shown in FIGS. 8 to 10, the pixel value of at least one of the neighboring pixels is unavailable, the filter coefficient control unit 121 calculates the SML of the focused pixel without using that pixel value.

The SML is an operator for obtaining the complexity of texture, and thus, can also be said to be a parameter indicating the strength of the pixel-value correlation of a focused region with neighboring pixels. Hence, the filter coefficient control unit 121 may calculate SML using, instead of the pixel value of an unavailable neighboring pixel, for example, the pixel value of an available pixel located near the neighboring pixel (including a pixel adjacent to the neighboring pixel), utilizing the pixel-value correlation between pixels. Furthermore, as the pixel near the neighboring pixel, the filter coefficient control unit 121 may use, for example, the pixel value of a focused pixel to calculate SML.

Furthermore, for example, to facilitate computation, the filter coefficient control unit 121 may calculate SML using a specified, fixed value instead of the pixel value of an unavailable neighboring pixel.

Of course, other methods may be used. For example, the filter coefficient control unit 121 may calculate, by specified computation, a value used instead of the pixel value of an unavailable neighboring pixel, using the pixel value(s) of one or a plurality of other available pixels, and calculate SML using the value.

By doing so, the filter coefficient control unit 121 can perform calculation of the SML of each pixel, i.e., class classification and calculation of a filter coefficient, without referring to information in other slices. That is, the filter coefficient control unit 121 can perform those processes independently on a slice-by-slice basis. Therefore, the adaptive loop filter 112 can perform an adaptive loop filter process independently on a slice-by-slice basis. Even in the case of multislice, the adaptive loop filter 112 can suppress a reduction in the throughput of an adaptive loop filter process. That is, the image coding apparatus 100 can suppress an increase in the processing time of a coding process.

[Adaptive Loop Filter and Filter Coefficient Control Unit]

Figure 11:
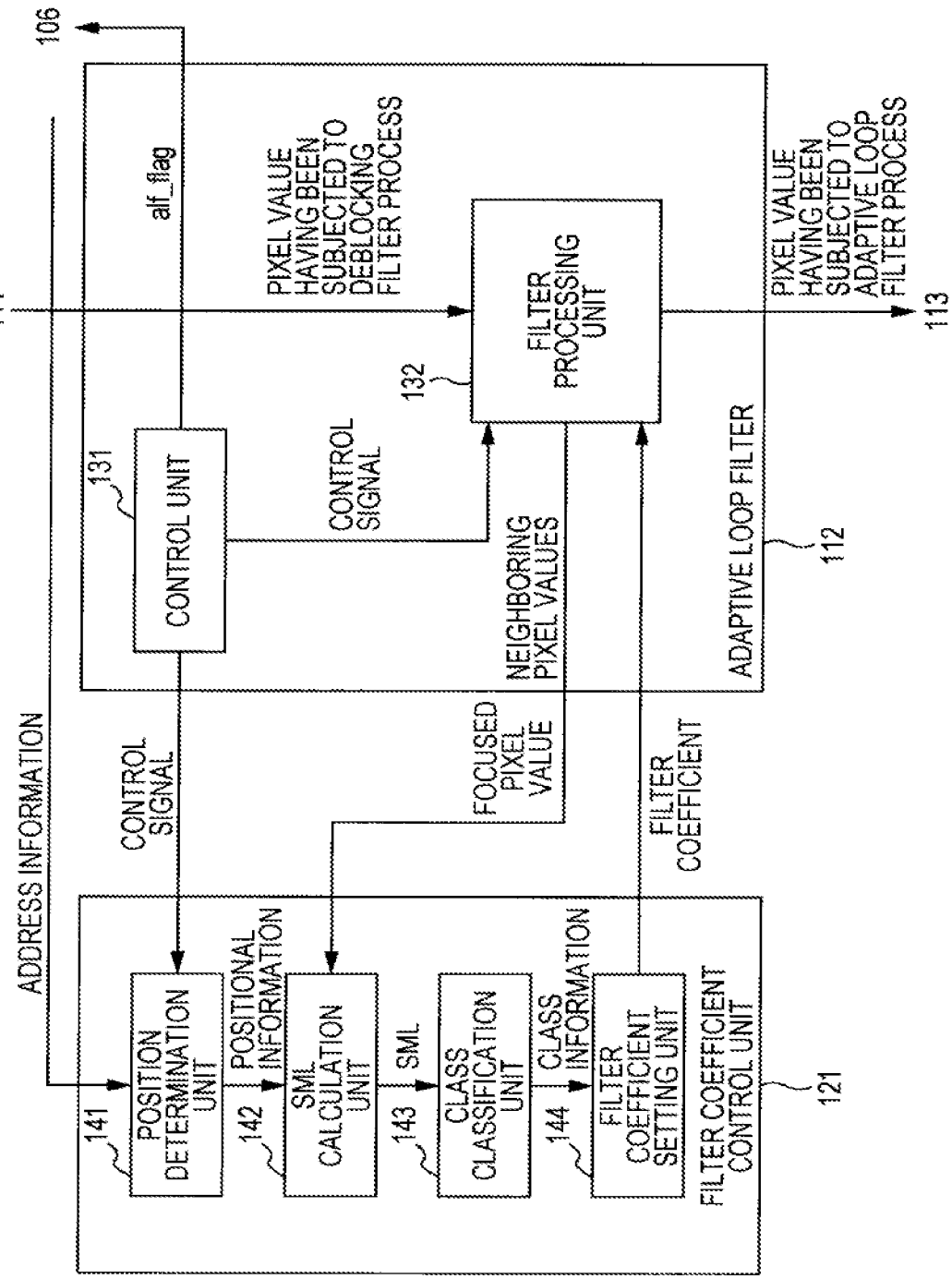
FIG. 11 is a block diagram showing an exemplary main configuration of an adaptive loop filter and a filter coefficient control unit.

FIG. 11 is a block diagram showing an exemplary main configuration of the adaptive loop filter 112 and the filter coefficient control unit 121.

As shown in FIG. 11, the adaptive loop filter 112 has a control unit 131 and a filter processing unit 132.

In addition, the filter coefficient control unit 121 has a position determination unit 141, an SML calculation unit 142, a class classification unit 143, and a filter coefficient setting unit 144.

The control unit 131 controls an adaptive loop filter process of the filter processing unit 132, based on the value of the flag alf_flag indicating whether to perform an adaptive loop filter process. In addition, upon performing an adaptive loop filter process, the control unit 131 instructs the position determination unit 141 in the filter coefficient control unit 121 to start the process. The control unit 131 further supplies alf_flag to the lossless coding unit 106 to code alf_flag and transmit the coded alf_flag to the decoding side.

The filter processing unit 132 performs, according to control by the control unit 131, a filter process for a pixel value having been subjected to a deblocking filter process and supplied from the deblocking filter 111, using a filter coefficient supplied from the filter coefficient setting unit 144. The filter processing unit 132 holds the filter-processed pixel value, and supplies the pixel value to the frame memory 113 to store the pixel value as a reference image. The held pixel value is reused as the pixel value of a neighboring pixel in processes for other pixels which are processed later than a focused pixel.

The position determination unit 141 obtains, according to control by the control unit 131, address information indicating the positions of slices, a focused pixel which is a processing target, and the like, from the lossless coding unit 106. Those pieces of address information are stored in, for example, a Sequence Parameter Set (SPS), a Picture Parameter Set (PPS), a slice header, or the like, which is generated by the lossless coding unit 106. The position determination unit 141 determines the position of the focused pixel in a focused slice, using the obtained address information.

The SML calculation unit 142 calculates the SML of the focused pixel based on the position determination result (positional information) obtained by the position determination unit 141, and using the pixel value of the focused pixel and the pixel values of neighboring pixels which are obtained from the filter processing unit 132 (without referring to information in other slices than the focused slice).

The class classification unit 143 classifies the focused pixel into a class, using the SML calculated by the SML calculation unit 142.

According to class information (class classification result) obtained from the class classification unit 143, the filter coefficient setting unit 144 sets, for the focused pixel, a filter coefficient according to the class. The filter coefficient setting unit 144 supplies the set filter coefficient to the filter processing unit 132. The filter processing unit 132 performs a filter process for the focused pixel, using the filter coefficient.

[Flow of a Coding Process]

Figure 12:
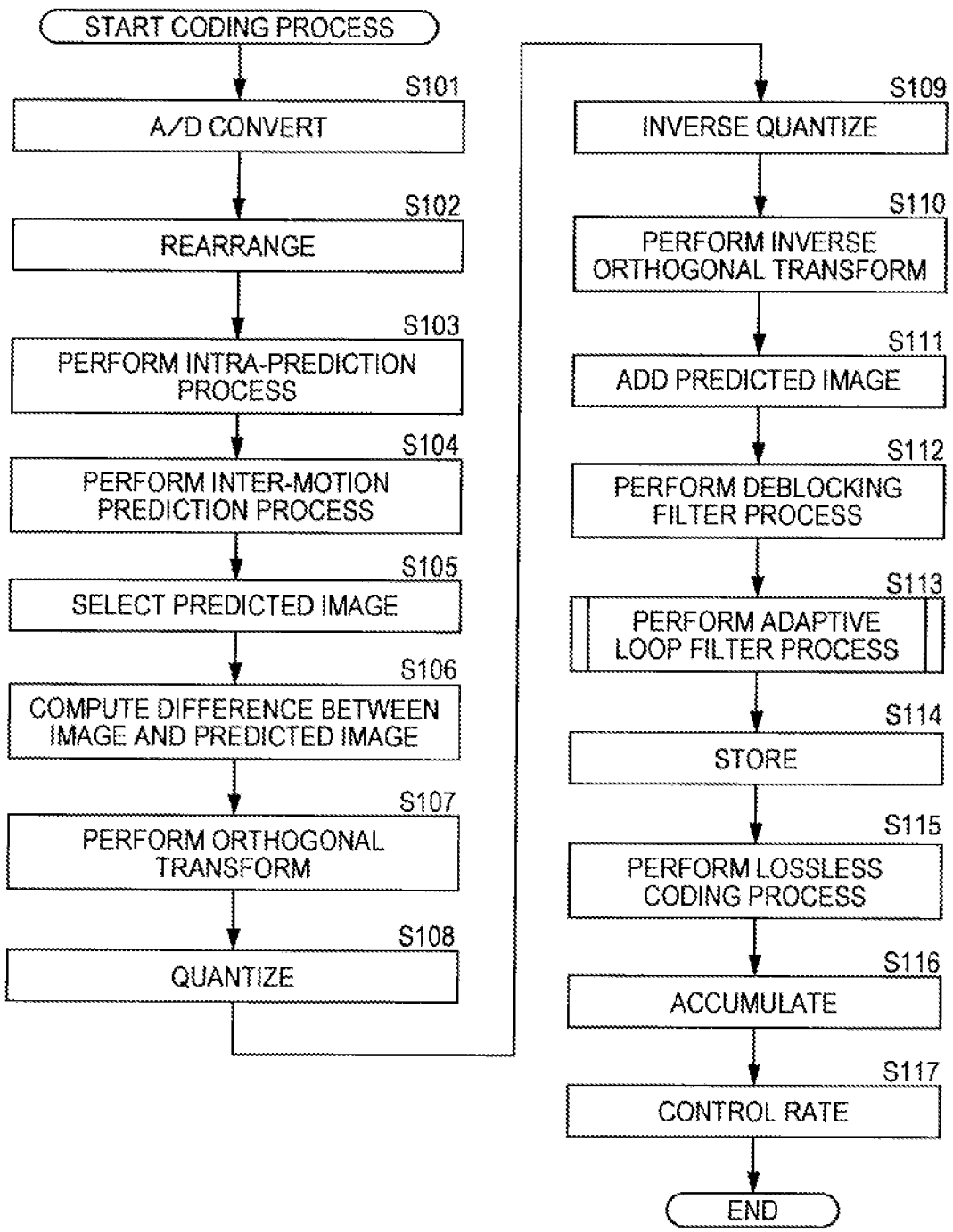
FIG. 12 is a flowchart describing an example of the flow of a coding process.

Next, the flow of processes performed by the image coding apparatus 100 such as that described above will be described. First, with reference to a flowchart of FIG. 12, an example of the flow of a coding process will be described. Note that the processes at the respective steps shown in FIG. 12 are performed in their respective processing units. Therefore, the processing units of the respective processes are not necessarily equal to one another. Thus, although each data is processed by a procedure such as that described below, in practice the processing order of the processes at the respective steps is not always the one such as that described below.

At step S101, the A/D conversion unit 101 A/D converts an inputted image. At step S102, the screen rearrangement buffer 102 stores A/D converted images and rearranges the order of pictures from display order to coding order.

At step S103, the intra-prediction unit 115 performs an intra-prediction process in intra-prediction mode. At step S104, the motion prediction/compensation unit 116 performs an inter-motion prediction process where a motion prediction and motion compensation are performed in inter-prediction mode.

At step S105, the predicted image selection unit 117 determines an optimum mode based on cost function values outputted from the intra-prediction unit 115 and the motion prediction/compensation unit 116. That is, the predicted image selection unit 117 selects either one of a predicted image created by the intra-prediction unit 115 and a predicted image created by the motion prediction/compensation unit 116.

At step S106, the computing unit 103 computes a difference between an image rearranged in the process at step S102 and the predicted image selected in the process at step S105. Difference data is reduced in data size compared to the original image data. Therefore, compared to the case of coding an image as it is, the data size can be compressed.

At step S107, the orthogonal transform unit 104 performs an orthogonal transform on the difference information generated in the process at step S106. Specifically, an orthogonal transform such as a discrete cosine transform or a Karhunen-Loeve transform is performed, and a transform coefficient is outputted.

At step S108, the quantization unit 105 quantizes the orthogonal transform coefficient obtained in the process at step S107.

The difference information quantized in the process at step S108 is locally decoded in the following manner. Specifically, at step S109, the inverse quantization unit 108 inverse quantizes the orthogonal transform coefficient generated and quantized in the process at step S108 (also referred to as the quantized coefficient), by a characteristic associated with the characteristic of the quantization unit 105. At step S110, the inverse orthogonal transform unit 109 performs an inverse orthogonal transform on the orthogonal transform coefficient obtained in the process at step S107, by a characteristic associated with the characteristic of the orthogonal transform unit 104.

At step S111, the computing unit 110 adds the predicted image to the locally decoded difference information and thereby creates a locally decoded image (an image corresponding to the input to the computing unit 103). At step S112, the deblocking filter 111 performs, where appropriate, a deblocking filter process on the locally decoded image obtained in the process at step S111.

At step S113, the adaptive loop filter 112 and the filter coefficient control unit 121 independently perform, on a slice-by-slice basis, an adaptive loop filter process on the decoded image having been subjected to the deblocking filter process.

At step S114, the frame memory 113 stores the decoded image having been subjected to the adaptive loop filter process in the process at step S113. Note that those images not having been subjected to a filter process by the deblocking filter 111 or the adaptive loop filter 112 are also supplied to the frame memory 113 from the computing unit 110 and are stored.

At step S115, the lossless coding unit 106 codes the transform coefficient quantized in the process at step S108. Namely, lossless coding such as variable-length coding or arithmetic coding is performed on the difference image.

Note that the lossless coding unit 106 codes the quantized parameter calculated at step S108 and adds the coded parameter to coded data. In addition, the lossless coding unit 106 codes information about the prediction mode of the predicted image selected in the process at step S105, and adds the coded information to coded data obtained by coding the difference image. That is, the lossless coding unit 106 also codes optimum intra-prediction mode information supplied from the intra-prediction unit 115, information obtained according to the optimum inter-prediction mode supplied from the motion prediction/compensation unit 116, or the like, and adds the coded information to the coded data.

Furthermore, the lossless coding unit 106 also codes information about a filter process such as alf_flag, and adds the coded information to the coded data.

At step S116, the accumulation buffer 107 accumulates the coded data obtained in the process at step S115. The coded data accumulated in the accumulation buffer 107 is read where appropriate, and the read coded data is transmitted to the decoding side through a transmission line or a recording medium.

At step S117, the rate control unit 118 controls the rate of the quantization operation of the quantization unit 105 based on the rate (the amount of bit) of the coded data accumulated in the accumulation buffer 107 in the process at step S116, so as to prevent the occurrence of overflows or under flows.

When the process at step S117 is completed, the coding process ends.

[Flow of an Adaptive Loop Filter Process]

Next, with reference to a flowchart of FIG. 13, an example of the flow of the adaptive loop filter process performed at step S113 in FIG. 12 will be described.

When the adaptive loop filter process starts, at step S131, the control unit 131 sets, as a processing target (focused pixel), the first pixel in a focused slice which is a processing target. At step S132, the control unit 131 determines whether all pixels have been processed. If it is determined that there is an unprocessed pixel, then the control unit 131 advances the process to step S133 and controls the position determination unit 141.

The position determination unit 141 obtains, at step S133, address information of a focused slice, a focused pixel, etc., and determines, at step S134, the positions of neighboring pixels. That is, the position determination unit 141 determines, based on the position of the focused pixel in the focused slice, whether the neighboring pixels are located in the focused slice (whether available or not).

At step S135, the SML calculation unit 142 calculates the SML (i, j) of a focused region, according to the position determination results obtained at step S134.

At step S136, the class classification unit 143 classifies the focused pixel into a class, according to the magnitude of the SML (i, j) calculated at step S135.

At step S137, the filter coefficient setting unit 144 sets a filter coefficient for the focused pixel, according to the class classified at step S136.

At step S138, the control unit 131 determines whether the value of alf_flag which is flag information indicating whether to perform an adaptive loop filter process is 1. If it is determined that the value is 1, then the control unit 131 advances the process to step S139 and controls the filter processing unit 132.

At step S139, the filter processing unit 132 performs a filter process for the focused pixel, using the filter coefficient set at step S137.

Alternatively, if it is determined at step S138 that the value of alf_flag is 0, then the control unit 131 advances the process to step S140. At step S140, the control unit 131 supplies alf_flag to the lossless coding unit 106 to code alf_flag.

At step S141, the control unit 131 updates the processing target to the next pixel. When the control unit 131 completes the process at step S141, the control unit 131 puts the process back to step S132 and repeats the subsequent processes.

When the processes at steps S132 to S141 are repeated in the above-described manner and it is determined at step S132 that all pixels in the focused slice have been processed, the control unit 131 ends the adaptive loop filter process and puts the process back to FIG. 12.

[Flow of an SML Calculation Process]

Next, with reference to a flowchart of FIG. 14, an example of the flow of the SML calculation process performed at step S135 in FIG. 13 will be described.

When the SML calculation process starts, the SML calculation unit 142 determines, at step S161, whether a neighboring pixel (i−1, j) is included in a focused slice.

If it is determined that the neighboring pixel (i−1, j) is included in the focused slice, then the SML calculation unit 142 advances the process to step S162, and uses the pixel value of the neighboring pixel for calculation of SML without updating the pixel value, as shown in the following equation (2).

$$R'(i-1,j)=R(i-1,j) \quad (2)$$

On the other hand, if it is determined at step S161 that the neighboring pixel (i−1, j) is not included in the focused slice, then the SML calculation unit 142 advances the process to step S163, and updates the pixel value of the neighboring pixel using the pixel value of a focused pixel, as shown in the following equation (3).

$$R'(i-1,j)=R(i,j) \quad (3)$$

At step S164, the SML calculation unit 142 determines whether a neighboring pixel (i+1, j) is included in the focused slice.

If it is determined that the neighboring pixel (i+1, j) is included in the focused slice, then the SML calculation unit 142 advances the process to step S165, and uses the pixel value of the neighboring pixel for calculation of SML without updating the pixel value, as shown in the following equation (4).

$$R'(i+1,j)=R(i+1,j) \quad (4)$$

On the other hand, if it is determined at step S164 that the neighboring pixel (i+1, j) is not included in the focused slice, then the SML calculation unit 142 advances the process to step S166, and updates the pixel value of the neighboring pixel using the pixel value of the focused pixel, as shown in the following equation (5).

$$R'(i+1,j)=R(i,j) \quad (5)$$

At step S167, the SML calculation unit 142 determines whether a neighboring pixel (i, j−1) is included in the focused slice.

If it is determined that the neighboring pixel (i, j−1) is included in the focused slice, then the SML calculation unit 142 advances the process to step S168, and uses the pixel value of the neighboring pixel for calculation of SML without updating the pixel value, as shown in the following equation (6).

$$R'(i,j-1)=R(i,j-1) \quad (6)$$

On the other hand, if it is determined at step S167 that the neighboring pixel (i, j−1) is not included in the focused slice, then the SML calculation unit 142 advances the process to step S169, and updates the pixel value of the neighboring pixel using the pixel value of the focused pixel, as shown in the following equation (7).

$$R'(i,j-1)=R(i,j) \quad (7)$$

At step S170, the SML calculation unit 142 determines whether a neighboring pixel (i, j+1) is included in the focused slice.

If it is determined that the neighboring pixel (i, j+1) is included in the focused slice, then the SML calculation unit 142 advances the process to step S171, and uses the pixel value of the neighboring pixel for calculation of SML without updating the pixel value, as shown in the following equation (8).

$$R'(i,j+1)=R(i,j+1) \quad (8)$$

On the other hand, if it is determined at step S170 that the neighboring pixel (i, j+1) is not included in the focused slice, then the SML calculation unit 142 advances the process to step S172, and updates the pixel value of the neighboring pixel using the pixel value of the focused pixel, as shown in the following equation (9).

$$R'(i,j+1)=R(i,j) \quad (9)$$

At step S173, on the basis of the processing results of the above-described processes, the SML calculation unit 142 calculates the SML(i, j) of the focused pixel using the pixel values of the neighboring pixels, as shown in the following equation (10).

$$SML(i,j)=|2.\text{times}.R'(i,j)-R(i-1,j)-R(i+1,j)|+ \\ |2.\text{times}.R'(i,j)-R(i,j-1-)-R(i,j+1)| \quad (10)$$

Figure 13:
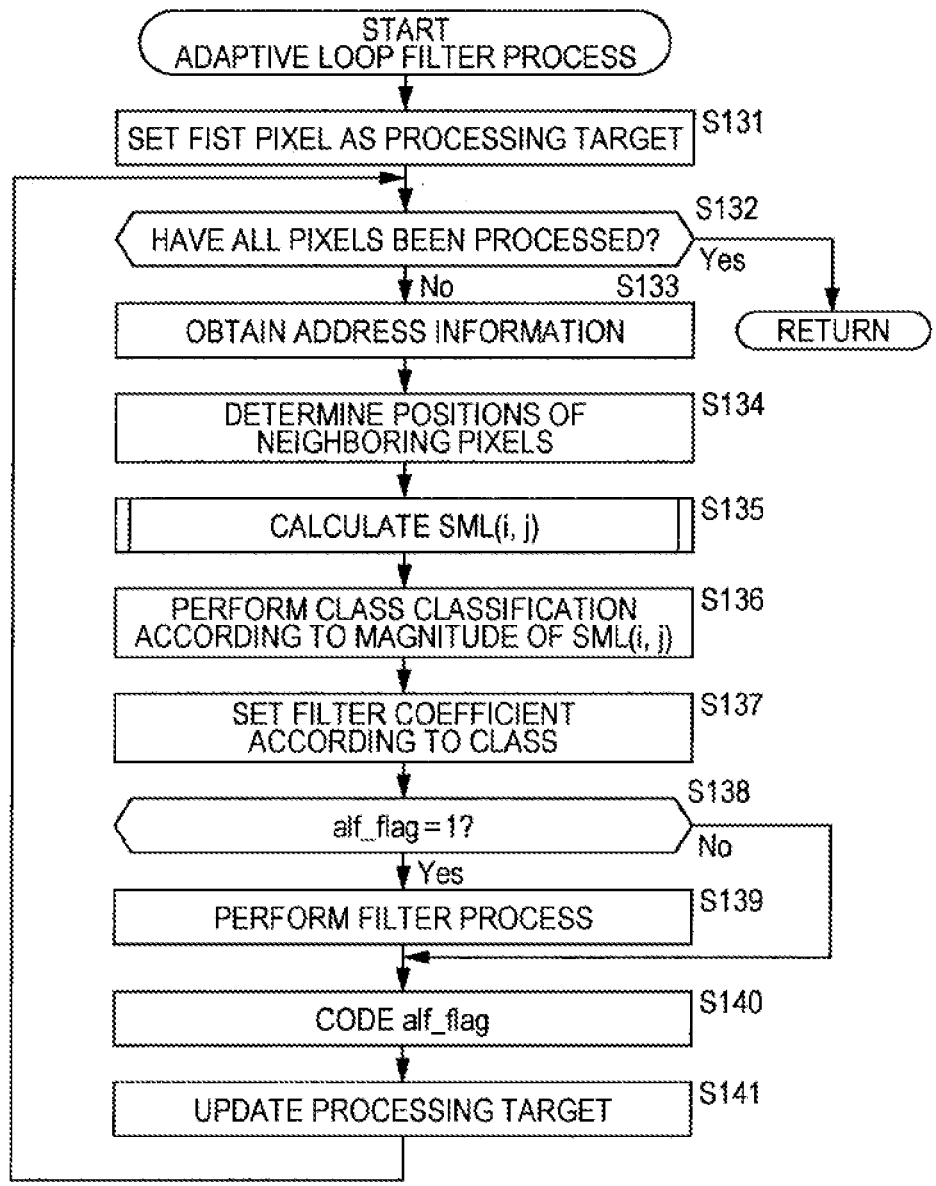
FIG. 13 is a flowchart describing an example of the flow of an adaptive loop filter process.
Figure 14:
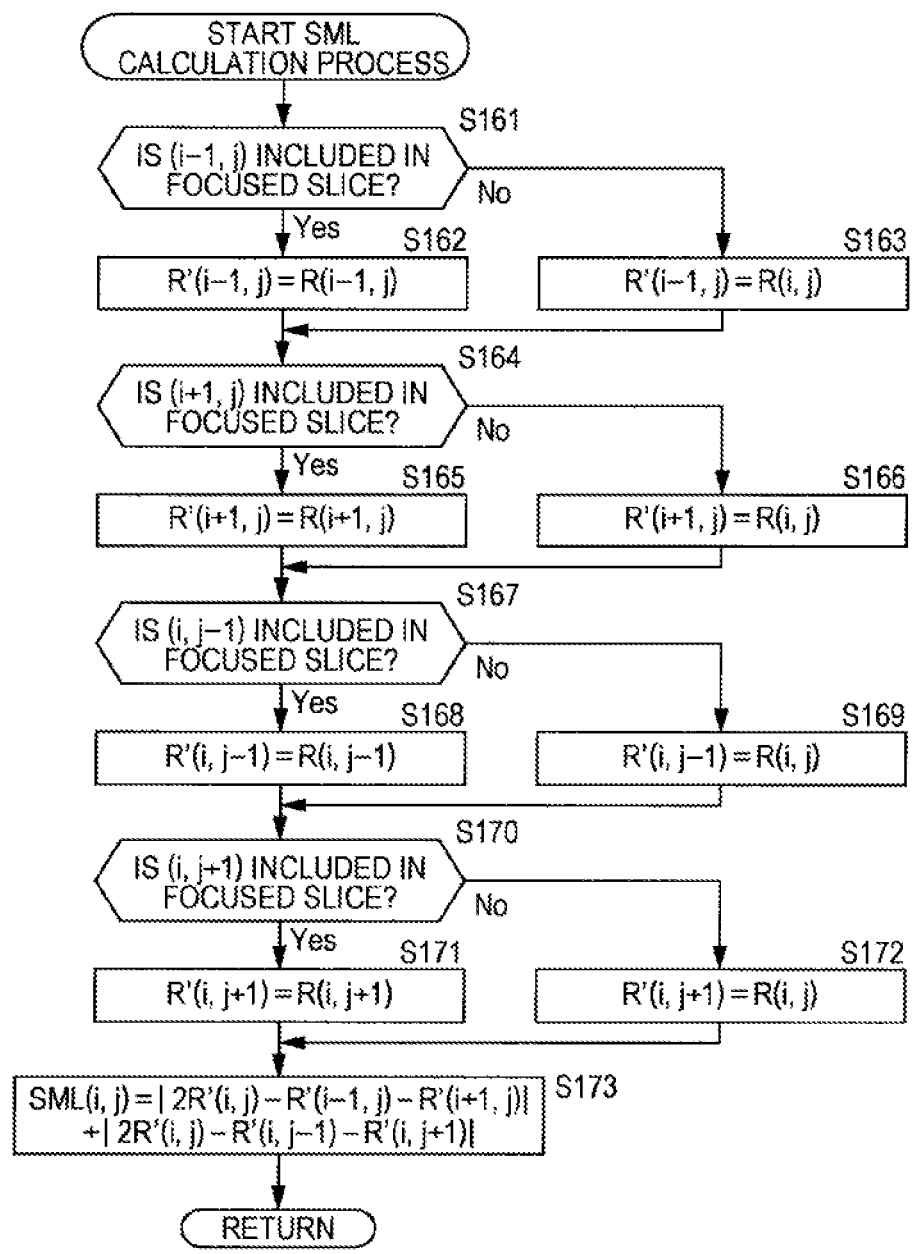
FIG. 14 is a flowchart describing an example of the flow of an SML calculation process.

When the SML is calculated, the SML calculation unit 142 ends the SML calculation process and puts the process back to FIG. 13.

By performing various types of processes in the manner described above, the image coding apparatus 100 can implement parallelization of slice-by-slice processes, enabling to suppress an increase in processing time caused by the occurrence of unwanted delay time in an adaptive loop filter process.

2. Second Embodiment

Figure 15:
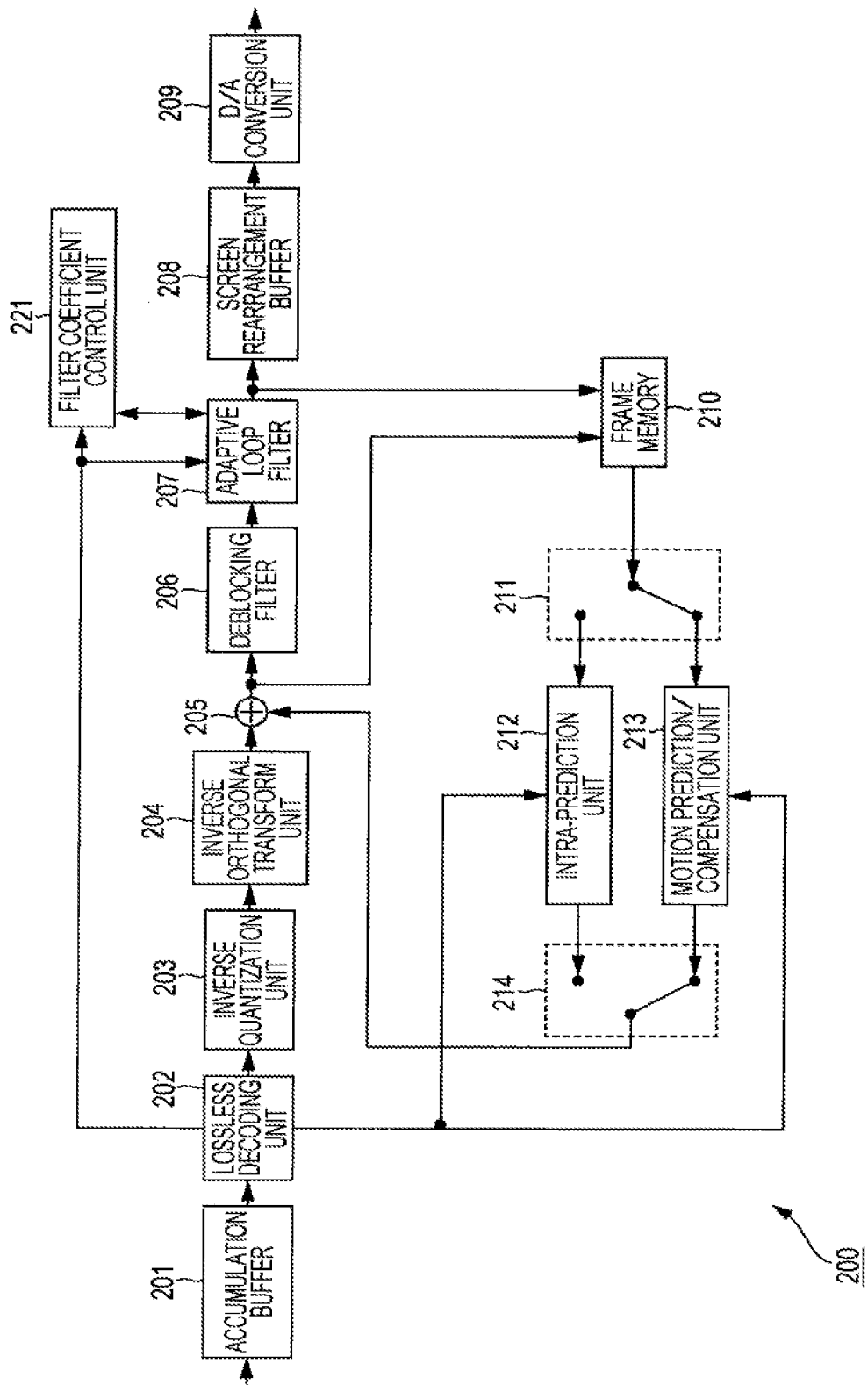
FIG. 15 is a block diagram showing an exemplary main configuration of an image decoding apparatus.

FIG. 15 is a block diagram showing an exemplary main configuration of an image decoding apparatus. An image decoding apparatus 200 shown in FIG. 15 decodes coded data generated by the image coding apparatus 100, by a decoding method associated with the coding method.

As shown in FIG. 15, the image decoding apparatus 200 has an accumulation buffer 201, a lossless decoding unit 202, an inverse quantization unit 203, an inverse orthogonal transform unit 204, a computing unit 205, a deblocking filter 206, an adaptive loop filter 207, a screen rearrangement buffer 208, and a D/A conversion unit 209. In addition, the image decoding apparatus 200 has a frame memory 210, a selection unit 211, an intra-prediction unit 212, a motion prediction/compensation unit 213, and a selection unit 214.

Furthermore, the image decoding apparatus 200 has a filter coefficient control unit 221.

The accumulation buffer 201 accumulates transmitted coded data and supplies the coded data to the lossless decoding unit 202 at specified timing. The lossless decoding unit 202 decodes information that is coded by the lossless coding unit 106 of FIG. 1 and supplied from the accumulation buffer 201, by a scheme associated with the coding scheme of the lossless coding unit 106. The lossless decoding unit 202 supplies quantized coefficient data of a difference image which is obtained by the decoding, to the inverse quantization unit 203.

In addition, the lossless decoding unit 202 determines whether, as an optimum prediction mode, intra-prediction mode has been selected or inter-prediction mode has been selected, and supplies information about the optimum prediction mode to one of the intra-prediction unit 212 and the motion prediction/compensation unit 213 that has the mode having been determined to be selected.

The inverse quantization unit 203 inverse quantizes the quantized coefficient data obtained by the decoding by the lossless decoding unit 202, by a scheme associated with the quantization scheme of the quantization unit 105 of FIG. 1, and supplies the obtained coefficient data to the inverse orthogonal transform unit 204.

The inverse orthogonal transform unit 204 performs an inverse orthogonal transform on the coefficient data supplied from the inverse quantization unit 203, by a scheme associated with the orthogonal transform scheme of the orthogonal transform unit 104 of FIG. 1. By this inverse orthogonal transform process, the inverse orthogonal transform unit 204 obtains decoded residual data corresponding to residual data which is before being subjected to an orthogonal transform in the image coding apparatus 100.

The decoded residual data obtained by the inverse orthogonal transform is supplied to the computing unit 205. In addition, to the computing unit 205 is supplied a predicted image from the intra-prediction unit 212 or the motion prediction/compensation unit 213 through the selection unit 214.

The computing unit 205 adds the decoded residual data and the predicted image together, and thereby obtains decoded image data corresponding to image data which is before a predicted image is subtracted by the computing unit 103 of the image coding apparatus 100. The computing unit 205 supplies the decoded image data to the deblocking filter 206.

The deblocking filter 206 performs, where appropriate, a deblocking filter process on the supplied decoded image to remove blockiness in the decoded image. The deblocking filter 206 supplies the filter-processed decoded image data to the adaptive loop filter 207.

The adaptive loop filter 207 performs, using the Wiener Filter, a loop filter process (class classification ALF) on the deblocking filter processing result (the decoded image having been subjected to the removal of blockiness), and thereby improves image quality. The adaptive loop filter 207 supplies the filter-processed decoded image data to the screen rearrangement buffer 208 and the frame memory 210. Note that the decoded image outputted from the computing unit 205 (e.g., a reference image used for an intra-prediction) can be supplied to the frame memory 210 without passing through the deblocking filter 206 and the adaptive loop filter 207.

The screen rearrangement buffer 208 rearranges images. Specifically, the frame order rearranged by the screen rearrangement buffer 102 of FIG. 1 for coding order is rearranged to the original display order. The D/A conversion unit 209 D/A converts an image supplied from the screen rearrangement buffer 208, and outputs the image to a display which is not shown, to display the image.

The frame memory 210 stores the supplied decoded image and supplies, as a reference image, the stored decoded image to the selection unit 211 at specified timing or based on a request from an external source such as the intra-prediction unit 212 or the motion prediction/compensation unit 213.

The selection unit 211 selects a supply destination of the reference image supplied from the frame memory 210. When an intra-coded image is decoded, the selection unit 211 supplies the reference image supplied from the frame memory 210, to the intra-prediction unit 212. Alternatively, when an inter-coded image is decoded, the selection unit 211 supplies the reference image supplied from the frame memory 210, to the motion prediction/compensation unit 213.

To the intra-prediction unit 212 are supplied, where appropriate, from the lossless decoding unit 202 information indicating intra-prediction mode which is obtained by decoding header information, etc. The intra-prediction unit 212 performs an intra-prediction using the reference image obtained from the frame memory 210, in intra-prediction mode used by the intra-prediction unit 115 of FIG. 1, and thereby creates a predicted image. The intra-prediction unit 212 supplies the created predicted image to the selection unit 214.

The motion prediction/compensation unit 213 obtains from the lossless decoding unit 202 information obtained by decoding header information (optimum prediction mode information, difference information, and the code number of prediction motion vector information, etc.).

The motion prediction/compensation unit 213 performs an inter-prediction using the reference image obtained from the frame memory 210, in inter-prediction mode used by the motion prediction/compensation unit 116 of FIG. 1, and thereby creates a predicted image.

The selection unit 214 supplies the predicted image supplied from the intra-prediction unit 212 or the predicted image supplied from the motion prediction/compensation unit 213, to the computing unit 205.

The filter coefficient control unit 221 classifies a focused pixel into a class based on the SML thereof, to set a filter coefficient used by the adaptive loop filter 207, and supplies the filter coefficient to the adaptive loop filter 207. Note that the filter coefficient control unit 221 calculates the SML of the focused pixel without referring to information in other slices than a focused slice.

By doing so, the adaptive loop filter 207 can perform a filter process independently on a slice-by-slice basis.

[Adaptive Loop Filter and Filter Coefficient Control Unit]

Figure 16:
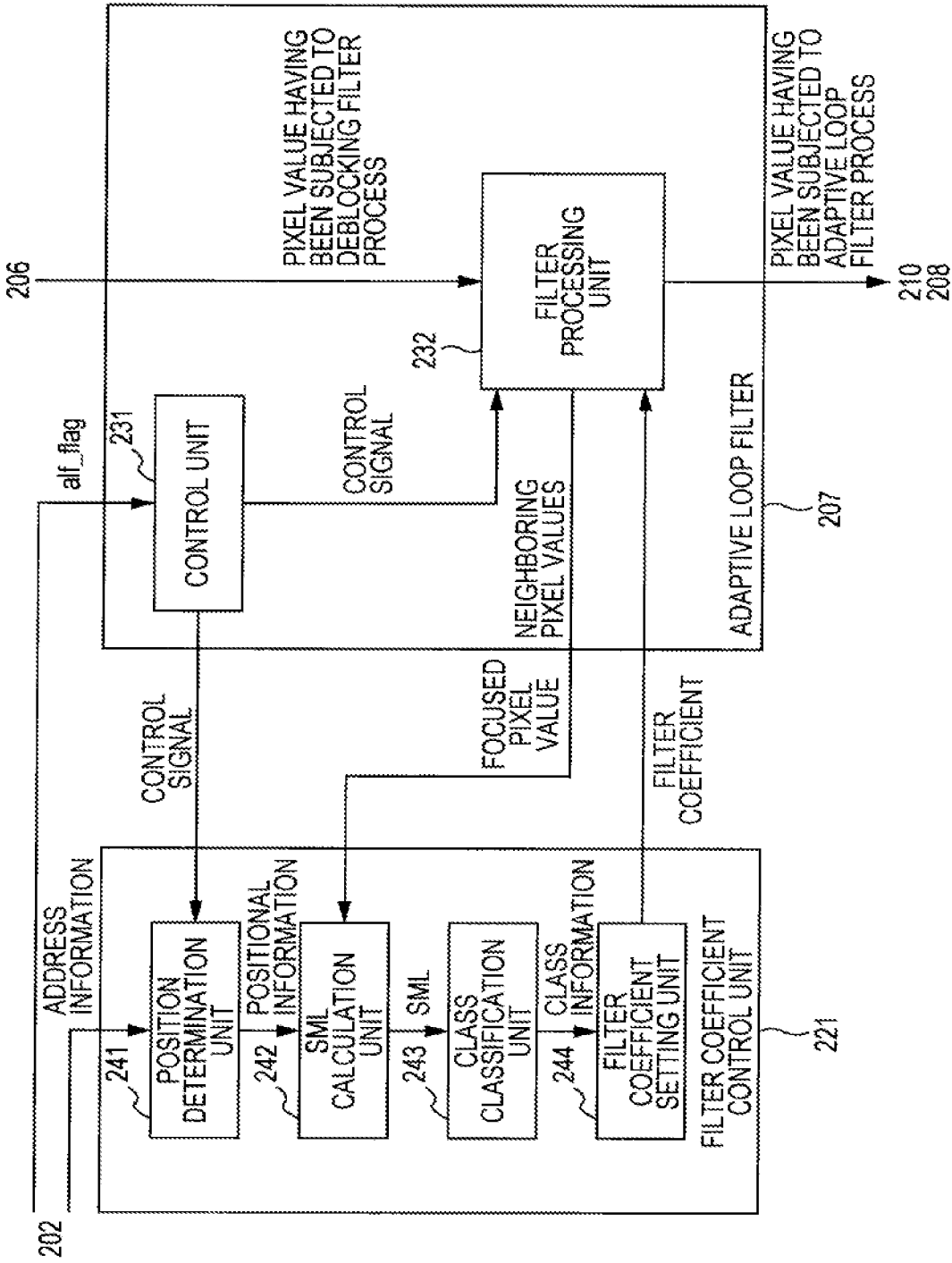
FIG. 16 is a block diagram showing an exemplary main configuration of an adaptive loop filter and a filter coefficient control unit.

FIG. 16 is a block diagram showing an exemplary main configuration of the adaptive loop filter 207 and the filter coefficient control unit 221.

The adaptive loop filter 207 basically has the same configuration as the adaptive loop filter 112 (FIG. 11) of the image coding apparatus 100, and basically performs the same processes. That is, as shown in FIG. 16, the adaptive loop filter 207 has a control unit 231 and a filter processing unit 232.

The filter coefficient control unit 221 basically has the same configuration as the filter coefficient control unit 121 (FIG. 11) of the image coding apparatus 100, and basically performs the same processes. That is, as shown in FIG. 16, the filter coefficient control unit 221 has a position determination unit 241, an SML calculation unit 242, a class classification unit 243, and a filter coefficient setting unit 244.

The control unit 231 basically performs the same processes as the control unit 131 (FIG. 11). Note, however, that the control unit 231 obtains from the lossless decoding unit 202 alf_flag supplied from the image coding apparatus 100 and controls, according to the value of that alf_flag, whether to perform class classification ALF (the operation of the filter coefficient control unit 221 and the filter processing unit 232).

The filter processing unit 232 is controlled by the control unit 231 as with the filter processing unit 132 (FIG. 11), to perform a filter process on a pixel value having been subjected to a deblocking filter process and supplied from the deblocking filter 206, using a filter coefficient supplied from the filter coefficient setting unit 244. The filter processing unit 232 holds the filter-processed pixel value, and supplies the pixel value to the screen rearrangement buffer 208 and the frame memory 210 to store the pixel value as a reference image. The held pixel value is reused as the pixel value of a neighboring pixel in processes for other pixels which are processed later than a focused pixel.

The position determination unit 241 to the filter coefficient setting unit 244 in the filter coefficient control unit 221 correspond to the position determination unit 141 to the filter coefficient setting unit 144, respectively, and perform the same processes.

Specifically, the position determination unit 241 obtains, according to control by the control unit 231, address information indicating the positions of slices, a focused pixel which is a processing target, and the like, from the lossless decoding unit 202. Those pieces of address information are stored in, for example, an SPS, a PPS, a slice header, or the like, in a bit stream which is transmitted from the image coding apparatus 100. The position determination unit 241 obtains address information from those pieces of information decoded by the lossless decoding unit 202, and determines the position of the focused pixel in a focused slice, using the address information.

The SML calculation unit 242 calculates the SML of the focused pixel based on the position determination result (positional information) obtained by the position determination unit 241, and using the pixel value of the focused pixel and the pixel values of neighboring pixels which are obtained from the filter processing unit 232 (without referring to information in other slices than the focused slice).

The class classification unit 243 classifies the focused pixel into a class, using the SML calculated by the SML calculation unit 242.

According to class information (class classification result) obtained from the class classification unit 243, the filter coefficient setting unit 244 sets, for the focused pixel, a filter coefficient according to the class. The filter coefficient setting unit 244 supplies the set filter coefficient to the filter processing unit 232. The filter processing unit 232 performs a filter process for the focused pixel, using the filter coefficient.

[Flow of a Decoding Process]

Next, with reference to a flowchart of FIG. 17, an example of the flow of a decoding process performed by the image decoding apparatus 200 such as that described above will be described.

When the decoding process starts, at step S201, the accumulation buffer 201 accumulates a transmitted bit stream. At step S202, the lossless decoding unit 202 decodes the bit stream supplied from the accumulation buffer 201. Specifically, an I-picture, a P-picture, and a B-picture which are coded by the lossless coding unit 106 of FIG. 1 are decoded. In addition, various types of information other than difference image information included in the bit stream, such as an SPS, a PPS, and a slice header, are also decoded.

At step S203, the inverse quantization unit 203 inverse quantizes a quantized orthogonal transform coefficient which is obtained in the process at step S202. At step S204, the inverse orthogonal transform unit 204 performs an inverse orthogonal transform on the orthogonal transform coefficient having been inverse quantized at step S203.

At step S205, the intra-prediction unit 212 or the motion prediction/compensation unit 213 performs a prediction process using supplied information. At step S206, the selection unit 214 selects a predicted image created at step S205. At step S207, the computing unit 205 adds the predicted image selected at step S206 to difference image information obtained by the inverse orthogonal transform at step S204. By this, a decoded image is obtained.

At step S208, the deblocking filter 206 performs, where appropriate, a deblocking filter process on the decoded image obtained at step S207.

At step S209, the adaptive loop filter 207 and the filter coefficient control unit 221 perform, where appropriate, an adaptive loop filter process on the decoded image having been subjected to the deblocking filter process. Note that the adaptive loop filter 207 and the filter coefficient control unit 221 perform the adaptive loop filter process independently on a slice-by-slice basis.

A detail of the adaptive loop filter process is the same as that of the adaptive loop filter process performed by the image coding apparatus 100 which is described with reference to the flowchart of FIG. 13, and thus, description thereof is omitted.

At step S210, the screen rearrangement buffer 208 rearranges the image having been subjected to the filter process at step S209. Specifically, the frame order rearranged by the screen rearrangement buffer 102 of the image coding apparatus 100 for coding is rearranged to the original display order.

At step S211, the D/A conversion unit 209 D/A converts the image whose frame order has been rearranged at step S210. The image is outputted to a display which is not shown, and is displayed.

At step S212, the frame memory 210 stores the image having been subjected to the filter process at step S209. The image is used as a reference image for creation of a predicted image at step S205.

When the process at step S212 is completed, the decoding process ends.

By performing various types of processes in the above-described manner, the adaptive loop filter 207 and the filter coefficient control unit 221 only need to refer to information in a focused slice and thus do not need to wait until the processes for other slices have been completed. Therefore, the image decoding apparatus 200 can implement parallelization of slice-by-slice processes, enabling to suppress an increase in processing time caused by the occurrence of unwanted delay time in an adaptive loop filter process.

Other Examples

Note that although the above describes that when a neighboring pixel is not included in a focused slice, SML is calculated without referring to information in other slices than the focused slice and then class classification is performed, the configuration is not limited thereto. For example, for a focused pixel whose neighboring pixel is not included in a focused slice, computation for calculating SML may be omitted and the focused pixel may be classified into a predetermined, specified class (a specified filter coefficient may be set). By doing so, the setting of a filter coefficient becomes easier.

In addition, a filter process for a focused pixel whose neighboring pixel is not included in a focused slice may be omitted.

Figure 18:
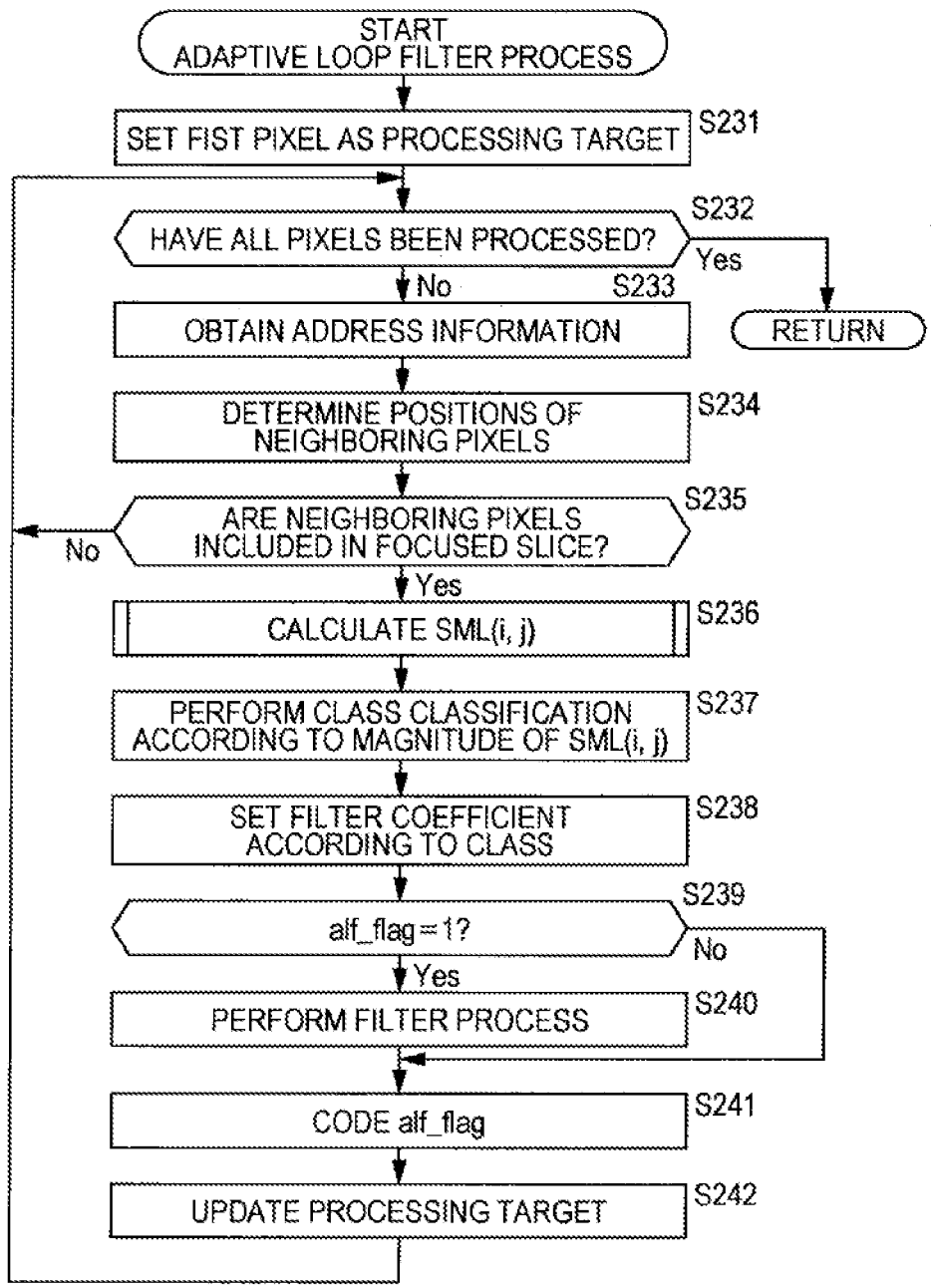
FIG. 18 is a flowchart describing an example of the flow of an adaptive loop filter process.

With reference to a flowchart of FIG. 18, an example of the flow of an adaptive loop filter process for that case will be described.

In this case, too, each process of the adaptive loop filter process is basically performed in the same manner as in the case of FIG. 13. Specifically, the processes at steps S231 to S234 are performed in the same manner as the processes at steps S131 to S134 in FIG. 13.

Note, however, that at step S235 the position determination unit 141 determines whether neighboring pixels are included in a focused slice, and only when it is determined that the neighboring pixels are included in the focused slice, the position determination unit 141 advances the process to step S236. In this case, the processes at steps S236 to S242 are performed in the same manner as the processes at steps S135 to S141 in FIG. 13.

In addition, if it is determined at step S235 that the neighboring pixels are not included in the focused slice, then the position determination unit 141 puts the process back to step S232 and changes the processing target to the next pixel.

By performing an adaptive loop filter process in this manner, the adaptive loop filter 112 and the filter coefficient control unit 121 can perform an adaptive loop filter process more easily.

Note that although the above describes an adaptive loop filter process performed by the image coding apparatus 100, an adaptive loop filter process performed by the image decoding apparatus 200 may also be performed in the same manner.

In addition, although the above describes that the pixels adjacent above, below, and to the left and right of a focused pixel serve as neighboring pixels, the configuration is not limited thereto. For example, a pixel adjacent to the upper right of the focused pixel, a pixel adjacent to the lower right, a pixel adjacent to the upper left, a pixel adjacent to the lower left, or the like, may serve as a neighboring pixel. Furthermore, neighboring pixels do not need to be adjacent to the focused pixel. In addition, the SML calculation method may be any other method than that described above. For example, the number of neighboring pixels is any number and thus the number of neighboring pixels may be 5 or more or 3 or less.

Furthermore, although the above describes that the image decoding apparatus 200 calculates a filter coefficient in the same manner as the image coding apparatus 100, the configuration is not limited thereto. A filter coefficient used by the image coding apparatus 100 may be transmitted to the image decoding apparatus 200, and the image decoding apparatus 200 may perform an adaptive loop filter process using the filter coefficient supplied from the image coding apparatus 100. In that case, the filter coefficient control unit 221 can be omitted.

In addition, the image coding apparatus 100 (control unit 131) may generate, for each slice, a flag that controls whether to perform class classification ALF independently on a slice-by-slice basis, and transmit the flags to the image decoding apparatus 200.

In a slice set with this flag (e.g., the value is 1), the image coding apparatus 100 performs, as described above, class classification ALF independently on a slice-by-slice basis, using only information on available pixels. On the other hand, in a slice not set with the flag (e.g., the value is 0), even when a neighboring pixel belongs to another slice, the image coding apparatus 100 calculates SML after the pixel values of all neighboring pixels have been obtained, and classifies a focused pixel into a class to set a filter coefficient.

In the image decoding apparatus 200, when the value of the flag supplied from the image coding apparatus 100 is 1, class classification ALF is performed such that a focused slice is made independent of other slices, and when the value of the flag supplied from the image coding apparatus 100 is 0, class classification ALF is performed such that the focused slice is not made independent of other slices.

Although the above describes that class classification is performed based on the magnitude of SML, the parameter used for class classification may be any parameter as long as the parameter is obtained by referring to pixels other than a focused pixel. For example, a variance value may be used or the magnitude of the amount of change in pixel value may be used. In that case, too, by performing calculation of the parameter without using information in other slices than a focused slice, as in the case of the above-described SML, the independence of slice-by-slice processes can be secured.

3. Third Embodiment

[Adaptive Offset Filter]

Although the above describes an adaptive loop filter, the present technique can also be applied to any process as long as the process is such that when a focused pixel is processed, its neighboring pixels are referred to. For example, the present technique can also be applied to an adaptive offset filter process which is adopted in HEVC.

An adaptive offset filter in an HEVC scheme will be described below. In the HEVC scheme, the Sample Adaptive Offset scheme described in Non-Patent Document 2 is adopted.

The process of an adaptive offset filter (Picture Quality Adaptive Offset: PQAO) is performed between the process of a deblocking filter and the process of an adaptive loop filter.

For the kinds of adaptive offset, there are of two kinds called band offset and six kinds called edge offset, and furthermore, it is also possible not to adapt offset. An image is partitioned into a quad-tree, and a selection can be made for each region as to which one of the above-described kinds of adaptive offset is to be used for coding.

This selection information is coded by a coding unit (Entropy Coding) as PQAO Info. and a bit stream is generated, and the generated bit stream is transmitted to the decoding side. By using this method, coding efficiency can be improved.

Now, with reference to FIG. 19, a quad-tree structure will be described. Although quad-tree partitioning (quad-tree structuring) can be performed on a per arbitrary region basis, in the following, description is made assuming that quad-tree partitioning is performed on an LCU-by-LCU basis.

Figure 19:
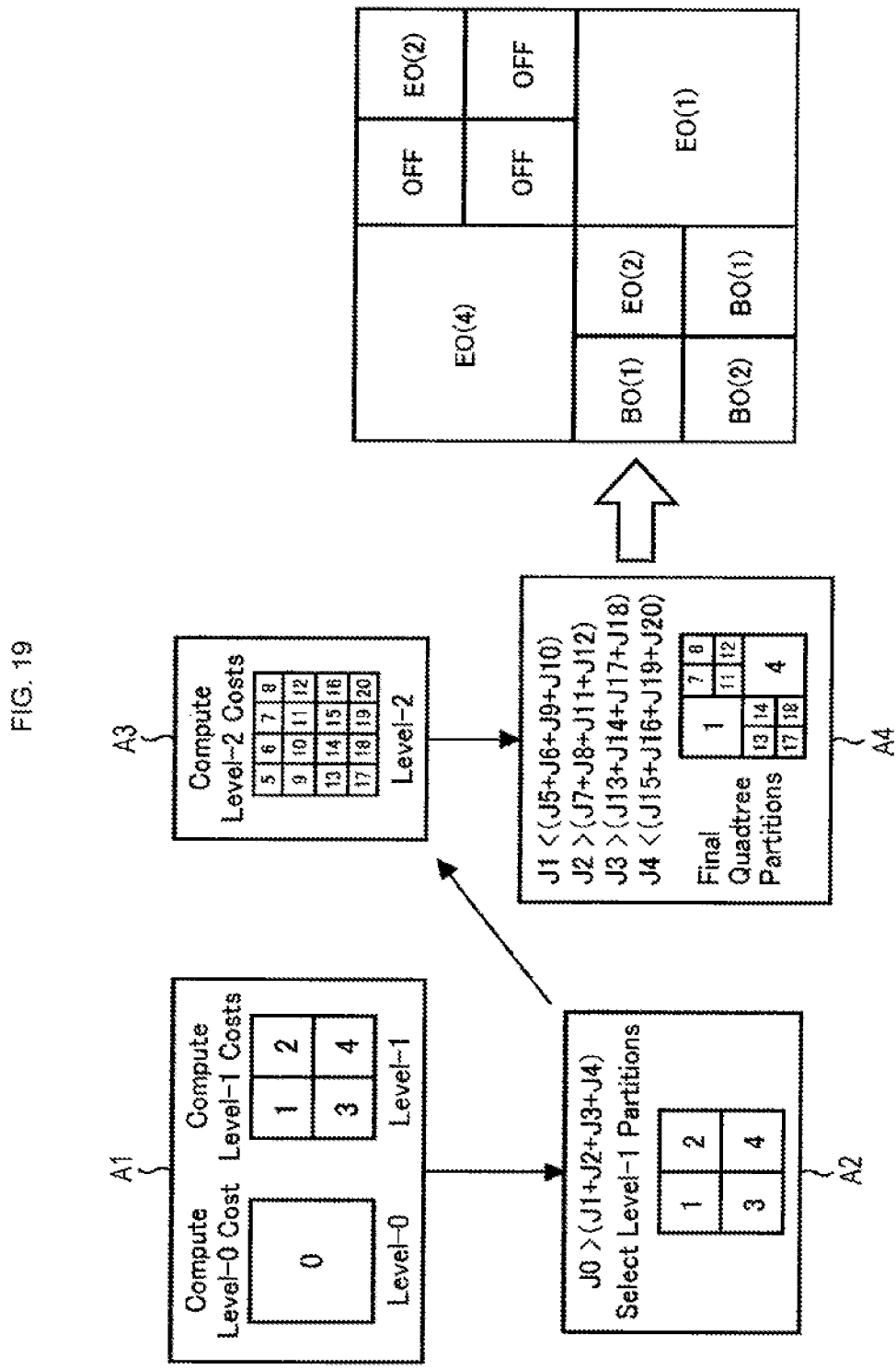
FIG. 19 is a diagram describing a quad-tree structure.

A region 0 shown in A1 of FIG. 19 shows a state in which an LCU is not partitioned (Level-0 (partition depth 0)). The image coding apparatus first computes a cost function value J0 for the region 0 (i.e., an LCU). Four regions 1 to 4 shown in A1 of FIG. 19 show a state in which the region 0 is partitioned vertically and horizontally into two regions (four regions in total) (Level-1 (partition depth 1)). The image coding apparatus calculates cost function values J1, J2, J3, and J4 for the regions 1 to 4.

When cost function values for the respective regions 0 to 4 are calculated, as shown in A2 of FIG. 19, the image coding apparatus compares the cost function values on a per Level (partition depth) basis, and selects a Level (partition depth) with the smaller value. For example, in the case of J0>(J1+J2+J3+J4), the image coding apparatus selects the Level-1 Partitions. That is, in this case, the LCU is partitioned into at least four regions, the regions 1 to 4.

Note that, for example, in the case of J0<(J1+J2+J3+J4), the image coding apparatus selects the Level-0 Partitions. In this case, the LCU is not partitioned (the region 0).

The image coding apparatus repeats such region partitioning for each region formed by region partitioning. Regions 5 to 20 shown in A3 of FIG. 19 show a state in which each of the regions 1 to 4 shown in A2 of FIG. 19 is partitioned vertically and horizontally into two regions (four regions in total) (Level-2 (partition depth 2)). That is, the LCU is partitioned into 16 regions. The image coding apparatus calculates cost function values J5 to J20 for the regions 5 to 20.

When cost function values for the respective regions to 20 are calculated, as shown in A4 of FIG. 19, the image coding apparatus compares the cost function values between Level-1 (partition depth 1) and Level-2 (partition depth 2), and selects a Level (partition depth) with the smaller value.

Specifically, the image coding apparatus compares the cost function value J1 for the region 1 with the sum of the cost function values for the region 5, the region 6, the region 9, and the region 10. For example, in the case of J1<(J5+J6+J9+J10), the image coding apparatus selects the Level-1 Partitions. In this case, the region 1 is not partitioned any further. In contrast, for example, in the case of J1>(J5+J6+J9+J10), the image coding apparatus selects the Level-2 Partitions. In this case, the region 1 is partitioned into at least four regions, the region 5, the region 6, the region 9, and the region 10.

In addition, the image coding apparatus compares the cost function value J2 for the region 2 with the sum of the cost function values for a region 7, a region 8, a region 11, and a region 12. For example, in the case of J2>(J7+J8+J11+J12), the image coding apparatus selects the Level-2 Partitions. In this case, the region 2 is partitioned into at least four regions, the region 7, the region 8, the region 11, and the region 12. In contrast, for example, in the case of J2<(J7+J8+J11+J12), the image coding apparatus selects the Level-1 Partitions. In this case, the region 2 is not partitioned any further.

Furthermore, the image coding apparatus compares the cost function value J3 for the region 3 with the sum of the cost function values for a region 13, a region 14, a region 17, and a region 18. For example, in the case of J3>(J13+J14+J17+J18), the image coding apparatus selects the Level-2 Partitions. In this case, the region 3 is partitioned into at least four regions, the region 13, the region 14, the region 17, and the region 18. In contrast, for example, in the case of J3<(J13+J14+J17+J18), the image coding apparatus selects the Level-1 Partitions. In this case, the region 3 is not partitioned any further.

In addition, the image coding apparatus compares the cost function value J4 for the region 4 with the sum of the cost function values for a region 15, a region 16, a region 19, and a region 20. For example, in the case of J4<(J15+J16+J19+J20), the image coding apparatus selects the Level-1 Partitions. In this case, the region 4 is not partitioned any further. In contrast, for example, in the case of J4>(J15+J16+J19+J20), the image coding apparatus selects the Level-2 Partitions. In this case, the region 4 is partitioned into at least four regions, the region 15, the region 16, the region 19, and the region 20.

The image coding apparatus further repeats the same region partitioning on the Level-2 Partitions. The image coding apparatus repeats such region partitioning until partitioning is no longer performed or until reaching a predetermined SCU Level (partition depth).

When, for example, a Quad-tree structure such as that shown in FIG. A4 of FIG. 19 is obtained as a result of such region partitioning, the image coding apparatus determines the regions in the Quad-tree structure, as final Quad-tree regions (Partitions).

For each of the regions of the Quad-tree structure determined in this manner, an offset mode (including whether to perform offset) is selected using cost function values. Specifically, the image coding apparatus calculates, for each region, cost function values for all modes including two kinds of band offset, six kinds of edge offset, and no offset, and selects a mode with the smallest cost function value.

In the case of the example of FIG. 19, as shown on the right side of a white arrow, for the region 1, EO(4), i.e., the fourth kind of edge offset, is determined. For the region 7, OFF, i.e., no offset, is determined, and for the region 8, EO(2), i.e., the second kind of edge offset, is determined. For the regions 11 and 12, OFF, i.e., no offset, is determined.

In addition, for the region 13, BO(1), i.e., the first kind of band offset, is determined, and for the region 14, EO(2), i.e., the second kind of edge offset, is determined. For the region 17, BO(2), i.e., the second kind of band offset, is determined, and for the region 18, BO(1), i.e., the first kind of band offset, is determined. For the region 4, EO(1), i.e., the first kind of edge offset, is determined.

Next, with reference to FIGS. 20A, 20B, 20C, 20D, 20E, and 20F, a detail of edge offset will be described.

In edge offset, a comparison is made between the pixel value of a focused pixel which is a processing target (focused pixel value) and the pixel values of neighboring pixels located in the neighborhood of (e.g., adjacent to) the focused pixel (neighboring pixel values), and for a category associated therewith, an offset value is transmitted.

For edge offset, there are four 1D patterns shown in FIGS. 20A, 20B, 20C, and 20D and two 2D patterns shown FIGS. 20E and 20F, and an offset is transmitted therefor based on the categories shown in FIGS. 21A and 21B.

FIG. 20A shows a 1-D, 0-degree pattern in which neighboring pixels are arranged one-dimensionally to the left and right of a focused pixel C, i.e., which forms an angle of 0 degrees with the pattern shown in FIG. 20A. FIG. 20B shows a 1-D, 90-degree pattern in which neighboring pixels are arranged one-dimensionally above and below a focused pixel C, i.e., which forms an angle of 90 degrees with the pattern shown in FIG. 20A.

FIG. 20C shows a 1-D, 135-degree pattern in which neighboring pixels are arranged one-dimensionally to the upper left and lower right of a focused pixel C, i.e., which forms an angle of 135 degrees with the pattern shown in FIG. 20A. FIG. 20D shows a 1-D, 135-degree pattern in which neighboring pixels are arranged one-dimensionally to the upper right and lower left of a focused pixel C, i.e., which forms an angle of 45 degrees with the pattern shown in FIG. 20A.

FIG. 20E shows a 2-D, cross pattern in which neighboring pixels are arranged two-dimensionally above, below, and to the left and right of a focused pixel C, i.e., which crosses the focused pixel C. FIG. 20F shows a 2-D, diagonal pattern in which neighboring pixels are arranged two-dimensionally to the upper right, lower left, upper left, and lower right of a focused pixel C, i.e., which diagonally crosses the focused pixel C.

FIG. 21A shows a classification rule for 1-D patterns. The patterns shown in FIGS. 20A, 20B, 20C, and 20D are classified into five types of categories such as those shown in FIG. 21A, and an offset is calculated based on the categories and is transmitted to the decoding unit.

When the pixel value of the focused pixel C is smaller than the pixel values of two neighboring pixels, this pattern is classified into category 1. When the pixel value of the focused pixel C is smaller than the pixel value of one neighboring pixel and matches the pixel value of the other neighboring pixel, this pattern is classified into category 2. When the pixel value of the focused pixel C is larger than the pixel value of one neighboring pixel and matches the pixel value of the other neighboring pixel, this pattern is classified into category 3. When the pixel value of the focused pixel C is larger than the pixel values of two neighboring pixels, this pattern is classified into category 4. In the case of none of the above, the pattern is classified into category 0.

FIG. 21B shows a classification rule for 2-D patterns The patterns shown in FIGS. 20E and 20F are classified into seven types of categories such as those shown in FIG. 21B, and an offset is transmitted to the decoding unit based on the categories.

When the pixel value of the focused pixel C is smaller than the pixel values of four neighboring pixels, this pattern is classified into category 1. When the pixel value of the focused pixel C is smaller than the pixel values of three neighboring pixels and matches the pixel value of the fourth neighboring pixel, this pattern is classified into category 2. When the pixel value of the focused pixel C is smaller than the pixel values of three neighboring pixels and is larger than the pixel value of the fourth neighboring pixel, this pattern is classified into category 3.

When the pixel value of the focused pixel C is larger than the pixel values of three neighboring pixels and is smaller than the pixel value of the fourth neighboring pixel, this pattern is classified into category 4. When the pixel value of the focused pixel C is larger than the pixel values of three neighboring pixels and matches the pixel value of the fourth neighboring pixel, this pattern is classified into category 5. When the pixel value of the focused pixel Cis larger than the pixel values of four neighboring pixels, this pattern is classified into category 6. In the case of none of the above, the pattern is classified into category 0.

As described above, in edge offset, 1D patterns only need to make a comparison for two adjacent pixels and thus have a lower amount of computation. Note that in a high efficiency coding condition, a 1-bit offset value is made more accurate compared to a low delay coding condition and is transmitted to the decoding side.

As such, in edge offset, upon processing a focused pixel, its neighboring pixels are referred to. Therefore, for example, as in the case of calculation of SML which is described with reference to FIGS. 7 to 10, when a neighboring pixel to be referred to is present in a different slice than a focused slice, an offset value for the focused pixel for edge offset cannot be calculated until the process for the slice in which the neighboring pixel is present has been completed.

For example, when a focused pixel which is a processing target is present at an edge of a focused slice and a neighboring pixel to be referred to is located in another slice (neighboring slice), the process for the focused pixel (or the entire focused slice) cannot start until the process for the neighboring slice has been completed. In such a case, the neighboring slice and the focused slice cannot be processed independently of each other. Thus, for example, the neighboring slice and the focused slice cannot be processed in parallel and thus the processing time increases, which may cause a reduction in throughput.

In addition, the case is not limited to such a boundary between slices, and it is also considered, for example, that when a focused pixel is present at a picture edge, a neighboring pixel to be referred to is located outside a picture (outside a valid pixel region) (i.e., virtually not present). In such a case, too, the neighboring pixel is unavailable as in the case of being present in another slice.

In such a case, the focused pixel is not processed normally, which may cause an increase in processing time due to an error process, etc. In addition, it may become a cause of degradation in the image quality of a decoded image.

Hence, to suppress such an increase in processing time, by applying the present technique so that slices can be processed independently of each other, an adaptive offset process for a focused pixel is performed without referring to other slices than a focused slice.

[Image Coding Apparatus]

Figure 22:
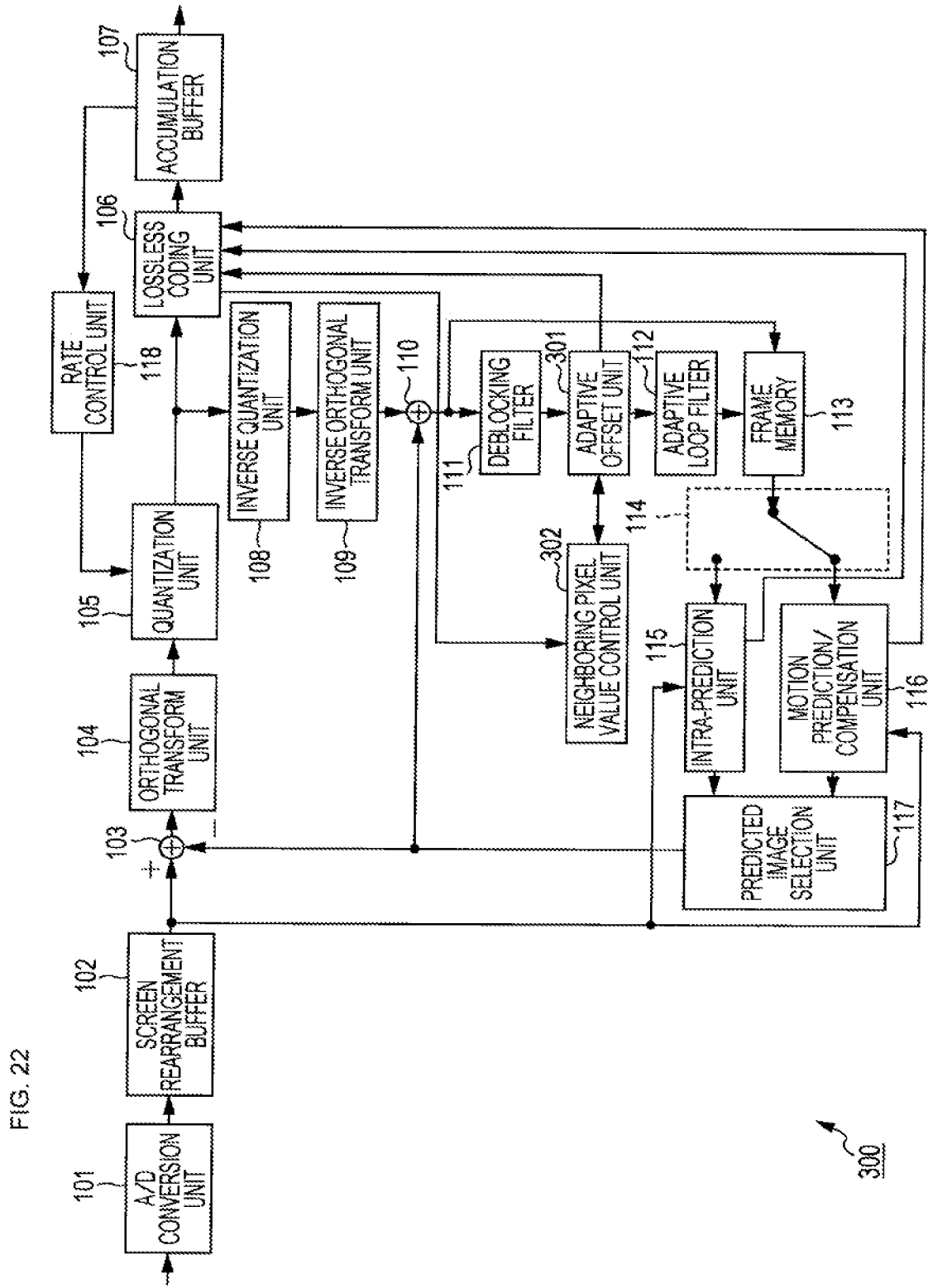
FIG. 22 is a block diagram showing another exemplary configuration of an image coding apparatus.

FIG. 22 is a block diagram showing an exemplary main configuration of an image coding apparatus.

An image coding apparatus 300 shown in FIG. 22 is basically the same image processing apparatus as the image coding apparatus 100 of FIG. 1, and codes image data using a prediction process, like an H.264 and MPEG4 Part10 (AVC) coding scheme.

As shown in FIG. 22, the image coding apparatus 300 basically has the same configuration as the image coding apparatus 100 and basically performs the same processes. Note, however, that the image coding apparatus 300 has an adaptive offset unit 301 and a neighboring pixel value control unit 302, in addition to the configuration of the image coding apparatus 100. Note that although in FIG. 22 a filter coefficient control unit 121 is omitted, it is of course possible to provide a filter coefficient control unit 121 as in FIG. 1.

In the case of the example of FIG. 22, a deblocking filter 111 supplies a filter-processed decoded image to the adaptive offset unit 301.

The adaptive offset unit 301 performs region partitioning on the deblocking filter processing result (a reconstructed image having been subjected to removal of blockiness) so as to obtain a quad-tree structure, and performs an adaptive offset process (adaptive offset filter (Picture Quality Adaptive Offset: PQAO) process) on a region-by-region basis. At that time, in a mode in which neighboring pixel values are referred to upon the process for a focused pixel (e.g., edge offset mode), the adaptive offset unit 301 calculates an offset value for a focused pixel value using neighboring pixel values which are made available by control by the neighboring pixel value control unit 302.

The adaptive offset unit 301 determines cost function values for the offset processing result in the respective modes, and selects a mode with the smallest value. The adaptive offset unit 301 performs an offset process in the selected mode, and supplies the offset processing result to an adaptive loop filter 112. In addition, the adaptive offset unit 301 supplies a quad-tree structure indicating region partitioning results and selection information which is information about mode selection (PQAO Info.) to a lossless coding unit 106 to transmit those pieces of information to the decoding side.

Note that the adaptive offset unit 301 performs the offset process on a slice-by-slice basis. More specifically, the adaptive offset unit 301 performs the offset process on a per specified partial region (e.g., an LCU) basis, the partial regions being obtained by dividing a slice. That is, the adaptive offset unit 301 can process slices independently of each other.

The adaptive loop filter 112 performs, using the Wiener Filter, a loop filter process on the adaptive offset processing result, and thereby improves image quality. Note that although in FIG. 22 an arrow from the adaptive loop filter 112 to the lossless coding unit 106 is omitted, the adaptive loop filter 112 may supply alf_flag, a filter coefficient, etc., to the lossless coding unit 106 to transmit them to the decoding side.

The lossless coding unit 106 codes, for example, those pieces of information supplied from the adaptive offset unit 301, includes the coded information in a bit stream, and transmits the bit stream to the decoding side. By using this method, coding efficiency can be improved.

The neighboring pixel value control unit 302 controls neighboring pixel values which are referred to when the adaptive offset unit 301 calculates an offset value. Specifically, when a neighboring pixel value to be referred to by the adaptive offset unit 301 is unavailable, the neighboring pixel value control unit 302 sets, instead of the value, an available value as a neighboring pixel value (the unavailable value is replaced by the available value).

Here, the term "unavailable" refers to the case in which a neighboring pixel to be referred to is not present in a focused slice which is a processing target (a slice in which a focused pixel is present). For example, such a case includes one in which the neighboring pixel is located in a slice different than the focused slice, and one in which the neighboring pixel is located outside a picture (i.e., not present).

For example, the neighboring pixel value control unit 302 may adopt, instead of the pixel value of an unavailable neighboring pixel, for example, the pixel value of an available pixel located near the neighboring pixel (including a pixel adjacent to the neighboring pixel), as a neighboring pixel value, utilizing the pixel-value correlation between pixels. Furthermore, as the pixel near the neighboring pixel, a focused pixel may be adopted.

In addition, to facilitate computation, a specified, fixed value may be used instead of the pixel value of an unavailable neighboring pixel.

Of course, other methods may be used. For example, a result of specified computation using the pixel value(s) of one or a plurality of other available pixels, etc., may be used instead of the pixel value of an unavailable neighboring pixel.

The neighboring pixel value control unit 302 obtains information about the position (coordinates) of a focused pixel from the adaptive offset unit 301. In addition, the neighboring pixel value control unit 302 obtains address information including information about the positions (coordinates) of LCUs, information about slice boundaries (boundaries between slices, picture edges, and the like), etc., from the lossless coding unit 106.

The neighboring pixel value control unit 302 determines based on the address information whether neighboring pixel values for the focused pixel specified by the adaptive offset Unit 301 are available or not. For example, when a neighboring pixel value is available, the neighboring pixel value control unit 302 sets the pixel value of the neighboring pixel as a neighboring pixel value to be referred to by the adaptive offset unit 301, and supplies information thereabout (neighboring pixel specification information) to the adaptive offset unit 301.

Alternatively, for example, when a neighboring pixel value is unavailable, the neighboring pixel value control unit 302 determines a value that is used instead of the neighboring pixel value, sets the value as a neighboring pixel value to be referred to by the adaptive offset unit 301, and supplies information thereabout (neighboring pixel specification information) to the adaptive offset unit 301.

The adaptive offset unit 301 performs a process using neighboring pixel values specified by the neighboring pixel value control unit 302 and can thereby always perform an adaptive offset process using available neighboring pixel values. By this, the image coding apparatus 300 can implement parallelization of slice-by-slice processes, enabling to suppress an increase in processing time caused by the occurrence of unwanted delay time in an adaptive offset process, etc.

[Adaptive Offset Unit]

Figure 23:
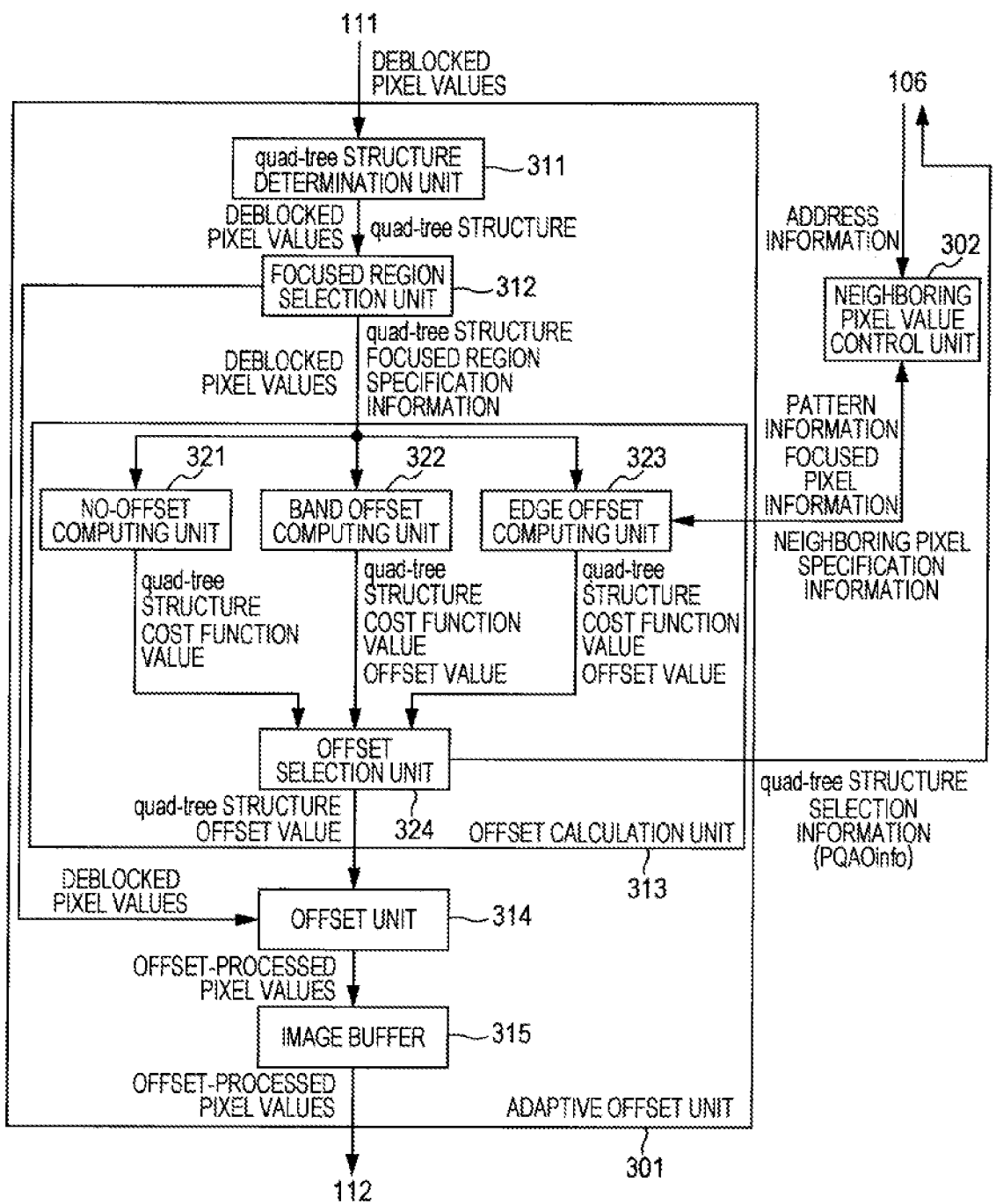
FIG. 23 is a block diagram showing an exemplary main configuration of an adaptive offset unit.

FIG. 23 is a block diagram showing an exemplary main configuration of the adaptive offset unit 301. As shown in FIG. 23, the adaptive offset unit 301 has a quad-tree structure determination unit 311, a focused region selection unit 312, an offset calculation unit 313, an offset unit 314, and a pixel buffer 315.

The quad-tree structure determination unit 311 performs region partitioning on each of a plurality of specified regions (e.g., LCUs) into which a slice is divided, in the manner described with reference to FIG. 19, for example, and thereby obtains a quad-tree structure. Note that although an adaptive offset process performed by the adaptive offset unit 301 can be performed on a per arbitrary region basis, in the following an adaptive offset process is performed on an LCU-by-LCU basis. In this case, each partial region obtained by partitioning an LCU into a quad-tree structure (region partitioning) is a CU.

When the quad-tree structure determination unit 311 partitions an LCU into a quad-tree structure and thereby sets each CU, the quad-tree structure determination unit 311 supplies information indicating the quad-tree structure and deblocked pixel values to the focused region selection unit 312.

The focused region selection unit 312 selects, based on the supplied quad-tree structure, the CUs one by one in turn as a processing target. The focused region selection unit 312 ultimately selects all CUs in the LCU as a processing target. The focused region selection unit 312 supplies the quad-tree structure supplied from the quad-tree structure determination unit 311 and focused region specification information indicating a specified focused region (focused CU), to the offset calculation unit 313. In addition, the focused region selection unit 312 supplies deblocked pixel values in the focused region to the offset calculation unit 313. Note that the focused region selection unit 312 also supplies, if necessary, deblocked pixel values in other regions than the focused region to the offset calculation unit 313.

The offset calculation unit 313 calculates an offset value for each pixel in the focused region specified by the focused region specification information which is supplied from the focused region selection unit 312. The offset calculation unit 313 can calculate an offset value in any number of modes. The offset calculation unit 313 determines cost function values for the offset processing results in the respective modes, and selects a mode with the smallest value.

At that time, the offset calculation unit 313 performs the process in a mode in which neighboring pixel values are referred to, using the pixel values of neighboring pixels specified by the neighboring pixel value control unit 302.

The offset calculation unit 313 supplies the offset values in the selected modes together with the quad-tree structure, to the offset unit 314. In addition, the offset calculation unit 313 supplies selection information (PQAOinfo) indicating the mode selection results, etc., together with the quad-tree structure, to the lossless coding unit 106 to code them.

As shown in FIG. 23, the offset calculation unit 313 has a no-offset computing unit 321, a band offset computing unit 322, an edge offset computing unit 323, and an offset selection unit 324.

It is assumed that in the offset calculation unit 313, for the kinds (modes) of adaptive offset, there are prepared in advance two kinds of modes called band offset and six kinds of modes called edge offset and furthermore a mode in which offset is not adapted. The number and kind of adaptive offset mode may be any number and any kind. For example, other modes than those described above may be included, or some or all of the above-described modes may be omitted. The offset calculation unit 313 has processing units for the respective modes serving as options.

The no-offset computing unit 321 calculates a cost function value in a mode in which offset is not adapted. The no-offset computing unit 321 supplies the calculated cost function value together with the quad-tree structure, to the offset selection unit 324.

The band offset computing unit 322 determines an offset value for each of the two kinds of band offset modes, and further determines a cost function value for an offset processing result using the offset value. The band offset computing unit 322 supplies the offset values and the cost function values which are calculated for each of the two kinds of band offset modes, together with the quad-tree structure to the offset selection unit 324.

The edge offset computing unit 323 determines an offset value for each of the six kinds of edge offset modes, and further determines a cost function value for an offset processing result using the offset value.

At that time, the edge offset computing unit 323 provides the neighboring pixel value control unit 302 with information about a focused pixel and neighboring pixels. Based on those pieces of information and address information obtained from the lossless coding unit 106, the neighboring pixel value control unit 302 specifies neighboring pixels to be referred to, and supplies neighboring pixel specification information thereabout to the edge offset computing unit 323. The edge offset computing unit 323 performs calculation of an offset value using available neighboring pixel values specified by the neighboring pixel specification information.

The edge offset computing unit 323 supplies the offset values and the cost function values which are calculated for each of the six kinds of edge offset modes, together with the quad-tree structure to the offset selection unit 324.

The offset selection unit 324 selects a mode to be adopted. The offset selection unit 324 compares the supplied cost function values for the respective modes, and selects a mode with the smallest value. The offset selection unit 324 supplies the offset value for the selected mode together with the quad-tree structure, to the offset unit 314. In addition, the offset selection unit 324 supplies selection information (PQAOinfo) indicating the selected mode, etc., together with the quad-tree structure to the lossless coding unit 106 to code the information and transmit the coded information to the decoding side.

The offset unit 314 obtains from the focused region selection unit 312 deblocked pixel values in the focused region, and performs an offset process on the deblocked pixel values, using the offset values supplied from the offset calculation unit 313 (offset selection unit 324). The offset unit 314 supplies the obtained offset-processed pixel values to the pixel buffer 315 to store the pixel values.

The pixel buffer 315 supplies the offset-processed pixel values stored therein to the adaptive loop filter 112 at specified timing or according to a request from an external source.

[Edge Offset Computing Unit and Neighboring Pixel Value Control Unit]

Figure 24:
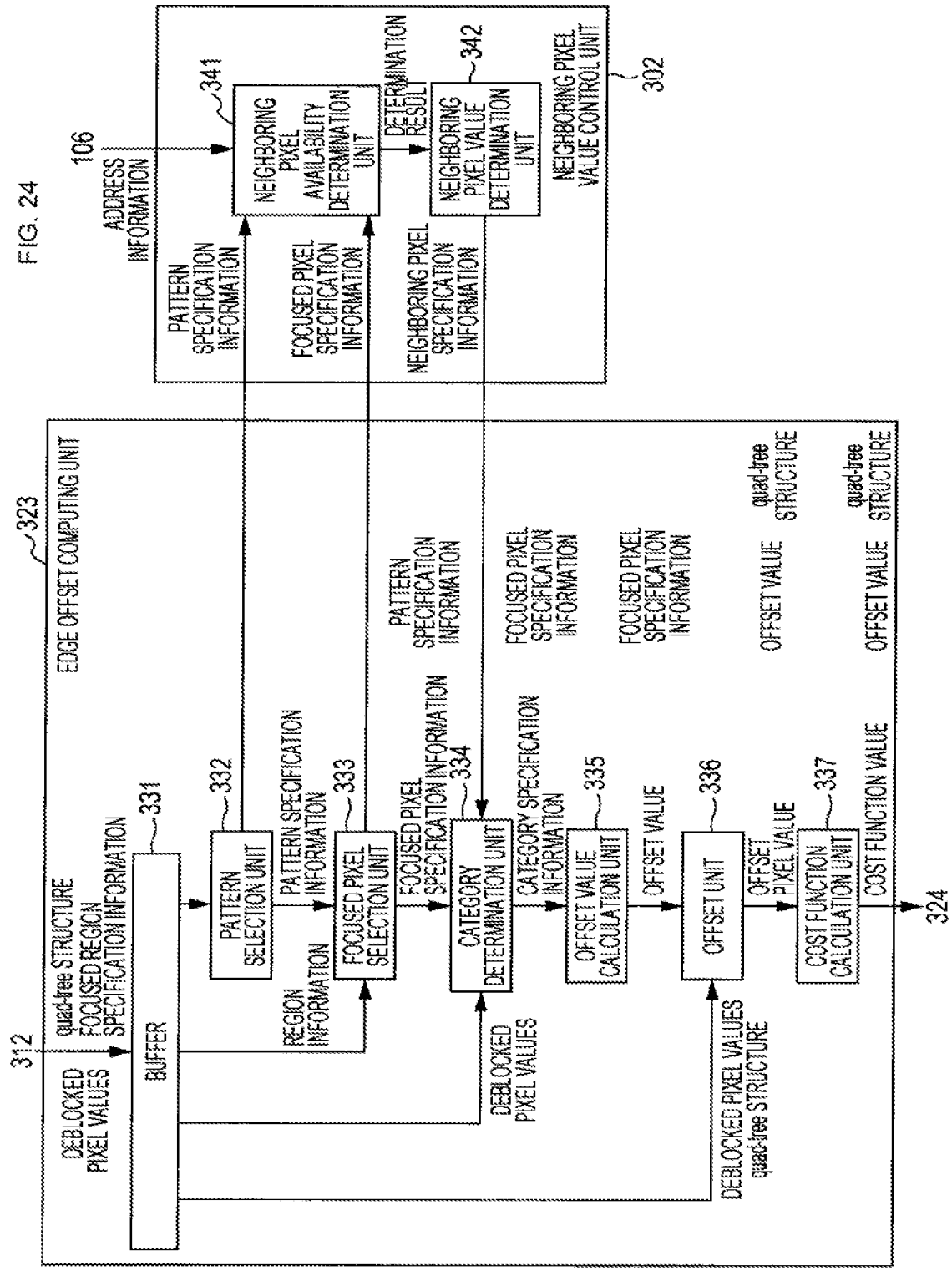
FIG. 24 is a block diagram showing an exemplary main configuration of an edge offset computing unit and a neighboring pixel value control unit.

FIG. 24 is a block diagram showing an exemplary main configuration of the edge offset computing unit 323 and the neighboring pixel value control unit 302.

As shown in FIG. 24, the edge offset computing unit 323 has a buffer 331, a pattern selection unit 332, a focused pixel selection unit 333, a category determination unit 334, an offset value calculation unit 335, an offset unit 336, and a cost function calculation unit 337.

The buffer 331 obtains a quad-tree structure and focused region specification information which are supplied from the focused region selection unit 312, and obtains deblocked pixel values supplied from the focused region selection unit 312, and stores them. The deblocked pixel values are held until they are no longer used as a focused pixel value or neighboring pixel values. When the buffer 331 obtains pixel values in a focused region, the buffer 331 controls the pattern selection unit 332 to perform a process. In addition, the buffer 331 supplies information about the focused region (region information) to the focused pixel selection unit 333. Furthermore, the buffer 331 supplies the deblocked pixel values stored therein to the category determination unit 334 and the offset unit 336.

The pattern selection unit 332 sequentially selects one of a plurality of neighboring pixel patterns such as those described with reference to FIGS. 20A, 20B, 20C, 20D, and 20F. Specifically, the pattern selection unit 332 selects six kinds of edge offset modes one by one. The pattern selection unit 332 repeats such a selection until all patterns have been selected. The pattern selection unit 332 supplies pattern specification information indicating the selected pattern, to the focused pixel selection unit 333 and the neighboring pixel value control unit 302 (neighboring pixel availability determination unit 341).

The focused pixel selection unit 333 obtains the information about the focused region (region information) from the buffer 331, and selects focused pixels serving as processing targets one by one from the focused region. The focused pixel selection unit 333 repeats such a selection until all pixels in the focused region have been selected. The focused pixel selection unit 333 supplies focused pixel specification information indicating the focused pixel, together with the pattern specification information supplied from the pattern selection unit 332, to the category determination unit 334. In addition, the focused pixel selection unit 333 supplies the focused pixel specification information to the neighboring pixel value control unit 302 (neighboring pixel availability determination unit 341).

The category determination unit 334 determines a category for the focused pixel specified by the focused pixel specification information, based on the table shown in FIGS. 21A and 21B, for example. That is, the category determination unit 334 determines a category based on neighboring pixel values and a focused pixel value. Note that the category classification method may be any method and thus is not limited to the example of FIGS. 21A and 21B. Upon the category determination, the category determination unit 334 utilizes, as neighboring pixel values, the pixel values of neighboring pixels specified by neighboring pixel specification information which is supplied from the neighboring pixel value control unit 302 (neighboring pixel value determination unit 342).

The neighboring pixel value control unit 302 (neighboring pixel value determination unit 342) specifies available values as neighboring pixel values. Therefore, the pixel values of neighboring pixels specified by neighboring pixel specification information are always available. Therefore, the category determination unit 334 can determine a category for the focused pixel without the need to wait until the processes for other pixels have been completed. That is, the category determination unit 334 can suppress an increase in unnecessary processing time in an adaptive offset process.

The category determination unit 334 obtains from the buffer 331 the pixel value of the focused pixel (deblocked pixel value) and the pixel values of available pixels (e.g., the focused pixel) (deblocked pixel values) specified by the neighboring pixel specification information. The category determination unit 334 determines a category using those pixel values. The category determination unit 334 supplies category specification information indicating the determined category, together with the focused pixel specification information supplied from the focused pixel selection unit 333, to the offset value calculation unit 335.

The offset value calculation unit 335 calculates an offset value for the category specified by the supplied category specification information. For example, offset values may be preset for the respective categories, or offset value calculation methods may be preset for the respective categories. The offset value calculation unit 335 supplies the calculated offset value, together with the focused pixel specification information supplied from the category determination unit 334, to the offset unit 336.

The offset unit 336 obtains from the buffer 331 the pixel value of the focused pixel (deblocked pixel value) specified by the supplied focused pixel specification information. The offset unit 336 performs an offset process on the focused pixel value using the supplied offset value, and thereby generates an offset pixel value. The offset unit 336 also obtains a quad-tree structure from the buffer 331. The offset unit 336 supplies the generated offset pixel value together with the offset value supplied from the offset value calculation unit 335 and the quad-tree structure obtained from the buffer 331, to the cost function calculation unit 337.

The focused pixel selection unit 333 to the offset unit 336 repeat the above-described processes for all pixels in the focused region (or all of some predetermined pixels) to determine offset pixel values for all pixels in the focused region. The offset pixel values together with the offset values and the quad-tree structure are supplied to the cost function calculation unit 337.

The cost function calculation unit 337 calculates a cost function value for the focused region using the offset pixel values. The cost function calculation unit 337 supplies the calculated cost function value together with the offset values and the quad-tree structure which are supplied from the offset unit 336, to the offset selection unit 324.

The pattern selection unit 332 to the cost function calculation unit 337 repeat the above-described processes for all kinds (types) of edge offset modes, and supply cost function values for the respective modes (respective types) to the offset selection unit 324.

In addition, in the case of the example of FIG. 24, the neighboring pixel value control unit 302 has the neighboring pixel availability determination unit 341 and the neighboring pixel value determination unit 342.

The neighboring pixel availability determination unit 341 obtains address information about a focused LCU, slice boundaries, etc., from the lossless coding unit 106 and obtains pattern specification information from the pattern selection unit 332 and focused pixel specification information from the focused pixel selection unit 333. The neighboring pixel availability determination unit 341 grasps the position of a focused pixel from the focused pixel specification information and further grasps the positions of neighboring pixels of the focused pixel from the pattern specification information. The neighboring pixel availability determination unit 341 compares the positions of the neighboring pixels with the slice boundaries, etc., indicated by the address information to determine, based on the comparison results whether the neighboring pixels are available. The neighboring pixel availability determination unit 341 supplies the determination results to the neighboring pixel value determination unit 342.

The neighboring pixel value determination unit 342 determines neighboring pixels based on the determination results supplied from the neighboring pixel availability determination unit 341. For example, when the determination result shows that a neighboring pixel identified by pattern specification information is available, the neighboring pixel value determination unit 342 determines the neighboring pixel identified by the pattern specification information, as a neighboring pixel. Alternatively, for example, when the determination result shows that a neighboring pixel identified by pattern specification information is unavailable, the neighboring pixel value determination unit 342 determines an available pixel (e.g., a focused pixel) as a neighboring pixel. The value used instead of the unavailable pixel value may be any value, as described above. For example, the value may be other than a pixel value, e.g., a fixed value, an arithmetic expression, etc. In that case, the neighboring pixel value determination unit 342 may specify those pieces of information (a fixed value, an arithmetic expression, etc.) instead of specifying a pixel. The neighboring pixel value determination unit 342 generates neighboring pixel specification information indicating the neighboring pixels determined thereby (or information corresponding thereto) and supplies the neighboring pixel specification information to the category determination unit 334.

By controlling neighboring pixels in this manner, the neighboring pixel value control unit 302 can always make neighboring pixel values to be available values. Therefore, the edge offset computing unit 323 can suppress an increase in unnecessary processing time.

Although the above describes the case in which the edge offset computing unit 323 utilizes neighboring pixels specified by the neighboring pixel value control unit 302, the adaptive offset unit 301 can also have a mode, other than edge offset, in which the process for a focused pixel is performed by referring to neighboring pixel values. In that case, a processing unit for that mode in the edge offset computing unit 323 may utilize neighboring pixels specified by the neighboring pixel value control unit 302, as in the case of the edge offset computing unit 323 shown in FIG. 24.

As described above, the image coding apparatus 300 can secure the independence of slice-by-slice processes in an adaptive offset process and inhibit an increase in unnecessary processing time.

[Flow of a Coding Process]

Figure 25:
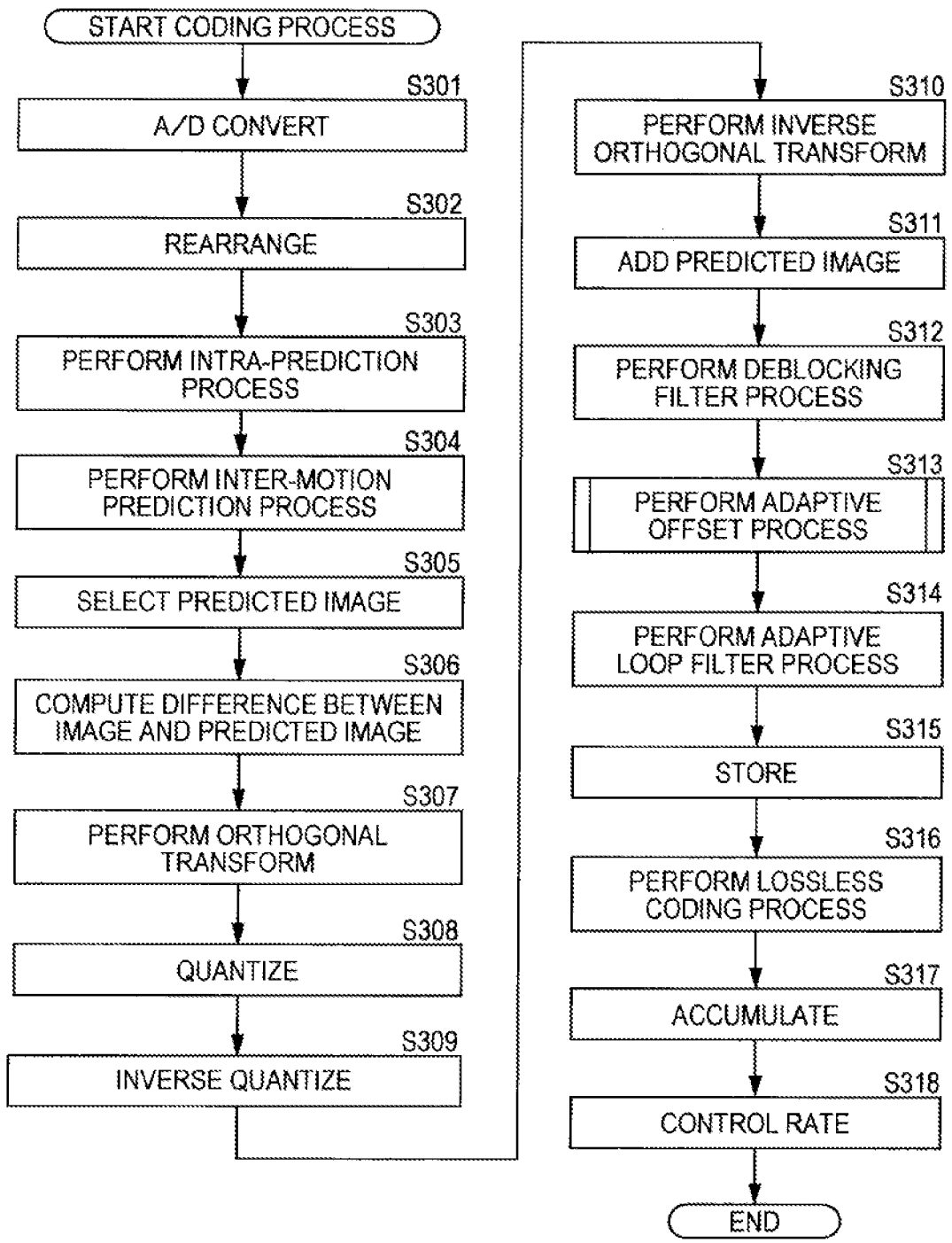
FIG. 25 is a flowchart describing another example of the flow of a coding process.

Next, the flow of processes performed by the image coding apparatus 300 such as that described above will be described. First, with reference to a flowchart of FIG. 25, an example of the flow of a coding process will be described. Note that the processes at the respective steps shown in FIG. 25 are performed in their respective processing units. Therefore, the processing units of the respective processes are not necessarily equal to one another. Thus, although each data is processed by a procedure such as that described below, in practice the processing order of the processes at the respective steps is not always the one such as that described below.

The processes at steps S301 to S312 are performed in the same manner as in the case of the processes at steps S101 to S112 in FIG. 12.

When a deblocking filter process is performed, at step S313, the adaptive offset unit 301 performs an adaptive offset process.

The processes at steps S315 to S318 are performed in the same manner as in the case of the processes at steps S114 to S117 in FIG. 12. When the process at step S318 is completed, the coding process ends.

[Flow of an Adaptive Offset Process]

Figure 26:
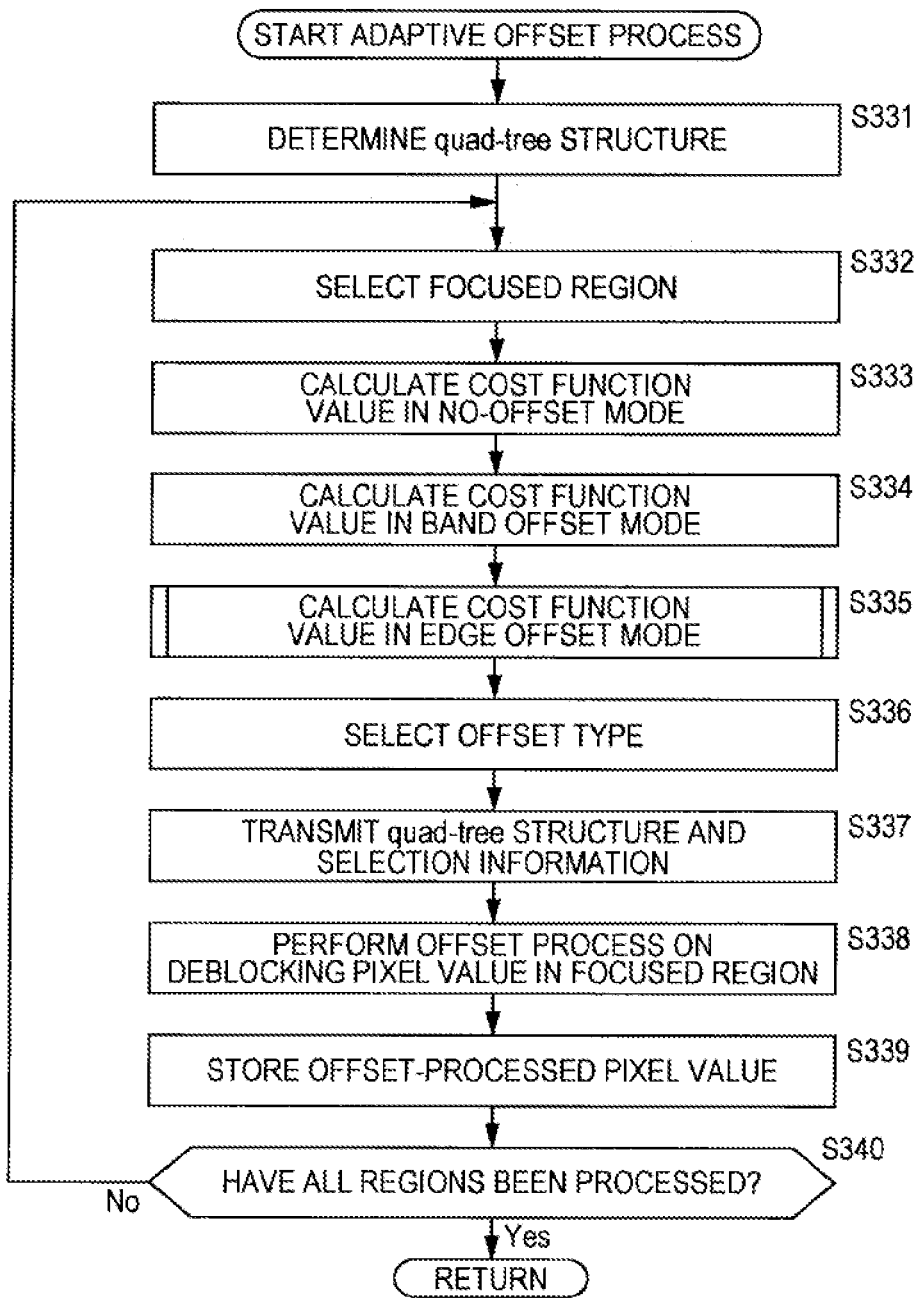
FIG. 26 is a flowchart describing an example of the flow of an adaptive offset process.

Next, with reference to a flowchart of FIG. 26, an example of the flow of the adaptive offset process performed at step S313 in FIG. 25 will be described. Note that the adaptive offset process is performed on a per specified partial region (e.g., an LCU) basis, the partial regions being obtained by dividing a slice. In the following, the adaptive offset process is performed on an LCU-by-LCU basis.

When the adaptive offset process starts, the quad-tree structure determination unit 311 determines, at step S331, a quad-tree structure of a focused LCU which is a processing target.

At step S332, the focused region selection unit 312 selects one of the regions of the quad-tree structure in the LCU in a specified order, as a focused region serving as a processing target.

At step S333, the no-offset computing unit 321 determines an offset value in no-offset mode, performs an offset process using the offset value, and calculates a cost function value.

At step S334, the band offset computing unit 322 determines an offset value in band offset mode, performs an offset process using the offset value, and calculates a cost function value. Note that in the example described above there are two kinds (two types) of band offset modes. Therefore, the band offset computing unit 322 calculates a cost function value for each of the two kinds of modes (two types).

At step S335, the edge offset computing unit 323 determines an offset value in edge offset mode, performs an offset process using the offset value, and calculates a cost function value. A detail of this process will be described later. Note that in the example described above there are six kinds (six types) of edge offset modes. Therefore, the edge offset computing unit 323 calculates a cost function value for each of the six kinds of modes (six types).

The offset calculation unit 313 calculates cost function values in each mode in this manner. Namely, when the offset calculation unit 313 supports any other mode, the processes for that mode are added to the processes at steps S333 to S335.

When cost function values are calculated in all modes, at step S336, the offset selection unit 324 selects a mode (offset type) with the smallest cost function value.

At step S337, the offset selection unit 324 transmits to the decoding side the quad-tree structure which is information indicating the quad-tree structure of the focused LCU determined at step S331, and selection information which is information indicating the selection result obtained at step S336 (also including information about the selected offset type).

At step S338, the offset unit 314 performs an offset process on a deblocking pixel value in the focused region, using the offset value of the offset type selected at step S336. At step S339, the pixel buffer 315 stores the offset-processed pixel value obtained in the process at step S338.

At step S340, the focused region selection unit 312 determines whether all regions (CUs) in the focused LCU have been processed. If it is determined that there is an unprocessed region, then the focused region selection unit 312 puts the process back to step S332 and repeats the subsequent processes. Alternatively, if it is determined at step S340 that there is no unprocessed region, then the focused region selection unit 312 ends the adaptive offset process and puts the process back to FIG. 25.

[Flow of an Edge Offset Process]

Figure 27:
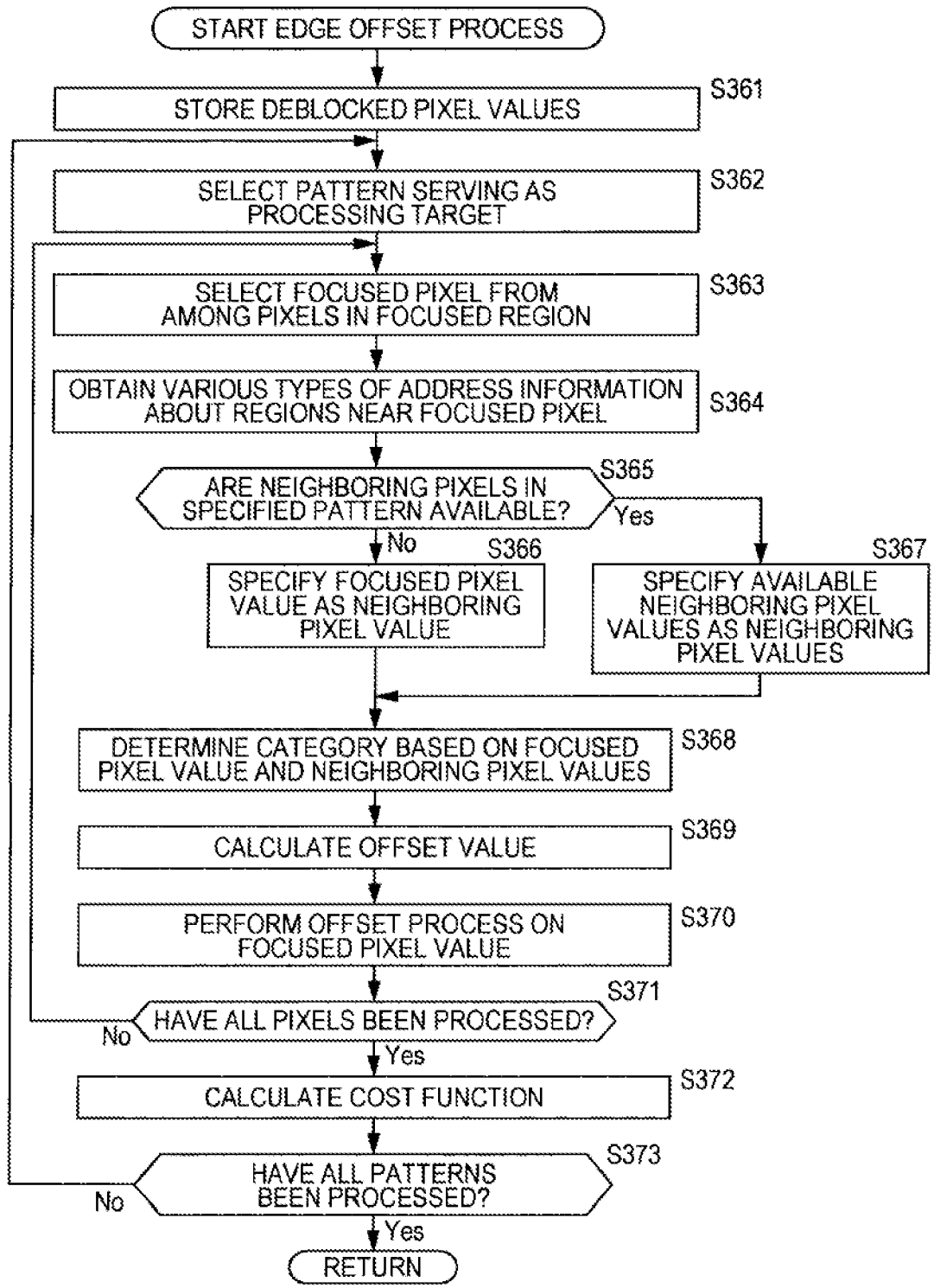
FIG. 27 is a flowchart describing an example of the flow of an edge offset process.

Next, with reference to a flowchart of FIG. 27, an example of the flow of the edge offset process performed at step S335 in FIG. 26 will be described.

When the edge offset process starts, the buffer 331 stores, at step S361, deblocked pixel values. At step S362, the pattern selection unit 332 selects a pattern serving as a processing target. At step S363, the focused pixel selection unit 333 selects a focused pixel from among pixels in a focused region.

At step S364, the neighboring pixel availability determination unit 341 obtains various types of address information about regions near the focused pixel. At step S365, the neighboring pixel availability determination unit 341 determines, based on the information obtained at step S364, whether neighboring pixels of the focused pixel selected at step S363 in the pattern specified at step S362 are available.

If it is determined that the neighboring pixels are not available, then the neighboring pixel availability determination unit 341 advances the process to step S366. At step S366, the neighboring pixel value determination unit 342 specifies a focused pixel value as a neighboring pixel value. When the process at step S366 is completed, the neighboring pixel value determination unit 342 advances the process to step S368.

Alternatively, if it is determined at step S365 that the neighboring pixels are available, then the neighboring pixel availability determination unit 341 advances the process to step S367. At step S367, the neighboring pixel value determination unit 342 specifies the pixel values of the available neighboring pixels as neighboring pixel values. When the process at step S367 is completed, the neighboring pixel value determination unit 342 advances the process to step S368.

At step S368, the category determination unit 334 determines a category based on the focused pixel value and the neighboring pixel values determined at step S366 or step S367.

At step S369, the offset value calculation unit 335 determines (including calculation and selection) an offset value for the category determined at step S368. At step S370, the offset unit 336 performs an offset process on the focused pixel value using the offset value determined at step S369.

At step S371, the focused pixel selection unit 333 determines whether all pixels have been processed. If it is determined that there is an unprocessed pixel in the focused region, then the focused pixel selection unit 333 puts the process back to step S363 and repeats the subsequent processes.

Alternatively, if it is determine at step S371 that all pixels in the focused region have been processed, then the focused pixel selection unit 333 advances the process to step S372.

At step S372, the cost function calculation unit 337 calculates a cost function value using the offset pixel values in the focused region. At step S373, the pattern selection unit 332 determines whether all neighboring pixel patterns prepared in advance (e.g., FIGS. 20A, 20B, 20C, 20D, 20E, and 20F) have been processed (all types have been processed). If it is determined that there is an unprocessed pattern, then the pattern selection unit 332 puts the process back to step S362 and repeats the subsequent processes. Alternatively, if it is determined at step S373 that all patterns have been processed, then the pattern selection unit 332 ends the edge offset process and puts the process back to FIG. 26.

By performing each process in the above-described manner, an adaptive offset process can always be performed using available neighboring pixels. Thus, the image coding apparatus 300 can secure the independence of slice-by-slice processes in an adaptive offset process and inhibit an increase in unnecessary processing time.

4. Fourth Embodiment

[Image Decoding Apparatus]

Figure 28:
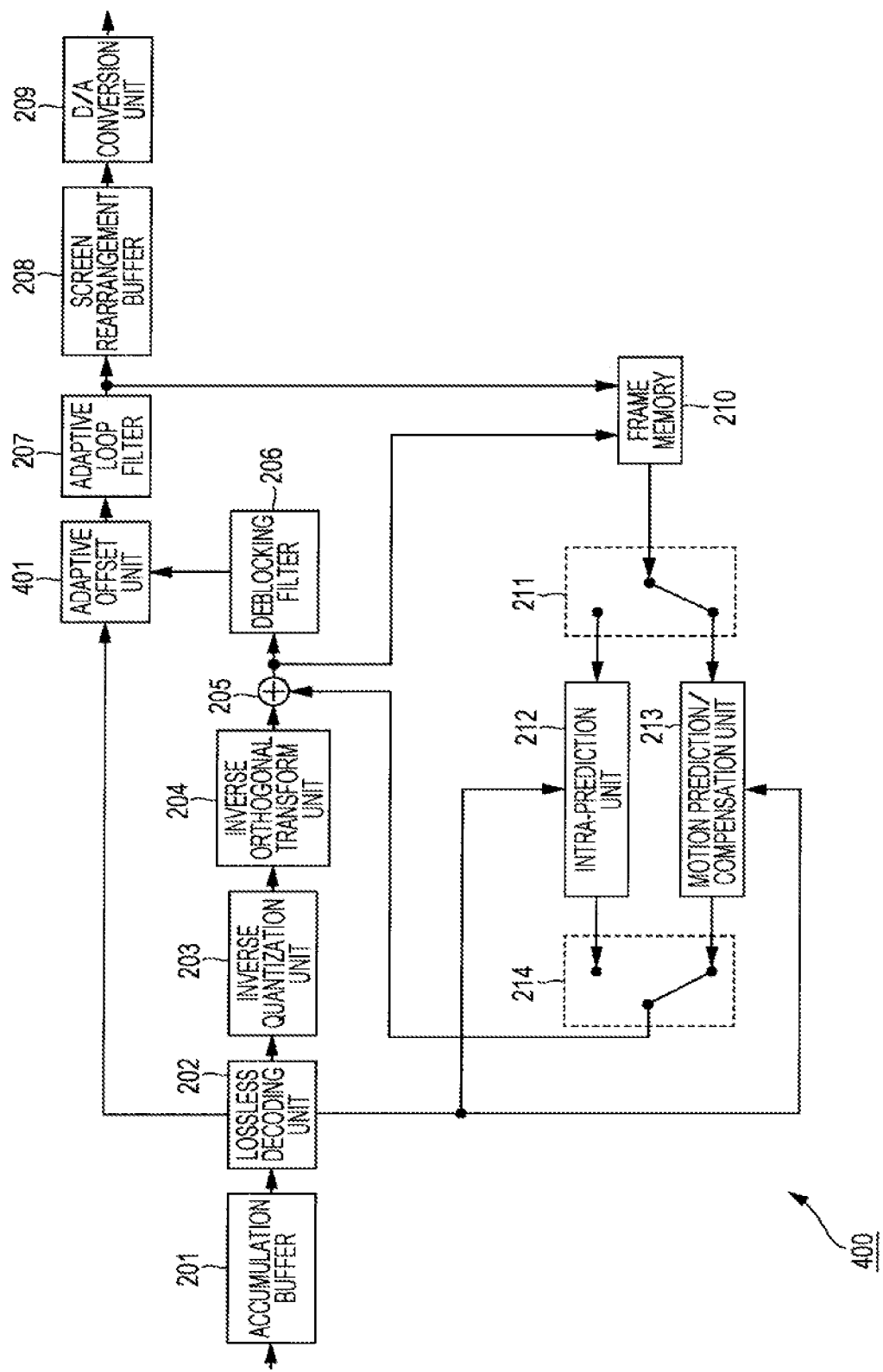
FIG. 28 is a block diagram showing another exemplary configuration of an image decoding apparatus.

FIG. 28 is a block diagram showing an exemplary main configuration of an image decoding apparatus. An image decoding apparatus 400 shown in FIG. 28 decodes coded data generated by the image coding apparatus 300, by a decoding method associated with the coding method.

Therefore, as shown in FIG. 28, the image decoding apparatus 400 is basically the same apparatus as the image decoding apparatus 200 of FIG. 15, and basically has the same configuration and performs the same processes. Note, however, that as shown in FIG. 28 the image decoding apparatus 400 has an adaptive offset unit 401 in addition to the configuration of the image decoding apparatus 200. In addition, a filter coefficient control unit 221 is omitted (may be provided).

A deblocking filter 206 supplies filter-processed decoded image data to the adaptive offset unit 401.

The adaptive offset unit 401 performs an adaptive offset process which is basically the same as in the case of the adaptive offset unit 301, on the decoded image having been subjected to the deblocking filter process. Note, however, that the adaptive offset unit 401 performs an offset process using a quad-tree structure and selection information (PQAOinfo) which are decoded and extracted by a lossless decoding unit 202.

Those pieces of information are supplied from the coding side (image coding apparatus 300). Namely, the adaptive offset unit 401 processes a focused LCU using the same quad-tree structure as that used by the adaptive offset unit 301. In addition, the adaptive offset unit 401 performs an offset process using the same mode (offset type, i.e., an offset value) as that used by the adaptive offset unit 301. That is, the adaptive offset unit 401 performs an offset process by a method appropriate to the adaptive offset unit 301. The adaptive offset unit 401 supplies the offset-processed decoded image to an adaptive loop filter 207.

The adaptive loop filter 207 performs, using the Wiener Filter, a loop filter process (class classification ALF) on the offset-processed decoded image, and thereby improves image quality.

[Adaptive Offset Unit]

Figure 29:
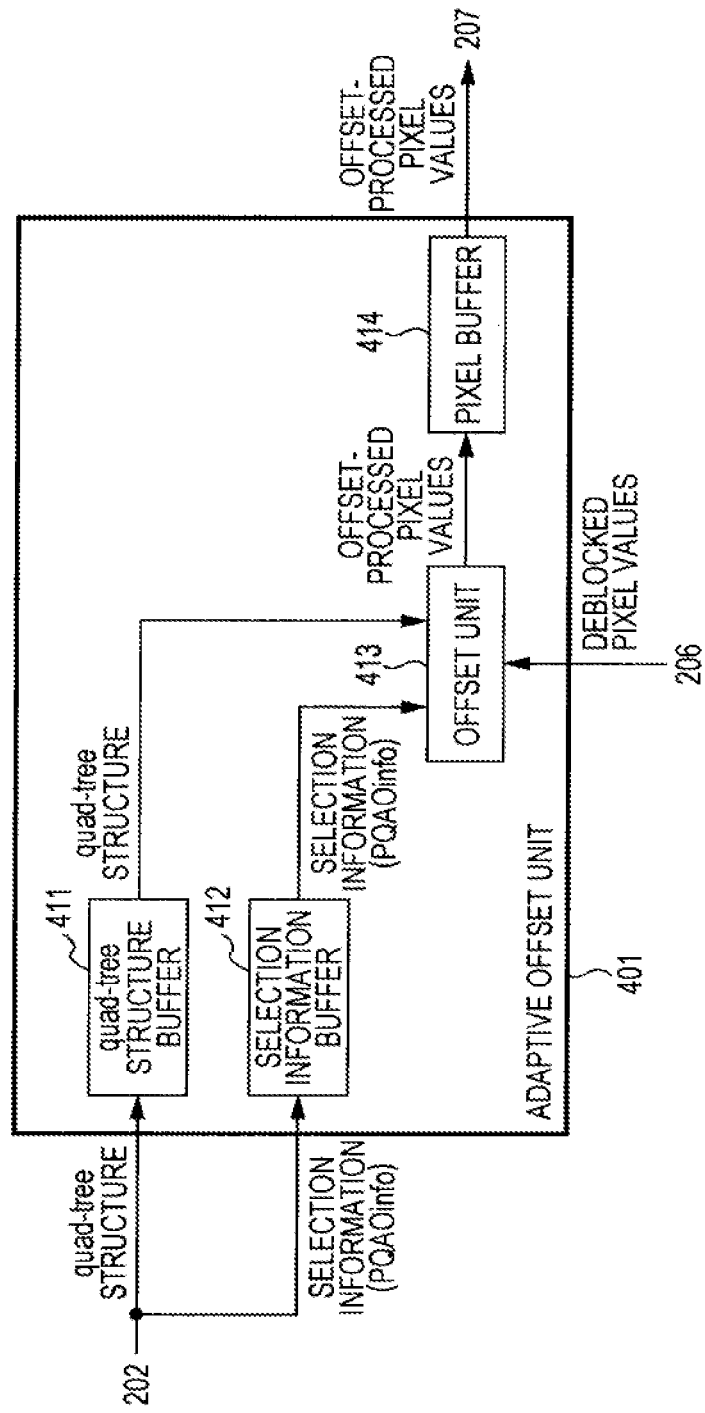
FIG. 29 is a block diagram showing an exemplary main configuration of an adaptive offset unit.

FIG. 29 is a block diagram showing an exemplary main configuration of the adaptive offset unit 401. As shown in FIG. 29, the adaptive offset unit 401 has a quad-tree structure buffer 411, a selection information buffer 412, an offset unit 413, and a pixel buffer 414.

The quad-tree structure buffer 411 obtains and stores a quad-tree structure supplied from the lossless decoding unit 202 (e.g., a quad-tree structure supplied from an apparatus on the coding side, included in a bit stream). The quad-tree structure buffer 411 supplies the quad-tree structure stored therein to the offset unit 413 at specified timing or according to a request from an external source.

The selection information buffer 412 obtains and stores selection information (PQAOinfo) supplied from the lossless decoding unit 202 (e.g., selection information (PQAOinfo) supplied from an apparatus on the coding side, included in a bit stream). The selection information buffer 412 supplies the selection information (PQAOinfo) stored therein to the offset unit 413 at specified timing or according to a request from an external source.

The offset unit 413 performs an offset process on a deblocked pixel value in a focused LCU supplied from the deblocking filter 206, using the quad-tree structure supplied from the quad-tree structure buffer 411 and the selection information (PQAOinfo) supplied from the selection information buffer 412. Specifically, the offset unit 413 performs an offset process on the focused LCU on a per region (CU) basis, using an offset type and an offset value which are identified by the selection information (PQAOinfo) and according to the quad-tree structure. The offset unit 413 supplies the offset-processed pixel value to the pixel buffer 414 to store the pixel value.

The pixel buffer 414 stores the offset-processed pixel value supplied from the offset unit 413, and supplies the offset-processed pixel value stored therein to the adaptive loop filter 207 at specified timing or according to a request from an external source.

Therefore, the adaptive offset unit 401 can perform an adaptive offset process by a method appropriate to the adaptive offset unit 301 of the image coding apparatus 300. Thus, the adaptive offset unit 401 can perform an adaptive offset process independently on a slice-by-slice basis. Accordingly, the image decoding apparatus 400 can secure the independence of slice-by-slice processes in an adaptive offset process and inhibit an increase in unnecessary processing time.

[Flow of a Decoding Process]

Next, with reference to a flowchart of FIG. 30, an example of the flow of a decoding process performed by the image decoding apparatus 400 such as that described above will be described.

Figure 17:
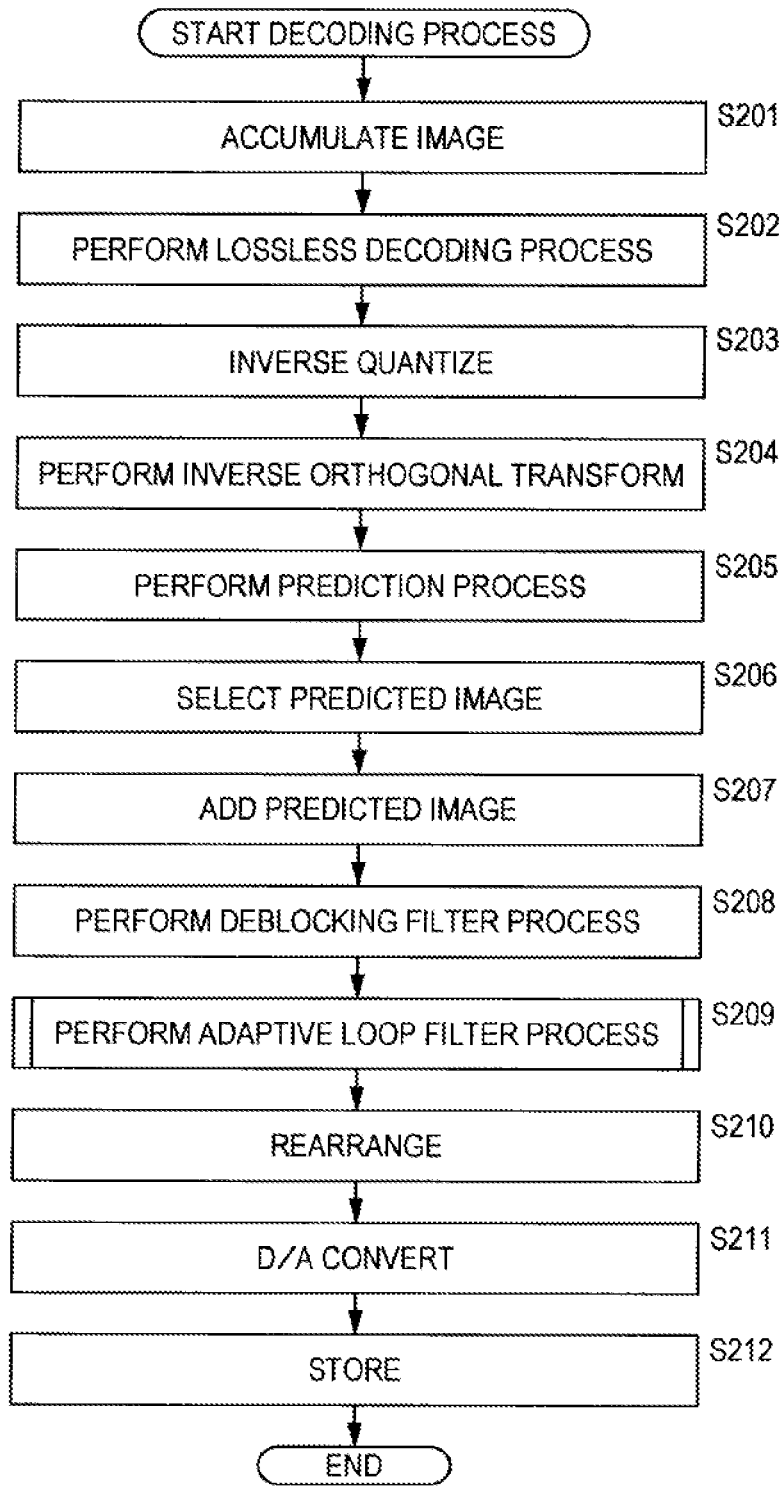
FIG. 17 is a flowchart describing an example of the flow of a decoding process.

When the decoding process starts, the processes at steps S401 to S408 are performed in the same manner as the processes at steps S201 to S208 in FIG. 17. At step S409, the adaptive offset unit 401 performs an adaptive offset process. A detail of this process will be described later. The processes at steps S410 to S413 are performed in the same manner as the processes at steps S209 to S212 in FIG. 17.

[Flow of an Adaptive Offset Process]

Next, with reference to a flowchart of FIG. 31, an example of the flow of the adaptive offset process performed at step S409 in FIG. 30 will be described.

When the adaptive offset process starts, at step S431, the quad-tree structure buffer 411 stores a quad-tree structure. At step S432, the selection information buffer 412 stores selection information.

At step S433, the offset unit 413 selects, based on the quad-tree structure, a focused region from a focused LCU. At step S434, the offset unit 413 performs an offset process on a deblocked pixel value in the focused region, using an offset value identified by the selection information.

At step S435, the pixel buffer 414 stores the offset-processed pixel value obtained in the process at step S434.

At step S436, the offset unit 413 determines whether all regions (CUs) in the focused LCU have been processed. If it is determined that there is an unprocessed region, then the offset unit 413 puts the process back to step S433 and repeats the subsequent processes.

Figure 30:
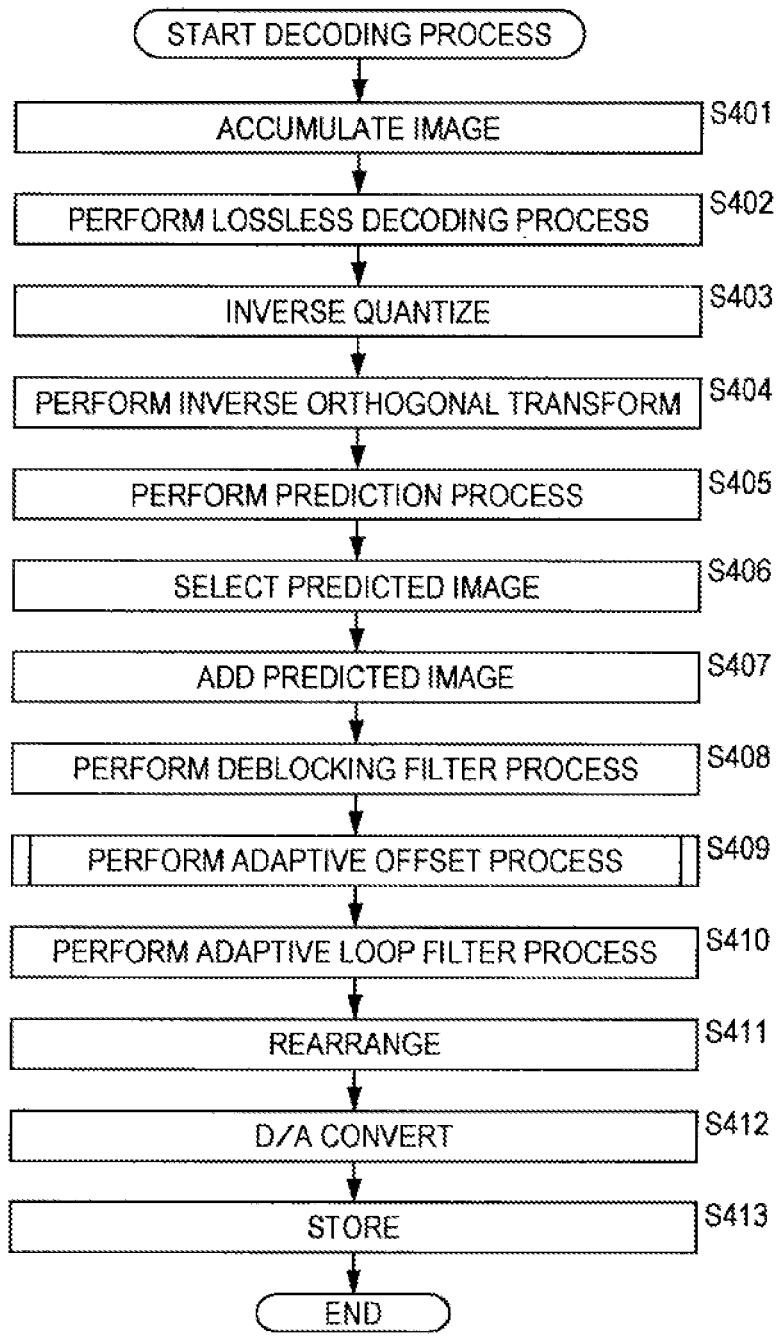
FIG. 30 is a flowchart describing another example of the flow of a decoding process.
Figure 31:
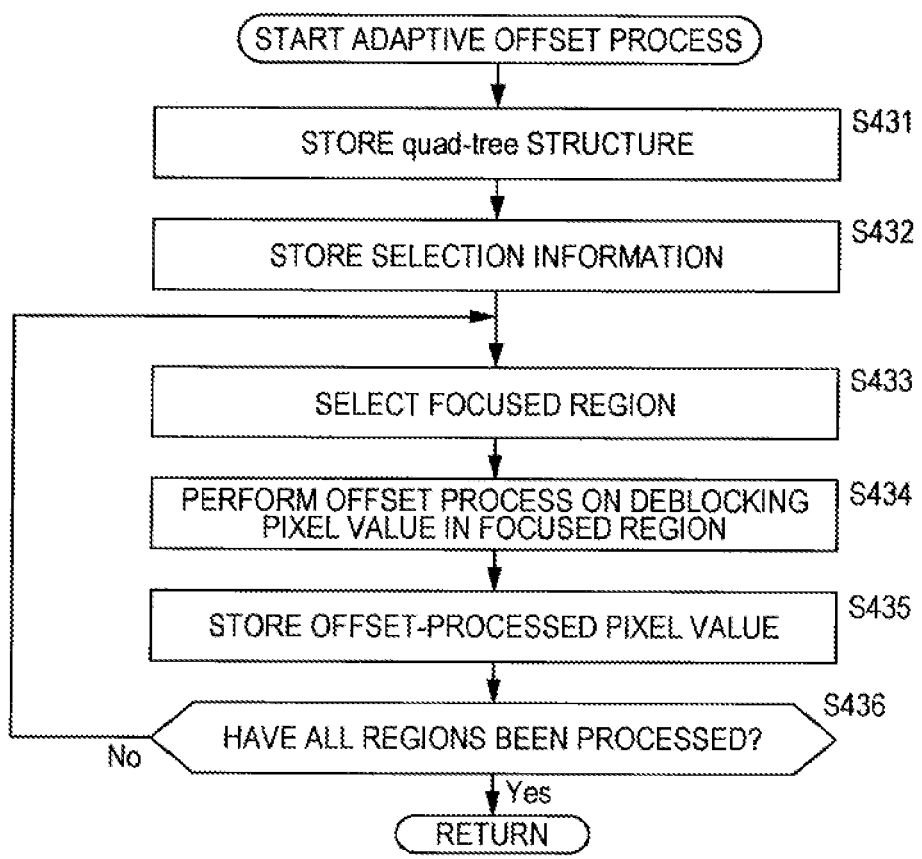
FIG. 31 is a flowchart describing an example of the flow of an adaptive offset process.

Alternatively, if it is determined at step S436 that all regions have been processed, then the offset unit 413 ends the adaptive offset process and puts the process back to FIG. 30.

By performing each process in the above-described manner, the image decoding apparatus 400 can secure the independence of slice-by-slice processes in an adaptive offset process and inhibit an increase in unnecessary processing time.

Other Examples

Note that although the above describes the case in which a neighboring pixel is unavailable due to the positional factor, the reason that a neighboring pixel is unavailable may be any reason, and is not limited to the positional factor. Namely, if a neighboring pixel is unavailable for other reasons, then a neighboring pixel value may be present in a focused slice.

In addition, an adaptive offset process for a focused pixel whose neighboring pixel is not included in a focused slice may be omitted. In that case, both of the image coding apparatus 300 and the image decoding apparatus 400 omit adaptive offset processes for the focused pixel whose neighboring pixel is not included in the focused slice.

In addition, the patterns of neighboring pixels may be any pattern and are not limited to those in the example of FIGS. 20A, 20B, 20C, 20D, 20E, and 20F. Therefore, the positions and number of neighboring pixels may be any position and any number.

In addition, the image coding apparatus 300 (e.g., the adaptive offset unit 301) may generate, for each slice, a flag that controls whether to perform an adaptive offset process independently on a slice-by-slice basis, and transmit the flags to the image decoding apparatus 400.

In a slice set with this flag (e.g., the value is 1), the adaptive offset unit 301 performs, as described above, an adaptive offset process independently on a slice-by-slice basis, using only information on available pixels. On the other hand, in a slice not set with the flag (e.g., the value is 0), even when a neighboring pixel belongs to another slice, the adaptive offset unit 301 performs an adaptive offset process after the pixel values of all neighboring pixels have been obtained.

When the value of the flag supplied from the image coding apparatus 300 is 1, the adaptive offset unit 401 of the image decoding apparatus 400 performs an adaptive offset process such that the focused slice is made independent of other slices. When the value of the flag supplied from the image coding apparatus 300 is 0, the adaptive offset unit 401 performs an adaptive offset process such that the focused slice is not made independent of other slices.

Note that the present technique can be applied to an image coding apparatus and an image decoding apparatus which are used when receiving, for example, image information (bit stream) compressed by an orthogonal transform such as a discrete cosine transform and motion compensation, like MPEG, H.26x, etc., via a network medium such as satellite broadcasting, cable television, the Internet, or a mobile phone. In addition, the present technique can be applied to an image coding apparatus and an image decoding apparatus which are used when performing a process on storage media such as optical and magnetic disks and flash memories. Furthermore, the present technique can also be applied to a motion prediction/compensation apparatus included in those image coding apparatuses and image decoding apparatuses, etc.

5. Fifth Embodiment

[Personal Computer]

The above-described series of processes can be performed by hardware and can be performed by software. When the series of processes are performed by software, a program that forms the software is installed on a computer. Here, the computer includes a computer incorporated in dedicated hardware, a general-purpose personal computer capable of performing various types of functions by installing various types of programs, etc.

Figure 32:
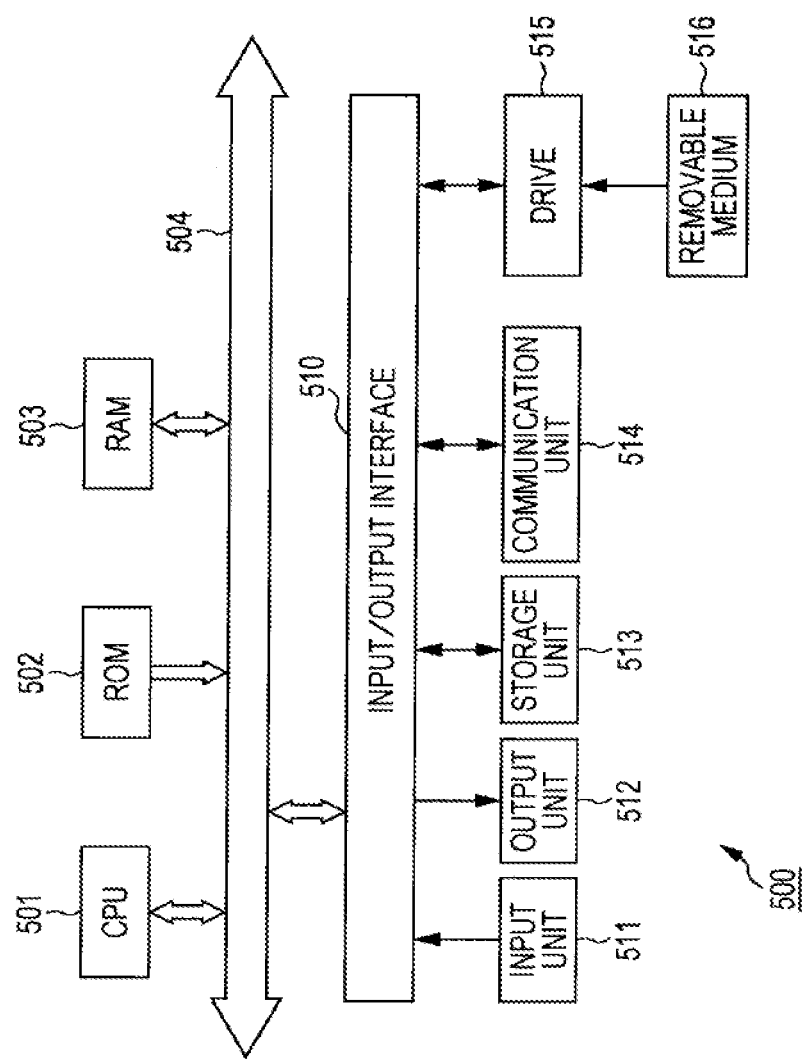
FIG. 32 is a block diagram showing an exemplary main configuration of a personal computer.

In FIG. 32, a CPU (Central Processing Unit) 501 of a personal computer 500 performs various types of processes according to a program stored in a ROM (Read Only Memory) 502 or a program loaded into a RAM (Random Access Memory) 503 from a storage unit 513. In the RAM 503 are also stored, where appropriate, data required when the CPU 501 performs various types of processes, etc.

The CPU 501, the ROM 502, and the RAM 503 are connected to each other via a bus 504. An input/output interface 510 is also connected to the bus 504.

To the input/output interface 510 are connected an input unit 511 including a keyboard, a mouse, etc., an output unit 512 including a display including a CRT (Cathode Ray Tube) or an LCD (Liquid Crystal Display), a speaker, and the like, the storage unit 513 composed of a hard disk, etc., and a communication unit 514 composed of a modem, etc. The communication unit 514 performs a communication process through a network including the Internet.

To the input/output interface 510 is also connected a drive 515 if necessary, and a removable medium 521 such as a magnetic disk, an optical disk, a magneto-optical disk, or a semiconductor memory is placed where appropriate, and a computer program read therefrom is installed on the storage unit 513 if necessary.

When the above-described series of processes are performed by software, a program that forms the software is installed from a network or a recording medium.

As shown in FIG. 32, for example, the recording medium is not only composed of the removable medium 521, including a magnetic disk (including a flexible disk), an optical disk (including a CD-ROM (Compact Disc-Read Only Memory) and a DVD (Digital Versatile Disc)), a magneto-optical disk (including an MD (Mini Disc)), or a semiconductor memory, which is distributed separately from the main body of the apparatus to distribute the program to the user and which has the program recorded therein, but is also composed of the ROM 502, the hard disk included in the storage unit 513, or the like, which has recorded therein the program distributed to the user in a state of being incorporated in advance in the main body of the apparatus.

Note that the program executed by the computer may be a program that performs processes chronologically in the order described in the present specification, or may be a program that performs processes in parallel or at required timing such as when the program is called.

In addition, in the present specification, steps that describe the program recorded in the recording medium not only include processes performed chronologically in the described order, but also include processes that are not necessarily processed chronologically but are performed parallely or individually.

In addition, in the present specification, a system represents the whole apparatus composed of a plurality of devices (apparatuses).

In addition, a configuration described above as a single apparatus (or a processing unit) may be divided to be configured as a plurality of apparatuses (or processing units). In the other way around, configurations described above as a plurality of apparatuses (or processing units) may be put together to be configured as a single apparatus (or a processing unit). In addition, it is of course possible to add other configurations than those described above to the configuration of each apparatus (or each processing unit). Furthermore, as long as the configuration and operation of the system as a whole are substantially the same, a part of the configuration of a given apparatus (or a processing unit) may be included in the configuration of another apparatus (or another processing unit). That is, the present technique is not limited to the above-described embodiments, and various changes may be made thereto without departing from the spirit and scope of the present technique.

Imaging coding apparatuses and image decoding apparatuses according to the above-described embodiments can be applied to various electronic devices such as transmitters or receivers for satellite broadcasting, cable broadcasting such as cable TV, distribution on the Internet, distribution to terminals by cellular communication, and the like, recording apparatuses that record images in media such as optical disks, magnetic disks, and flash memories, or reproducing apparatuses that reproduce images from those storage media. Four application examples will be described below.

6. Sixth Embodiment

First Application Example: Television Receiver

Figure 33:
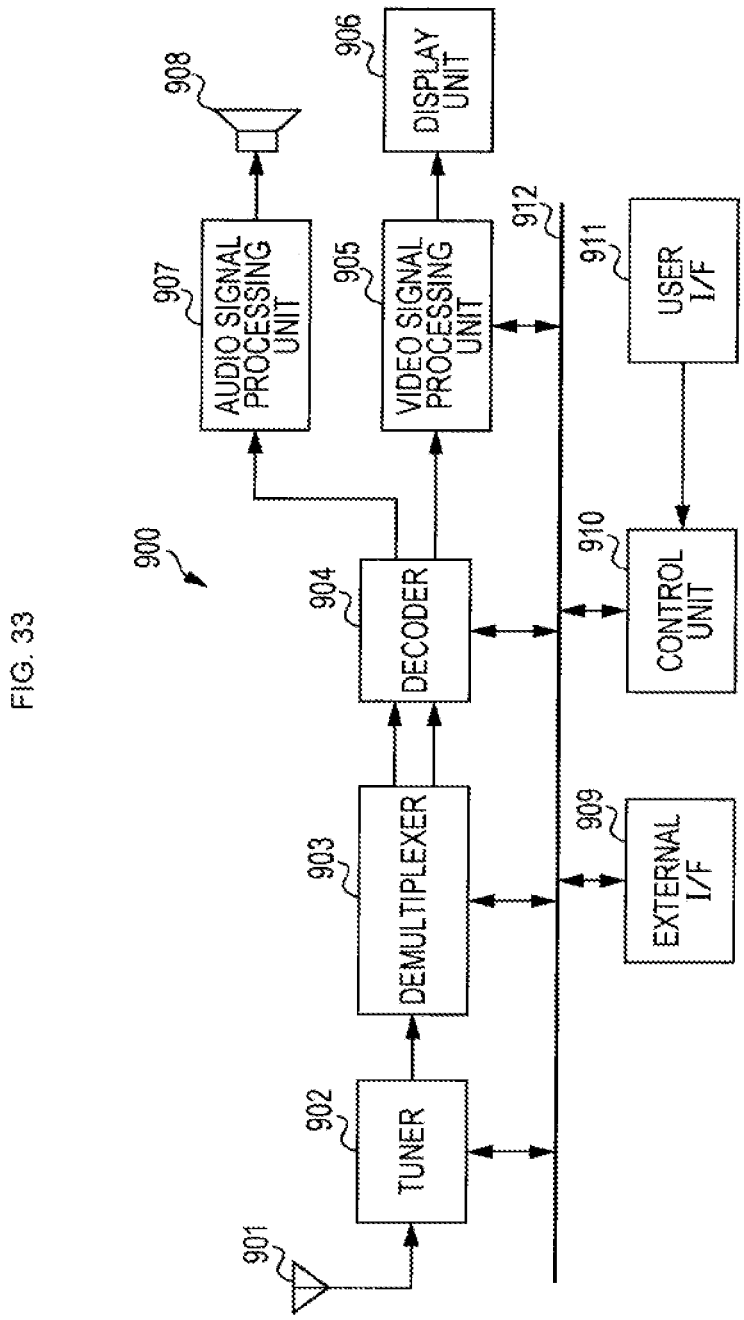
FIG. 33 is a block diagram showing an example of a schematic configuration of a television apparatus.

FIG. 33 shows an example of a schematic configuration of a television apparatus to which the above-described embodiments are applied. A television apparatus 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcast signal received through the antenna 901, and demodulates the extracted signal. Then, the tuner 902 outputs a coded bit stream obtained by the demodulation to the demultiplexer 903. Namely, the tuner 902 acts as a transmission unit of the television apparatus 900 that receives a coded stream where images are coded.

The demultiplexer 903 demultiplexes a video stream and an audio stream of a program to be viewed from the coded bit stream, and outputs the demultiplexed streams to the decoder 904. In addition, the demultiplexer 903 extracts auxiliary data such as an EPG (Electronic Program Guide) from the coded bit stream, and supplies the extracted data to the control unit 910. Note that when the coded bit stream is scrambled, the demultiplexer 903 may perform descrambling.

The decoder 904 decodes the video stream and the audio stream which are inputted from the demultiplexer 903. Then, the decoder 904 outputs video data generated in the decoding process to the video signal processing unit 905. In addition, the decoder 904 outputs audio data generated in the decoding process to the audio signal processing unit 907.

The video signal processing unit 905 reproduces the video data inputted from the decoder 904, and allows the display unit 906 to display video. In addition, the video signal processing unit 905 may allow the display unit 906 to display an application screen supplied through a network. In addition, the video signal processing unit 905 may perform an additional process, e.g., noise removal, on the video data, according to the settings. Furthermore, the video signal processing unit 905 may create GUI (Graphical User Interface) images, e.g., a menu, buttons, or a cursor, and superimpose the created images on an output image.

The display unit 906 is driven by a drive signal supplied from the video signal processing unit 905, to display video or an image on a video plane of a display device (e.g., a liquid crystal display, a plasma display, an OELD (Organic ElectroLuminescence Display), or the like).

The audio signal processing unit 907 performs a reproduction process, such as D/A conversion and amplification, on the audio data inputted from the decoder 904 and allows the speaker 908 to output audio. In addition, the audio signal processing unit 907 may perform an additional process, such as noise removal, on the audio data.

The external interface 909 is an interface for connecting the television apparatus 900 to an external device or a network. For example, a video stream or an audio stream received through the external interface 909 may be decoded by the decoder 904. Namely, the external interface 909 also acts as a transmission unit of the television apparatus 900 that receives a coded stream where images are coded.

The control unit 910 has a processor such as a CPU and memories such as a RAM and a ROM. The memories store programs to be executed by the CPU, program data, EPG data, data obtained through a network, and the like. The programs stored in the memories are, for example, read and executed by the CPU upon startup of the television apparatus 900. The CPU executes the programs and thereby, for example, controls the operation of the television apparatus 900 according to an operation signal inputted from the user interface 911.

The user interface 911 is connected to the control unit 910. The user interface 911 has, for example, buttons and switches used by the user to operate the television apparatus 900, a remote control signal reception unit, and the like. The user interface 911 detects, through those components, operation performed by the user, to generate an operation signal and outputs the generated operation signal to the control unit 910.

The bus 912 interconnects the tuner 902, the demultiplexer 903, the decoder 904, the video signal processing unit 905, the audio signal processing unit 907, the external interface 909, and the control unit 910.

In the television apparatus 900 configured in this manner, the decoder 904 has the function of image decoding apparatuses according to the above-described embodiments. By that, upon decoding an image on the television apparatus 900, parallelization of slice-by-slice processes can be implemented, enabling to suppress an increase in processing time caused by the occurrence of unwanted delay time in an adaptive loop filter process.

7. Seventh Embodiment

Second Application Example: Mobile Phone

Figure 34:
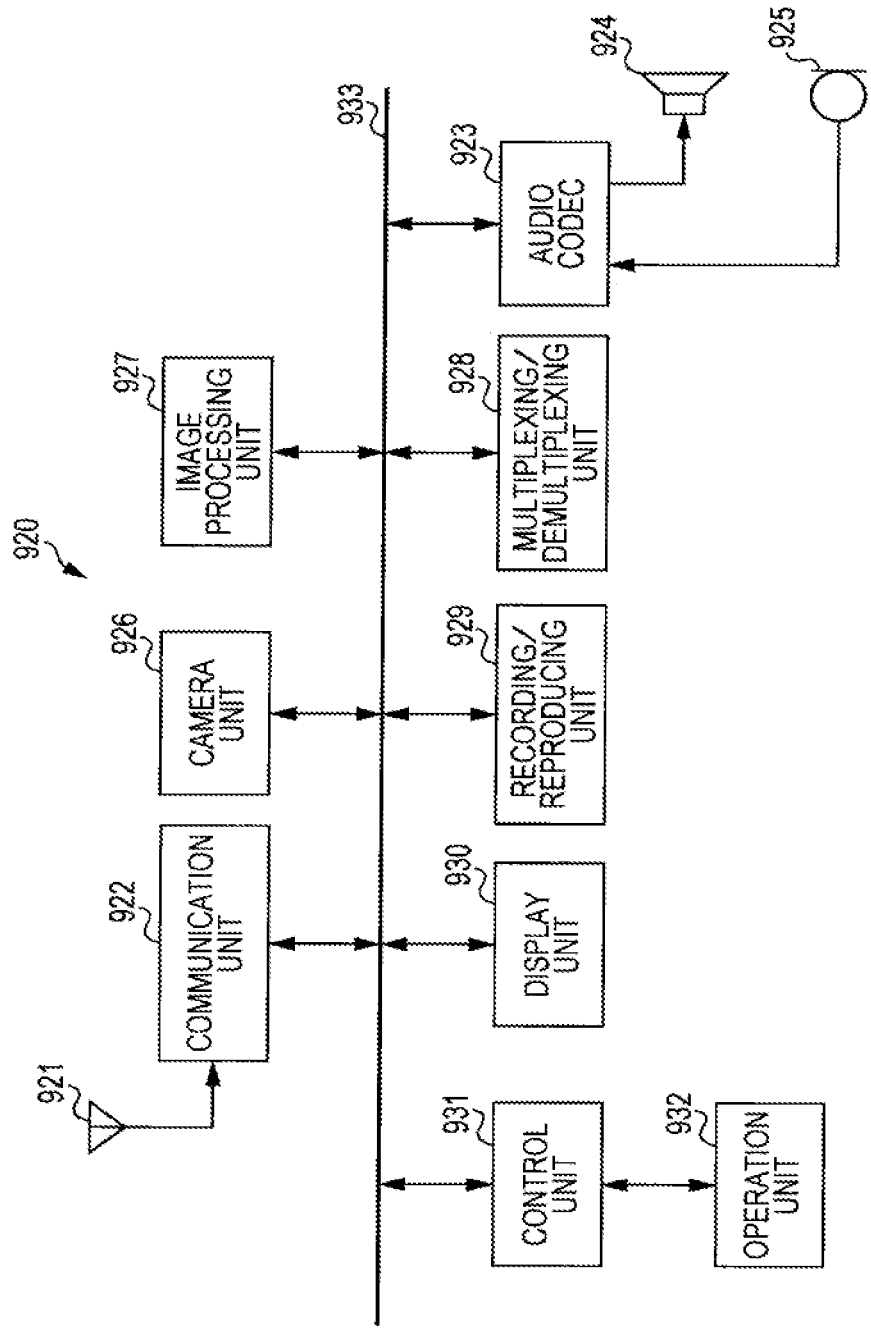
FIG. 34 is a block diagram showing an example of a schematic configuration of a mobile phone.

FIG. 34 shows an example of a schematic configuration of a mobile phone to which the above-described embodiments are applied. A mobile phone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 interconnects the communication unit 922, the audio codec 923, the camera unit 926, the image processing unit 927, the multiplexing/demultiplexing unit 928, the recording/reproducing unit 929, the display unit 930, and the control unit 931.

The mobile phone 920 performs operation, such as transmission and reception of audio signals, transmission and reception of emails or image data, imaging of images, and recording of data, in various operating modes including voice call mode, data communication mode, shooting mode, and videophone mode.

In voice call mode, an analog audio signal generated by the microphone 925 is supplied to the audio codec 923. The audio codec 923 converts the analog audio signal into audio data and A/D converts and compresses the converted audio data. Then, the audio codec 923 outputs the compressed audio data to the communication unit 922. The communication unit 922 codes and modulates the audio data and thereby generates a transmit signal. Then, the communication unit 922 transmits the generated transmit signal to a base station (not shown) through the antenna 921. In addition, the communication unit 922 amplifies and frequency-converts a radio signal received through the antenna 921 and thereby obtains a receive signal. Then, the communication unit 922 demodulates and decodes the receive signal and thereby generates audio data, and outputs the generated audio data to the audio codec 923. The audio codec 923 decompresses and D/A converts the audio data and thereby generates an analog audio signal. Then, the audio codec 923 supplies the generated audio signal to the speaker 924 to output audio.

In addition, in data communication mode, for example, the control unit 931 generates text data composing an email, according to operation performed by the user through the operation unit 932. In addition, the control unit 931 allows the display unit 930 to display text. In addition, the control unit 931 generates email data according to a transmission instruction from the user through the operation unit 932, and outputs the generated email data to the communication unit 922. The communication unit 922 codes and modulates the email data and thereby generates a transmit signal. Then, the communication unit 922 transmits the generated transmit signal to a base station (not shown) through the antenna 921. In addition, the communication unit 922 amplifies and frequency-converts a radio signal received through the antenna 921 and thereby obtains a receive signal. Then, the communication unit 922 demodulates and decodes the receive signal and thereby reconstructs email data, and outputs the reconstructed email data to the control unit 931. The control unit 931 allows the display unit 930 to display the content of the email and allows a storage medium in the recording/reproducing unit 929 to store the email data.

The recording/reproducing unit 929 has any readable and writable storage medium. For example, the storage medium may be a built-in type storage medium such as a RAM or a flash memory, or an external placement-type storage medium such as a hard disk, a magnetic disk, a magneto-optical disk, an optical disk, a USB (Unallocated Space Bitmap) memory, or a memory card.

In addition, in shooting mode, for example, the camera unit 926 images a subject and thereby generates image data, and outputs the generated image data to the image processing unit 927. The image processing unit 927 codes the image data inputted from the camera unit 926 and allows the storage medium in the storing/reproducing unit 929 to store a coded stream.

In addition, in videophone mode, for example, the multiplexing/demultiplexing unit 928 multiplexes a video stream coded by the image processing unit 927 and an audio stream inputted from the audio codec 923, and outputs the multiplexed streams to the communication unit 922. The communication unit 922 codes and modulates the streams and thereby generates a transmit signal. Then, the communication unit 922 transmits the generated transmit signal to a base station (not shown) through the antenna 921. In addition, the communication unit 922 amplifies and frequency-converts a radio signal received through the antenna 921 and thereby obtains a receive signal. The transmit signal and the receive signal can include coded bit streams. Then, the communication unit 922 demodulates and decodes the receive signal and thereby reconstructs a stream, and outputs the reconstructed stream to the multiplexing/demultiplexing unit 928. The multiplexing/demultiplexing unit 928 demultiplexes a video stream and an audio stream from the inputted stream, and outputs the video stream to the image processing unit 927 and the audio stream to the audio codec 923. The image processing unit 927 decodes the video stream and thereby generates video data. The video data is supplied to the display unit 930, and a series of images are displayed on the display unit 930. The audio codec 923 decompresses and D/A converts the audio stream and thereby generates an analog audio signal. Then, the audio codec 923 supplies the generated audio signal to the speaker 924 to output audio.

In the mobile phone 920 configured in this manner, the image processing unit 927 has the functions of image coding apparatuses and image decoding apparatuses according to the above-described embodiments. By that, upon coding and decoding an image on the mobile phone 920, parallelization of slice-by-slice processes can be implemented, enabling to suppress an increase in processing time caused by the occurrence of unwanted delay time in an adaptive loop filter process.

8. Eighth Embodiment

Third Application Example: Recording/Reproducing Apparatus

Figure 35:
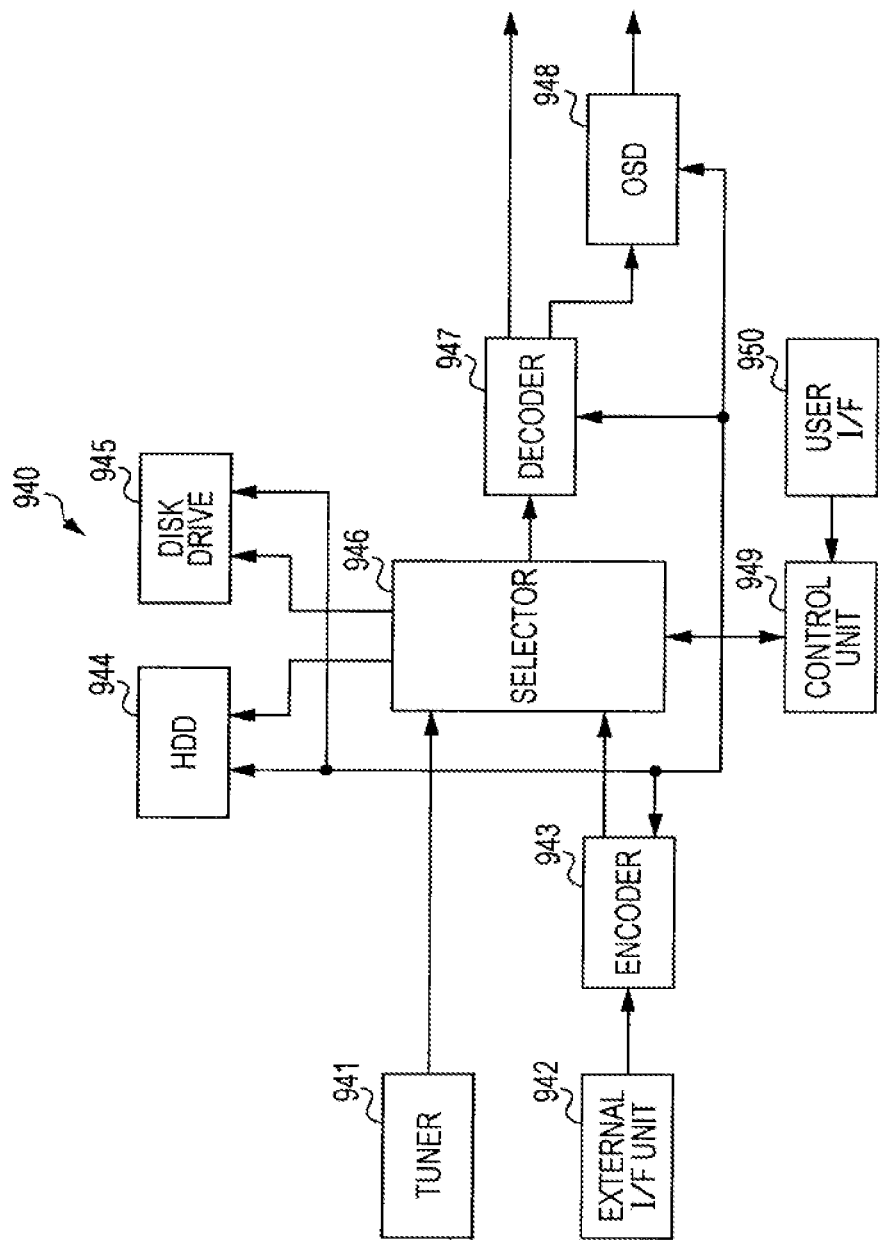
FIG. 35 is a block diagram showing an example of a schematic configuration of a recording/reproducing apparatus.

FIG. 35 shows an example of a schematic configuration of a recording/reproducing apparatus to which the above-described embodiments are applied. A recording/reproducing apparatus 940, for example, codes the audio data and video data of a received broadcast program and records the coded data in a recording medium. In addition, the recording/reproducing apparatus 940 may, for example, code audio data and video data obtained from another apparatus and record the coded data in a recording medium. In addition, the recording/reproducing apparatus 940, for example, reproduces the data recorded in the recording medium on a monitor and a speaker, according to a user instruction. At this time, the recording/reproducing apparatus 940 decodes the audio data and the video data.

The recording/reproducing apparatus 940 includes a tuner 941, an external interface 942, an encoder 943, an HDD (Hard Disk Drive) 944, a disc drive 945, a selector 946, a decoder 947, an OSD (On-Screen Display) 948, a control unit 949, and a user interface 950.

The tuner 941 extracts a signal of a desired channel from a broadcast signal received through an antenna (not shown), and demodulates the extracted signal. Then, the tuner 941 outputs a coded bit stream obtained by the demodulation, to the selector 946. Namely, the tuner 941 acts as a transmission unit of the recording/reproducing apparatus 940.

The external interface 942 is an interface for connecting the recording/reproducing apparatus 940 to an external device or a network. The external interface 942 may be, for example, an IEEE 1394 interface, a network interface, a USB interface, a flash memory interface, or the like. For example, video data and audio data which are received through the external interface 942 are inputted to the encoder 943. Namely, the external interface 942 acts as a transmission unit of the recording/reproducing apparatus 940.

When the video data and audio data inputted from the external interface 942 are not coded, the encoder 943 codes the video data and the audio data. Then, the encoder 943 outputs a coded bit stream to the selector 946.

The HDD 944 records a coded bit stream where content data such as video and audio is compressed, various types of programs, and other data on a hard disk provided therein. In addition, upon reproducing video and audio, the HDD 944 reads data thereof from the hard disk.

The disc drive 945 performs recording and reading of data on a recording medium placed therein. A recording medium placed in the disc drive 945 may be, for example, a DVD disc (DVD-Video, DVD-RAM, DVD-R, DVD-RW, DVD+R, DVD+RW, etc.) or a Blu-ray (registered trademark) disc.

When video and audio are recorded, the selector 946 selects a coded bit stream inputted from the tuner 941 or the encoder 943, and outputs the selected coded bit stream to the HDD 944 or the disc drive 945. In addition, when video and audio are reproduced, the selector 946 outputs a coded bit stream inputted from the HDD 944 or the disc drive 945, to the decoder 947.

The decoder 947 decodes the coded bit stream and thereby generates video data and audio data. Then, the decoder 947 outputs the generated video data to the OSD 948. In addition, the decoder 904 outputs the generated audio data to an external speaker.

The OSD 948 reproduces the video data inputted from the decoder 947 and displays video. In addition, the OSD 948 may superimpose GUI images, e.g., a menu, buttons, or a cursor, on the displayed video.

The control unit 949 has a processor such as a CPU and memories such as a RAM and a ROM. The memories store programs to be executed by the CPU, program data, and the like. The programs stored in the memories are, for example, read and executed by the CPU upon startup of the recording/reproducing apparatus 940. The CPU executes the programs and thereby, for example, controls the operation of the recording/reproducing apparatus 940 according to an operation signal inputted from the user interface 950.

The user interface 950 is connected to the control unit 949. The user interface 950 has, for example, buttons and switches used by the user to operate the recording/reproducing apparatus 940, a remote control signal reception unit, and the like. The user interface 950 detects, through those components, operation performed by the user, to generate an operation signal and outputs the generated operation signal to the control unit 949.

In the recording/reproducing apparatus 940 configured in this manner, the encoder 943 has the function of image coding apparatuses according to the above-described embodiments. In addition, the decoder 947 has the function of image decoding apparatuses according to the above-described embodiments. By that, upon coding and decoding an image on the recording/reproducing apparatus 940, parallelization of slice-by-slice processes can be implemented, enabling to suppress an increase in processing time caused by the occurrence of unwanted delay time in an adaptive loop filter process.

9. Ninth Embodiment

Fourth Application Example: Imaging Apparatus

FIG. 36 shows an example of a schematic configuration of an imaging apparatus to which the above-described embodiments are applied. An imaging apparatus 960 images a subject and thereby creates an image, codes image data, and records the coded image data in a recording medium.

The imaging apparatus 960 includes an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 interconnects the image processing unit 964, the external interface 966, the memory 967, the media drive 968, the OSD 969, and the control unit 970.

The optical block 961 has a focus lens, a diaphragm mechanism, and the like. The optical block 961 forms an optical image of a subject onto an imaging plane of the imaging unit 962. The imaging unit 962 has an image sensor such as a CCD (Charge Coupled Device) or a CMOS (Complementary Metal Oxide Semiconductor), and converts, by photoelectric conversion, the optical image formed on the imaging plane into an image signal serving as an electrical signal. Then, the imaging unit 962 outputs the image signal to the signal processing unit 963.

The signal processing unit 963 performs various camera signal processing, such as knee correction, gamma correction, and color correction, on the image signal inputted from the imaging unit 962. The signal processing unit 963 outputs image data obtained after the camera signal processing, to the image processing unit 964.

The image processing unit 964 codes the image data inputted from the signal processing unit 963 and thereby generates coded data. Then, the image processing unit 964 outputs the generated coded data to the external interface 966 or the media drive 968. In addition, the image processing unit 964 decodes coded data inputted from the external interface 966 or the media drive 968 and thereby generates image data. Then, the image processing unit 964 outputs the generated image data to the display unit 965. In addition, the image processing unit 964 may output the image data inputted from the signal processing unit 963, to the display unit 965 to display an image. In addition, the image processing unit 964 may superimpose display data obtained from the OSD 969, on an image outputted to the display unit 965.

The OSD 969 creates GUI images, e.g., a menu, buttons, or a cursor, and outputs the created images to the image processing unit 964.

The external interface 966 is configured as, for example, a USB input/output terminal. The external interface 966, for example, connects the imaging apparatus 960 to a printer when printing an image. In addition, a drive is connected to the external interface 966, if necessary. For example, a removable medium such as a magnetic disk or an optical disk is placed in the drive, and a program read from the removable medium can be installed on the imaging apparatus 960. Furthermore, the external interface 966 may be configured as a network interface which is connected to a network such as a LAN or the Internet. Namely, the external interface 966 acts as a transmission unit of the imaging apparatus 960.

A recording medium placed in the media drive 968 may be any readable and writable removable medium, e.g., a magnetic disk, a magneto-optical disk, an optical disk, or a semiconductor memory. In addition, a recording medium may be fixedly placed in the media drive 968, by which, for example, a non-portable storage unit such as a built-in type hard disk drive or an SSD (Solid State Drive) may be formed.

The control unit 970 has a processor such as a CPU and memories such as a RAM and a ROM. The memories store programs to be executed by the CPU, program data, and the like. The programs stored in the memories are, for example, read and executed by the CPU upon startup of the imaging apparatus 960. The CPU executes the programs and thereby, for example, controls the operation of the imaging apparatus 960 according to an operation signal inputted from the user interface 971.

The user interface 971 is connected to the control unit 970. The user interface 971 has, for example, buttons, switches, and the like, used by the user to operate the imaging apparatus 960. The user interface 971 detects, through those components, operation performed by the user, to generate an operation signal and outputs the generated operation signal to the control unit 970.

In the imaging apparatus 960 configured in this manner, the image processing unit 964 has the functions of image coding apparatuses and image decoding apparatuses according to the above-described embodiments. By that, upon coding and decoding an image on the imaging apparatus 960, parallelization of slice-by-slice processes can be implemented, enabling to suppress an increase in processing time caused by the occurrence of unwanted delay time in an adaptive loop filter process.

Note that in the present specification an example is described in which various pieces of information such as an SPS, a PPS, and a slice header are multiplexed to a header of a coded stream and are transmitted from the coding side to the decoding side. However, the technique for transmitting those pieces of information is not limited to such an example. For example, instead of multiplexing those pieces of information to a coded bit stream, those pieces of information may be transmitted or recorded as separate data associated with the coded bit stream. The term "associated" as used herein means that an image included in a bit stream (which may be a part of an image such as a slice or a block) and information associated with the image can be linked to each other upon decoding. Namely, the information may be transmitted through a different transmission path than that for the image (or the bit stream). In addition, the information may be recorded in a different recording medium (or in a different recording area of the same recording medium) than that for the image (or the bit stream). Furthermore, the information and the image (or the bit stream) may be associated with each other in any unit, e.g., a plurality of frames, one frame, or a part in a frame.

Although the preferred embodiments of the present disclosure have been described in detail above with reference to the accompanying drawings, the present technique is not limited to such examples. It will be apparent that those having average knowledge in the technical field to which the present disclosure belongs would reach various changes or modifications within the scope of the technical idea described in the claims. Thus, it will be understood that those changes and modifications also as a matter of course belong to the technical scope of the present disclosure.

Note that the present technique can also employ configurations such as those shown below.

(1) An image processing apparatus including:
an information control unit that obtains information required for image processing for a focused pixel, using only information belonging to a slice including the focused pixel, the focused pixel being a processing target, and the information being obtained using reference information belonging to a different pixel than the focused pixel; and an image processing unit that performs the image processing using the information obtained by the information control unit.

(2) The image processing apparatus according to (1), wherein
the image processing is an adaptive loop filter process,
the information control unit determines, as the information required for the image processing, a filter coefficient used in the adaptive loop filter process, and
the image processing unit performs the adaptive loop filter process for the focused pixel, using the filter coefficient determined by the information control unit.

(3) The image processing apparatus according to (2), wherein
the image processing unit performs the adaptive loop filter process independently on a slice-by-slice basis, and
the information control unit determines the filter coefficient without using information external to a focused slice being a processing target.

(4) The image processing apparatus according to (3), wherein
the information control unit includes:
a position determination unit that determines whether a neighboring pixel of the focused pixel is located in the focused slice;
a calculation unit that calculates information representing complexity of texture of the focused pixel, according to a result of the determination made by the position determination unit;
a class classification unit that classifies the focused pixel into a class, according to magnitude of the information representing complexity of texture calculated by the calculation unit; and a filter coefficient setting unit that sets a value according to the class classified by the class classification unit, as the filter coefficient for the focused pixel.

(5) The image processing apparatus according to (4), wherein the information representing complexity of texture is SML (Sum-Modified Laplacian).

(6) The image processing apparatus according to (4), wherein when it is determined by the position determination unit that the neighboring pixel is not located in the focused slice, the calculation unit sets a predetermined, specified, fixed value as a pixel value of the neighboring pixel, and calculates the information representing complexity of texture.

(7) The image processing apparatus according to (4), wherein when it is determined by the position determination unit that the neighboring pixel is not located in the focused slice, the calculation unit calculates the information representing complexity of texture, using a pixel value of the available pixel near the neighboring pixel instead of a pixel value of the neighboring pixel.

(8) The image processing apparatus according to (4), wherein when it is determined by the position determination unit that the neighboring pixel is not located in the focused slice, the calculation unit calculates the information representing complexity of texture, using a pixel value of the focused pixel instead of a pixel value of the neighboring pixel.

(9) The image processing apparatus according to (4), wherein the calculation unit calculates the information representing complexity of texture using, as neighboring pixels, four pixels adjacent above, below, and to left and right of the focused pixel.

(10) The image processing apparatus according to (9), wherein the calculation unit sets, as the information representing complexity of texture, a sum total of absolute values of differences between a pixel value of the focused pixel and pixel values of the respective neighboring pixels.

(11) The image processing apparatus according to (4), wherein when it is determined by the position determination unit that the neighboring pixel is not located in the focused slice, the filter coefficient setting unit sets a predetermined, specified value as the filter coefficient for the focused pixel.

(12) The image processing apparatus according to (4), wherein when it is determined by the position determination unit that the neighboring pixel is not located in the focused slice, the image processing unit omits the adaptive loop filter process for the focused pixel.

(13) The image processing apparatus according to any one of (2) to (12), further including a flag generation unit that generates a flag indicating whether to perform an adaptive loop filter process for the focused slice independently of other slices, wherein the image processing unit performs the adaptive loop filter process for the focused pixel in the focused slice, according to a value of the flag generated by the flag generation unit.

(14) The image processing apparatus according to (1), wherein
the image processing is an adaptive offset process,
the information control unit determines, as the information required for image processing,
a neighboring pixel value used in the adaptive offset process, and
the image processing unit performs the adaptive offset process for the focused pixel,
using the neighboring pixel value determined by the information control unit.

(15) The image processing apparatus according to (14), wherein
the image processing unit performs the adaptive offset process independently on a slice-by-slice basis, and
the information control unit determines the neighboring pixel value without using information external to a focused slice being a processing target.

(16) The image processing apparatus according to (15), wherein
the information control unit includes:
a position determination unit that determines whether a neighboring pixel of the focused pixel is located in the focused slice; and
a neighboring pixel value determination unit that determines the neighboring pixel value, according to a result of the determination made by the position determination unit.

(17) The image processing apparatus according to (16), wherein when it is determined by the position determination unit that the neighboring pixel is not located in the focused slice, the neighboring pixel value determination unit determines a predetermined, specified, fixed value to be the neighboring pixel value.

(18) The image processing apparatus according to (16), wherein when it is determined by the position determination unit that the neighboring pixel is not located in the focused slice, the neighboring pixel value determination unit determines a pixel value of an available pixel near the neighboring pixel to be the neighboring pixel value.

(19) The image processing apparatus according to (16), wherein when it is determined by the position determination unit that the neighboring pixel is not located in the focused slice, the neighboring pixel value determination unit determines a pixel value of the focused pixel to be the neighboring pixel value.

(20) The image processing apparatus according to any one of (14) to (19), further including a flag generation unit that generates a flag indicating whether to perform an adaptive offset process for the focused slice independently of other slices, wherein the image processing unit performs the adaptive offset process for the focused pixel in the focused slice, according to a value of the flag generated by the flag generation unit.

(21) An image processing method for an image processing apparatus, the method including:
obtaining, by an information control unit, information required for image processing for a focused pixel, using only information belonging to a slice including the focused pixel, the focused pixel being a processing target, and the information being obtained using reference information belonging to a different pixel than the focused pixel; and
performing, by an image processing unit, the image processing using the information obtained by the information control unit.

REFERENCE SIGNS LIST

100 Image coding apparatus
112 Adaptive loop filter
121 Filter coefficient control unit
131 Control unit
132 Filter processing unit
141 Position determination unit
142 SML calculation unit
143 Class classification unit
144 Filter coefficient setting unit
200 Image decoding apparatus
207 Adaptive loop filter 221 Filter coefficient control unit
231 Control unit
232 Filter processing unit
241 Position determination unit
242 SML calculation unit
243 Class classification unit
244 Filter coefficient setting unit
300 Image coding apparatus
301 Adaptive offset unit
302 Neighboring pixel value control unit
311 Quad-tree structure determination unit
312 Focused region selection unit
313 Offset calculation unit
314 Offset unit
315 Image buffer
321 No-offset computing unit
322 Band offset computing unit
323 Edge offset computing unit
324 Offset selection unit
331 Buffer
332 Pattern selection unit
333 Focused pixel selection unit
334 Category determination unit
335 Offset value calculation unit
336 Offset unit
337 Cost function calculation unit
341 Neighboring pixel availability determination unit
342 Neighboring pixel value determination unit
400 Image coding apparatus
401 Adaptive offset unit
411 Quad-tree structure buffer
412 Selection information buffer
413 Offset unit
414 Pixel buffer

What is claimed is:

1. An image decoding apparatus, comprising:
circuitry configured to:
generate a decoded image based on coded data associated with a picture, wherein the picture is divided into a plurality of processing units;
classify a focused pixel of the decoded image into a class based on
an amount of change in a pixel value of the focused pixel and a neighboring pixel, and
a first flag which indicates whether to classify each processing unit of the plurality of processing units into a class, wherein
the neighboring pixel and the focused pixel belong to a processing unit of the plurality of processing units; and
execute an adaptive loop filter process based on a filter coefficient, wherein the filter coefficient is based on the classified class.

2. The image decoding apparatus according to claim 1, wherein each of the processing unit of the plurality of processing units is a slice.

3. The image decoding apparatus according to claim 1, wherein the circuitry is further configured to:
execute a deblocking filter process to the decoded image; and
classify the focused pixel of the decoded image subjected to the deblocking filter process.

4. The image decoding apparatus according to claim 1, wherein
the coded data includes a second flag, and
the second flag indicates whether to execute the adaptive loop filter process.

5. An image decoding method, comprising:
in an image decoding apparatus:
generating a decoded image based on coded data associated with a picture, wherein the picture is divided into a plurality of processing units;
classifying a focused pixel of the decoded image into a class based on
an amount of change in a pixel value of the focused pixel and a neighboring pixel, and
a first flag which indicates whether to classify each processing unit of the plurality of processing units into a class, wherein
the neighboring pixel and the focused pixel belong to a processing unit of the plurality of processing units; and
executing an adaptive loop filter process based on a filter coefficient, wherein the filter coefficient is based on the class classified.

6. The image decoding method according to claim 5, wherein each of the processing unit of the plurality of processing units is a slice.

7. The image decoding method according to claim 5, further comprising:
executing a deblocking filter process to the decoded image; and
classifying the focused pixel of the decoded image subjected to the deblocking filter process.

8. The image decoding method according to claim 5, wherein
the coded data includes a second flag, and
the second flag indicates whether to execute the adaptive loop filter process.

* * * * *